(12) United States Patent
Ferri et al.

(10) Patent No.: US 10,655,367 B2
(45) Date of Patent: May 19, 2020

(54) MECHANICAL ASSIST MECHANISM FOR ACTIVE PEDESTRIAN SAFETY LATCH

(71) Applicant: Magna Closures Inc., Newmarket (CA)

(72) Inventors: James J. Ferri, Maple (CA); J. R. Scott Mitchell, Newmarket (CA); Csaba Szente, Newmarket (CA); Jagdeep Playia, Brampton (CA); Dikran Ghorghorian, Scarborough (CA); John Clark, Maple (CA); Gabriele Wayne Sabatini, Keswick (CA); Traian Miu, Oakville (CA); Aleksandar Jovanovic, Toronto (CA)

( * ) Notice: Subject to any disclaimer, the term of this patent is extended or adjusted under 35 U.S.C. 154(b) by 959 days.

(21) Appl. No.: 14/933,451

(22) Filed: Nov. 5, 2015

(65) Prior Publication Data

US 2016/0130842 A1 May 12, 2016

Related U.S. Application Data

(63) Continuation of application No. PCT/CA2014/000450, filed on May 23, 2014.
(Continued)

(51) Int. Cl.
*E05B 77/08* (2014.01)
*E05B 83/24* (2014.01)
(Continued)

(52) U.S. Cl.
CPC .............. *E05B 77/08* (2013.01); *B60R 21/34* (2013.01); *B60R 21/38* (2013.01); *E05B 83/24* (2013.01); *E05C 17/02* (2013.01); *E05C 19/10* (2013.01)

(58) Field of Classification Search
CPC .......... E05B 83/24; E05B 77/08; E05B 83/16; E05B 77/38; E05B 81/10; B60R 21/38;
(Continued)

(56) References Cited

U.S. PATENT DOCUMENTS 5,000,493 A * 3/1991 Bastien .................... E05B 83/24
292/11
5,431,460 A * 7/1995 Hass ....................... E05B 15/04
292/216
(Continued)

OTHER PUBLICATIONS

International Search Report & Written Opinion dated Jul. 22, 2014 relating to corresponding PCT International Application No. PCT/CA2014/000450 issued from the Canadian Intellectual Property Office.

*Primary Examiner* — Mark A Williams

(57) ABSTRACT

A latch assembly for driving a closure panel from a closed panel position to an open panel position. The latch assembly comprises: a latch mechanism having a first latch element for retaining a mating latch component in a latched position and for moving the mating latch component from the latched position to an unlatched position when released, the movement of the first latch element biased towards the unlatched position by a latch biasing element; and an actuation system having: a mechanical energy storage system having a device for storing mechanical potential energy for assisting the latch biasing element in moving the mating latch component from the latched position to the unlatched position; a mechanical advantage system having a plurality of advantage elements for engaging the device, such that movement of the plurality of advantage elements is associated with a trigger force and cooperation of the plurality of advantage elements provides for amplification of the trigger force as an initiating force to release the stored mechanical potential energy; and a trigger system configured to provide the trigger force to release the stored mechanical potential energy.

17 Claims, 61 Drawing Sheets

Related U.S. Application Data

(60) Provisional application No. 61/826,672, filed on May 23, 2013.

(51) Int. Cl.
 *B60R 21/38* (2011.01)
 *B60R 21/34* (2011.01)
 *E05C 17/02* (2006.01)
 *E05C 19/10* (2006.01)

(58) Field of Classification Search
 CPC ....... B60R 21/34; B60R 21/013; B60R 21/26; B60R 21/264; Y10S 292/14; Y10S 292/65; E05Y 2900/536
 See application file for complete search history.

(56) References Cited

U.S. PATENT DOCUMENTS

| | | | | |
|---|---|---|---|---|
| 6,149,210 A | * | 11/2000 | Hunt | E05B 83/16 292/216 |
| 7,845,691 B2 | | 12/2010 | Sundararajan et al. | |
| 2004/0256861 A1 | * | 12/2004 | Nakagome | E05B 83/24 292/95 |
| 2005/0285431 A1 | | 12/2005 | Rex et al. | |
| 2006/0032693 A1 | * | 2/2006 | Parks | B60R 21/38 180/271 |
| 2007/0246944 A1 | * | 10/2007 | Sundararajan | B60R 21/38 292/92 |
| 2011/0025077 A1 | * | 2/2011 | Meyer | E05B 83/16 292/216 |
| 2012/0074715 A1 | | 3/2012 | Kim | |
| 2012/0280519 A1 | * | 11/2012 | Hong | E05B 83/24 292/128 |
| 2013/0033069 A1 | * | 2/2013 | Hwang | B60R 21/38 296/187.04 |
| 2013/0193694 A1 | * | 8/2013 | Johnson | E05B 83/24 292/31 |
| 2015/0115625 A1 | * | 4/2015 | Park | E05B 83/24 292/194 |
| 2015/0191145 A1 | * | 7/2015 | Farooq | B60R 21/38 180/274 |
| 2018/0230718 A1 | * | 8/2018 | Menke | E05B 63/244 |

\* cited by examiner

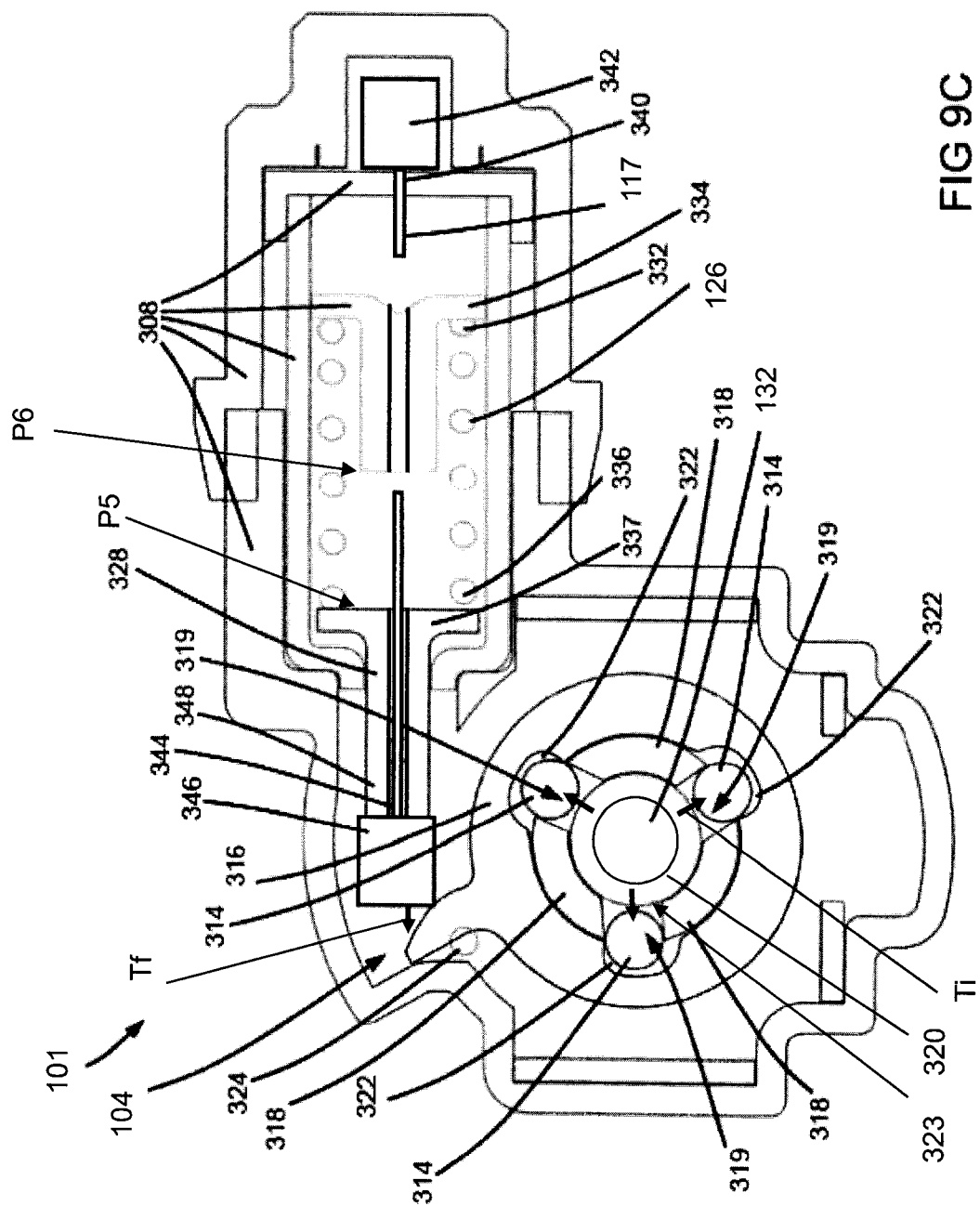

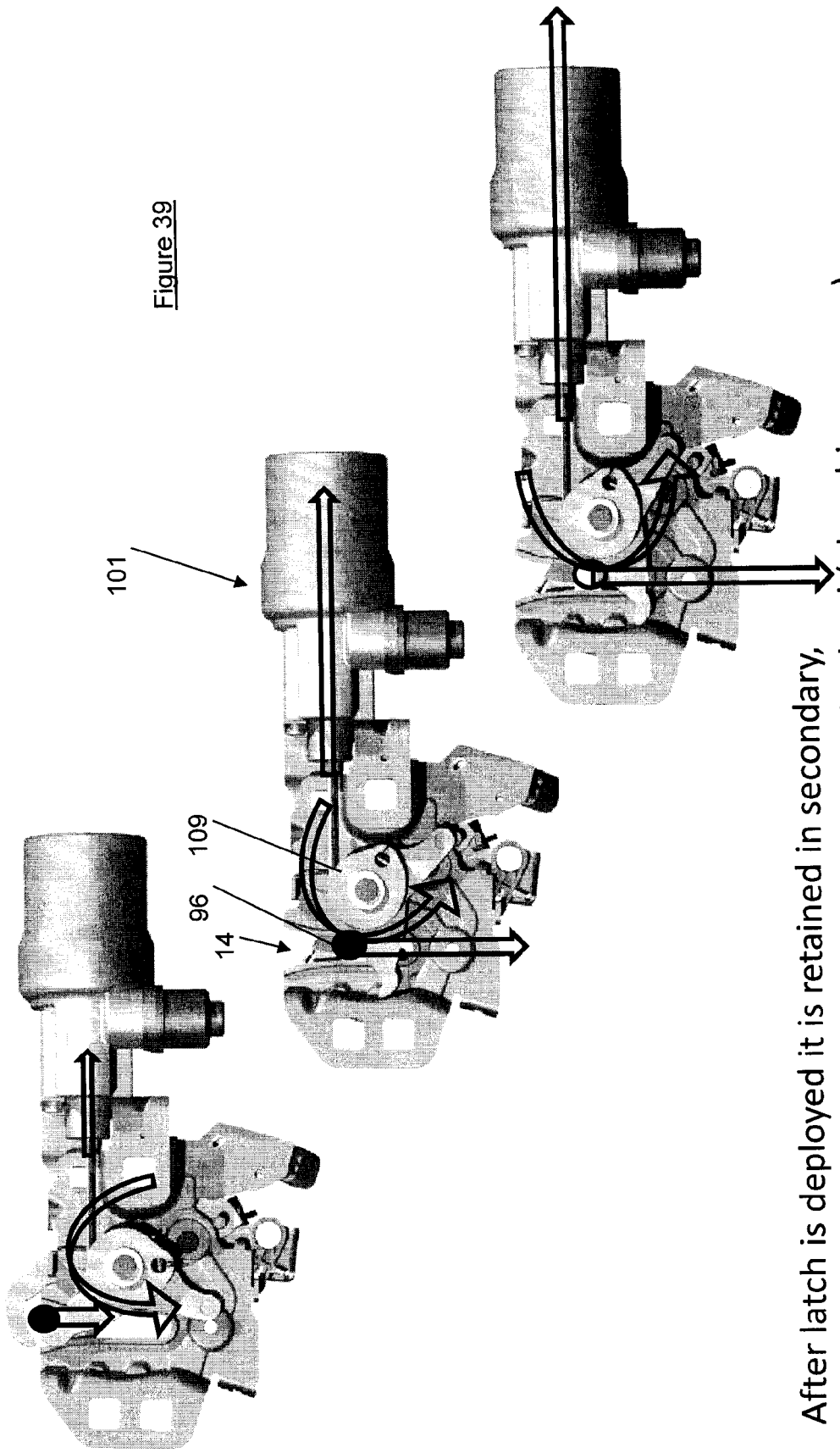

MECHANICAL ASSIST MECHANISM FOR ACTIVE PEDESTRIAN SAFETY LATCH

CROSS-REFERENCE TO RELATED APPLICATIONS

This application is a continuation application of PCT International Application No. PCT/CA2014/000450 filed May 23, 2014 which claims the benefit of U.S. Provisional Application No. 61/826,672, filed May 23, 2013, the contents of which are incorporated herein in their entirety.

FIELD

This disclosure relates to vehicle safety systems.

BACKGROUND

The automotive industry is attempting to better protect pedestrians from head on collisions with vehicles. When a car hits a pedestrian in a front end collision, the pedestrian can be thrown up and land on the front hood of the vehicle and/or the windshield. In an effort to ameliorate the harshness of the impact, and in particular to prevent the person's head from hitting the engine block or other hard point located directly underneath the front hood, it is desired to actively space the front hood from the engine block whenever a front end collision is detected. In particular, when a front end collision is detected by crash sensors, it is desired to move the front hood in a very short period of time (e.g., in milliseconds) from a first aerodynamic position where the front hood is normally located very close to the engine block to a second position where the front hood is actively moved few centimeters further away from the engine block. This activity could provide the pedestrian's head and/or torso with sufficient time and/or space to decelerate when the pedestrian impacts the front hood and thus prevent fatal injury.

Other problems in industry related to safety systems is actuation speed of safety devices (e.g. device response time) tempered with actuation power requirements. A further problem in industry is the need for reduced cost of safety systems, including module components to facilitate replacement a reduction in replacement costs. A further problem is the use of chemical or explosive charge based actuation systems, which can have faster reaction times as compared to mechanical based actuation systems, however replacement costs and safety, reliability, and reusability can be at issue.

SUMMARY

It is an object to the present invention to provide a component of a safety system to obviate or mitigate at least one of the above-mentioned problems.

Problems in industry related to safety systems is actuation speed of safety devices (e.g. device response time) tempered with actuation power requirements. A further problem in industry is the need for reduced cost of safety systems, including module components to facilitate replacement a reduction in replacement costs. A further problem is the use of chemical or explosive charge based actuation systems, which can have faster reaction times as compared to mechanical based actuation systems, however replacement costs and safety, reliability, and reusability can be at issue.

A first aspect provided is a latch assembly for driving a closure panel from a closed panel position to an open panel position, the latch assembly comprising: a latch mechanism having a first latch element for retaining a mating latch component in a latched position and for moving the mating latch component from the latched position to an unlatched position when released, the movement of the first latch element biased towards the unlatched position by a latch biasing element; and an actuation system having: an energy storage system having a device for storing potential energy for assisting the latch biasing element in moving the mating latch component from the latched position to the unlatched position; a mechanical system having at least one mechanical member for engaging with the mating latch component to assist in moving the mating latch component from the latched position to the unlatched position, such that actuation of the least one mechanical member is a result of a release of the stored potential energy.

BRIEF DESCRIPTION OF THE DRAWINGS

The foregoing and other aspects will be more readily appreciated having reference to the drawings, wherein:

FIGS. 9A, 9B and 9C are perspective, plan and sectional views of the loading device shown in FIGS. 8A, 8B and 8C, shown in an actuated state;

FIG. 39 shows an example operation of the actuation system in an energy absorption state after deployment of the actuation system of FIG. 30.

DESCRIPTION OF THE PREFERRED EMBODIMENTS

Figure 1A:
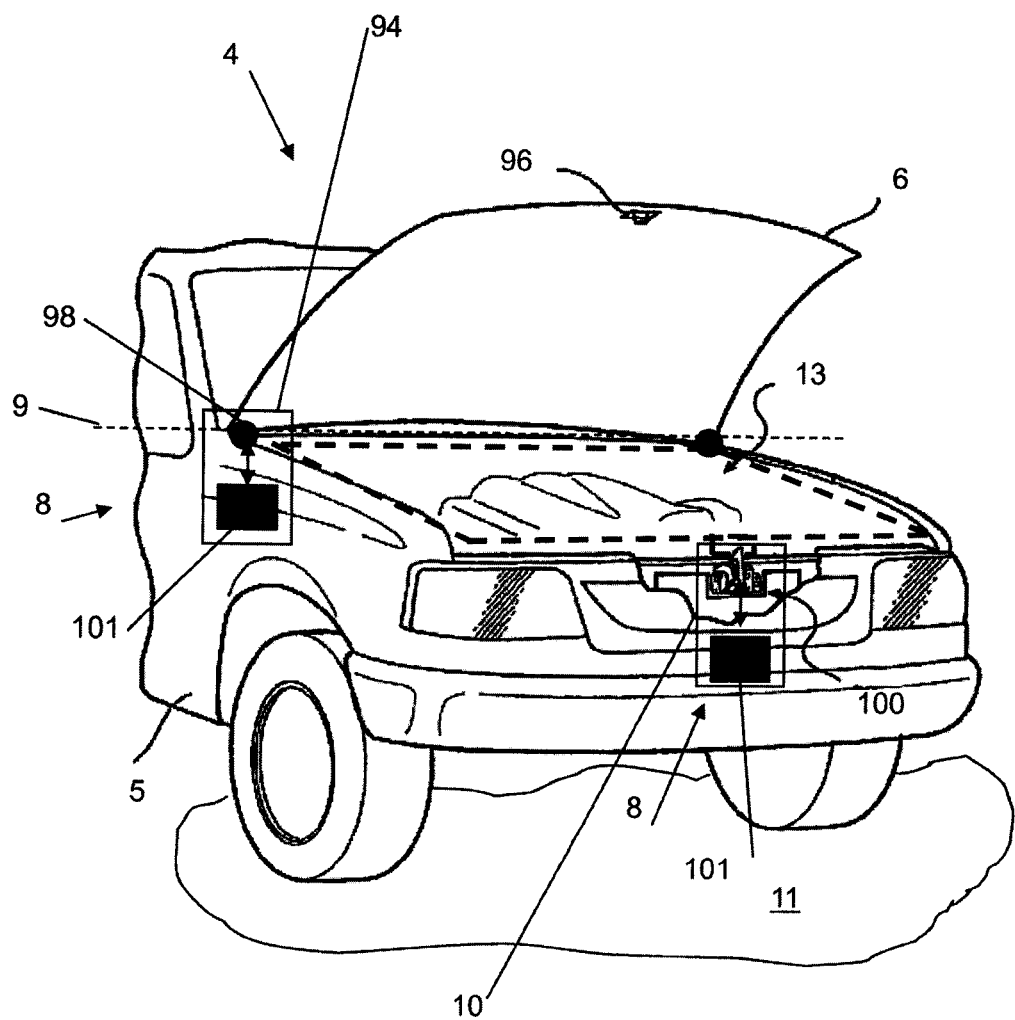
FIG. 1A is a perspective view of an example vehicle using a safety actuation system.

Referring to FIG. 1A, shown is a vehicle 4 with a vehicle body 5 having one or more closure panels 6. The closure panel 6 is connected to the vehicle body 5 via one or more panel operation components 8, for example such as but not limited to a hinge 98 and/or a latch 100 (e.g. for retaining the closure panel 6 in a closed position once closed or for retaining the closure panel 6 in an open position once opened). It is also recognized that the hinge 98 can be configured as a biased hinge that can be configured to bias the closure panel 6 towards the open position and/or towards the closed position. Further, the panel operation component 8 can be configured as a lift assist system including one or more struts, not shown, for example used in tail lift gate systems. The closure panel 6 can have a mating latch component 96 (e.g. striker) mounted thereon for coupling with a respective panel operation component 8 (e.g. latch) mounted on the vehicle body 5. Alternatively, the panel operation component 8 can be mounted on the closure panel 6 and the mating latch component 96 mounted on the body 5 (not shown). In further alternative, the panel operation component 8 can be used to operatively couple the closure panel 6 to the body 5, such as the case for the hinge 98.

The panel operation components 8 provide for movement of the closure panel 6 between a closed panel position (shown in dashed outline) and an open panel position (shown in solid outline), such that the operation component(s) 8 can be involved during the movement of the closure panel 6 between the open panel position and the closed panel position (e.g. for a hinge 98), can be involved in driving the movement of the closure panel 6 towards the open panel position (e.g. for an opening latch 100), or can be involved in driving the movement of the closure panel 6 towards the closed panel position (e.g. for a retaining latch 100). In the embodiment shown, the closure panel 6 pivots between the open panel position and the closed panel position about a pivot axis 9 (e.g. of the hinge 98), which can be configured as horizontal or otherwise parallel to a support surface 11 of the vehicle 4. In other embodiments, the pivot axis 9 may have some other orientation such as vertical or otherwise extending at an angle outwards from the support surface 11 of the vehicle 4. In still other embodiments, the closure panel 6 may move in a manner other than pivoting, for example, the closure panel 6 may translate along a predefined track or may undergo a combination of translation and rotation between the open and closed panel positions, such that the hinge 98 includes both pivot and translational components (not shown). As can be appreciated, the closure panel 6 can be embodied, for example, as a hood, passenger door or lift gate (otherwise referred to as a hatch) of the vehicle 4. Also provided is an actuation system 101 coupled to one or more of the panel operation components 8, such that the actuation system 101 is configured for actuating the operation or otherwise bypassing the operation of the one or more panel operation components 8, as further described below. In this manner, the actuation system 101 can be used to forcefully provide, during deployment, some form of force assisted open operation (e.g. full open, partial open, etc.) of the closure panel 6.

For vehicles 4, the closure panel 6 can be referred to as a partition or door, typically hinged, but sometimes attached by other mechanisms such as tracks, in front of an opening 13 which is used for entering and exiting the vehicle 4 interior by people and/or cargo. It is also recognized that the closure panel 6 can be used as an access panel for vehicle 4 systems such as engine compartments and also for traditional trunk compartments of automotive type vehicles 4. The closure panel 6 can be opened to provide access to the opening 13, or closed to secure or otherwise restrict access to the opening 13. It is also recognized that there can be one or more intermediate open positions (e.g. unlatched position) of the closure panel 6 between a fully open panel position (e.g. unlatched position) and fully closed panel position (e.g. latched position), as provided at least in part by the panel operation component(s) 8. For example, the panel operation component(s) 8 can be used to provide an opening force (or torque) and/or a closing force (or torque) for the closure panel 6.

Movement of the closure panel 6 (e.g. between the open and closed panel positions) can be electronically and/or manually operated, where power assisted closure panels 6 can be found on minivans, high-end cars, or sport utility vehicles (SUVs) and the like. As such, it is recognized that movement of the closure panel 6 can be manual or power assisted during operation of the closure panel 6 at, for example: between fully closed (e.g. locked or latched) and fully open (e.g. unlocked or unlatched); between locked/latched and partially open (e.g. unlocked or unlatched); and/or between partially open (e.g. unlocked or unlatched) and fully open (e.g. unlocked or unlatched). It is recognized that the partially open configuration of the closure panel 6 can also include a secondary lock (e.g. closure panel 6 has a primary lock configuration at fully closed and a secondary lock configuration at partially open—for example for latches 100 associated with vehicle hoods).

In terms of vehicles 4, the closure panel 6 may be a hood, a lift gate, or it may be some other kind of closure panel 6, such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening 13 in the body 5 of the vehicle 4. Also contemplated are sliding door embodiments of the closure panel 6 and canopy door embodiments of the closure panel 6, such that sliding doors can be a type of door that open by sliding horizontally or vertically, whereby the door is either mounted on, or suspended from a track that provides for a larger opening 13 for equipment to be loaded and unloaded through the opening 13 without obstructing access. Canopy doors are a type of door that sits on top of the vehicle 4 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the body 5 of the vehicle at the front, side or back of the door, as the application permits. It is recognized that the body 5 can be represented as a body panel of the vehicle 4, a frame of the vehicle 4, and/or a combination frame and body panel assembly, as desired.

Figure 1B:
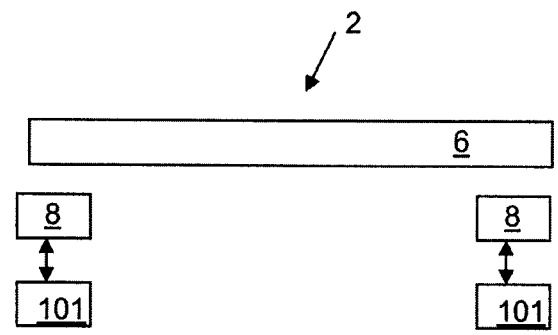
FIG. 1B is a block diagram of an example embodiment for components of the safety actuation system of FIG. 1A.
Figure 1C:
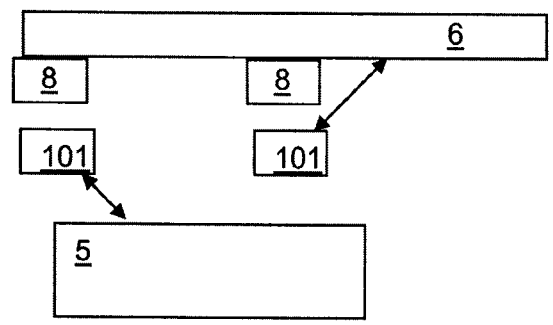
FIG. 1C is a block diagram of a further example embodiment for components of the safety actuation system of FIG. 1A.
Figure 1D:
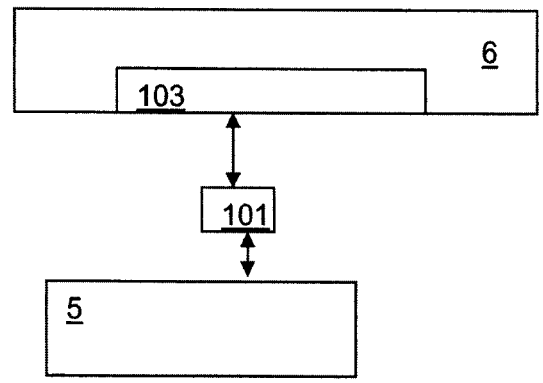
FIG. 1D is a block diagram of a still further example embodiment for components of the safety actuation system of FIG. 1A.

Referring to FIGS. 1B, 1C, 1D, 1E, 1F, 1G, 1H, shown are example configurations of the panel operation component(s) 8 and the actuation system 101. An advantage of using the actuation system 101 in conjunction with closure panels 6, is that the actuation system 101 can be configured to actuate or otherwise bypass operation of the panel operation component 8 for emergency situations (e.g. pre-accident, during accident and/or post accident deployment), in order force (e.g. assist with) closure panel 6 movement in at least a portion of the operational range of the closure panel 6 between the closed panel position and the open panel position. Shown in FIG. 1B is the closure panel 6 in a closure panel assembly 2 which can include an actuation system 101, the one or more panel operation components 8, and the closure panel 6. Alternatively, shown in FIG. 1C, the actuation system 101 can be provided as a modular component configured for coupling to the vehicle body 5 (or the closure panel 6 itself) in proximity to one or more panel operation components 8 (either mounted on the closure panel 6 or on the body 5), in order to affect or otherwise bypass operation of the panel operation component(s) 8 during operation of the panel closure 6. Alternatively, shown in FIG. 1D, the actuation system 101 can be provided as a modular component configured for coupling to the vehicle body 5 in proximity to the closure panel 6 (or the closure panel 6 itself in proximity to the vehicle body 5—e.g. adjacent body panel, adjacent vehicle frame, and/or adjacent vehicle component such as an engine), so as to deform a shape (and/or structural integrity) of the closure panel 6 during deployment (e.g. in this case the actuation system 101 can be positioned away from the one or more panel operation components 8 as the function of the actuation system 101 is to act directly on a structure 103—e.g. panel frame, panel skin, etc.—of the closure panel 6 during deployment rather than on the panel operation component 8).

Figure 1E:
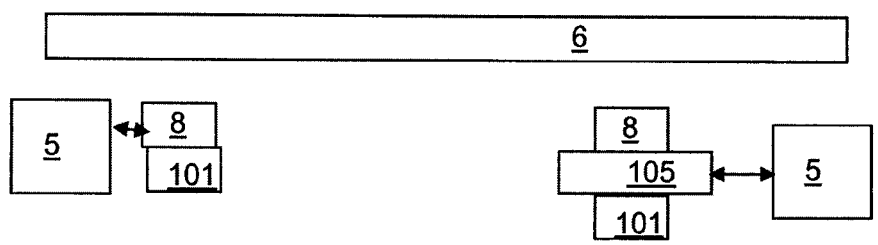
FIG. 1E is a block diagram of a still further example embodiment for components of the safety actuation system of FIG. 1A.
Figure 1F:
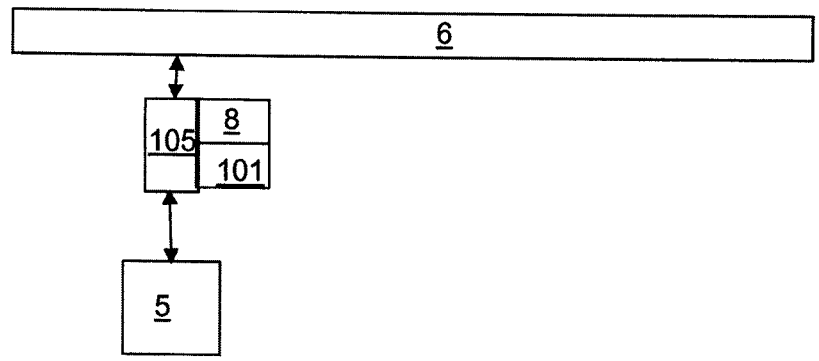
FIG. 1F is a block diagram of a still further example embodiment for components of the safety actuation system of FIG. 1A.
Figure 1G:
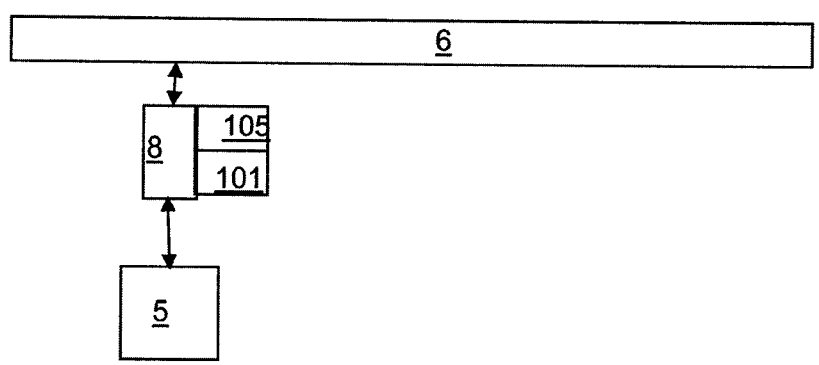
FIG. 1G is a block diagram of a still further example embodiment for components of the safety actuation system of FIG. 1A.
Figure 1H:
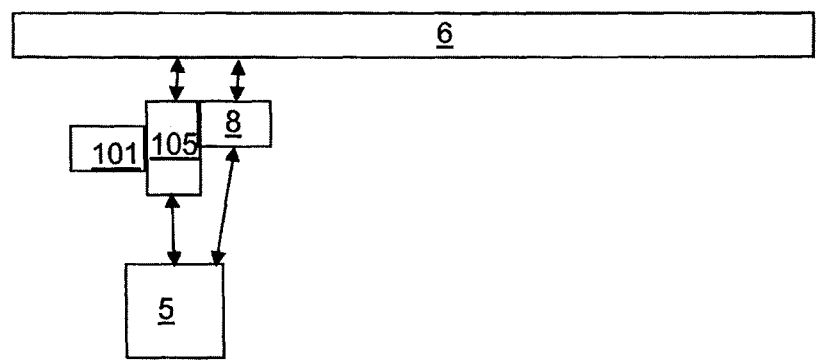
FIG. 1H is a block diagram of a still further example embodiment for components of the safety actuation system of FIG. 1A.

Alternatively, shown in FIG. 1E, the actuation system 101 can be connected to (e.g. on a body of) a panel operation component 8 (e.g. either mounted directly thereto or via an intermediate frame 105 upon which both panel operation component 8 and the actuation system 101 are mounted), for example as a latch assembly 10 (see FIG. 1K as an example), such that the frame 105 is configured for coupling to the vehicle body 5 in proximity to the closure panel 6. Alternatively, shown in FIG. 1F, the actuation system 101 can be mounted to a panel operation component 8 on the frame 105, such that the frame 105 is configured for coupling the closure panel 6 to the vehicle body 5. Alternatively, shown in FIG. 1G, the actuation system 101 can be mounted to a panel operation component 8 on the frame 105, such that the panel operation component 8 is configured for coupling the closure panel 6 to the vehicle body 5. Alternatively, shown in FIG. 1H, the actuation system 101 can be mounted to a panel operation component 8 on the frame 105, such that the frame 105 and the panel operation component 8 are configured for coupling the closure panel 6 to the vehicle body 5. As provided for above, it is recognized that an advantage of the actuation system 101 is for use in emergency situations (e.g. pre-accident, during accident and/or post accident deployment) pertaining to vehicle 4 operation. Examples of emergency situations can include vehicle 4 collisions with foreign objects (e.g. with another vehicle, with an adjacent stationary structure, with a pedestrian) and/or situations in which predefined closure panel 6 operation is affected (e.g. lack of sufficient electrical power in a flood situation to operate a power assisted or operated closure panel 6).

In any of the above actuation system 101 configurations, it is recognized that the actuation system 101 can contain any number of system components (see FIG. 1I) as provided for in the configuration as an off-the-shelf module. In this manner, additional system components of the actuation system 101 can be added to the off-the-shelf module as replacement components and/or as optional components or additional components not included with the off-the-shelf module. Example actuation system 101 components can include components such as but not limited to: a mechanical energy storage device 102; a trigger mechanism or system 103; and/or a mechanical advantage device or system 104, as further described below (see FIG. 1I). As provided for, it is understood that any of the components of the mechanical energy storage device 102, the trigger mechanism 103, and/or a mechanical advantage system 104 can be provided as optional components of the actuation system 101. In one embodiment, the trigger mechanism 103 acts on the mechanical energy storage device 102 to release its stored mechanical potential energy directed on the panel operational component 8. In another embodiment, the trigger mechanism 103 acts on the mechanical advantage system 104 to facilitate operation of the one or more elements of the panel operational component 8. The trigger mechanism 103 can act on the mechanical advantage system 104 to facilitate the mechanical energy storage device 102 to release its stored mechanical potential energy directed on elements of the panel operational component 8 and/or with an adjacent object 130.

For example, the actuation system 101 can be provided with the mechanical energy storage device 102 with an interface 112 for coupling with the trigger mechanism 103 (e.g. releasably secured to the interface 112). For example, the actuation system 101 can be provided with the mechanical energy storage device 102 and the trigger mechanism 103. For example, the actuation system 101 can be provided with the mechanical energy storage device 102 and the mechanical advantage system 104 configured for coupling with one or more elements of the panel operation component 8. For example, the actuation system 101 can be provided with the mechanical energy storage device 102, the trigger mechanism 103 and the mechanical advantage system 104 configured for coupling with one or more elements of the panel operation component 8. For example, the actuation system 101 can be provided with the trigger mechanism 103 configured to couple to the interface 112 of the mechanical energy storage device 102 and the mechanical advantage system 104 configured for coupling with one or more elements of the panel operation component 8. It is also recognized that the trigger mechanism 103 can be provided as an off-the-shelf item, i.e. provided separate one or more other components of the actuation system 101. In this manner, the trigger mechanism 103 can be provided as a replacement part for the actuation system 101, in the event of deployment of the actuation system 101.

Figure 1I:
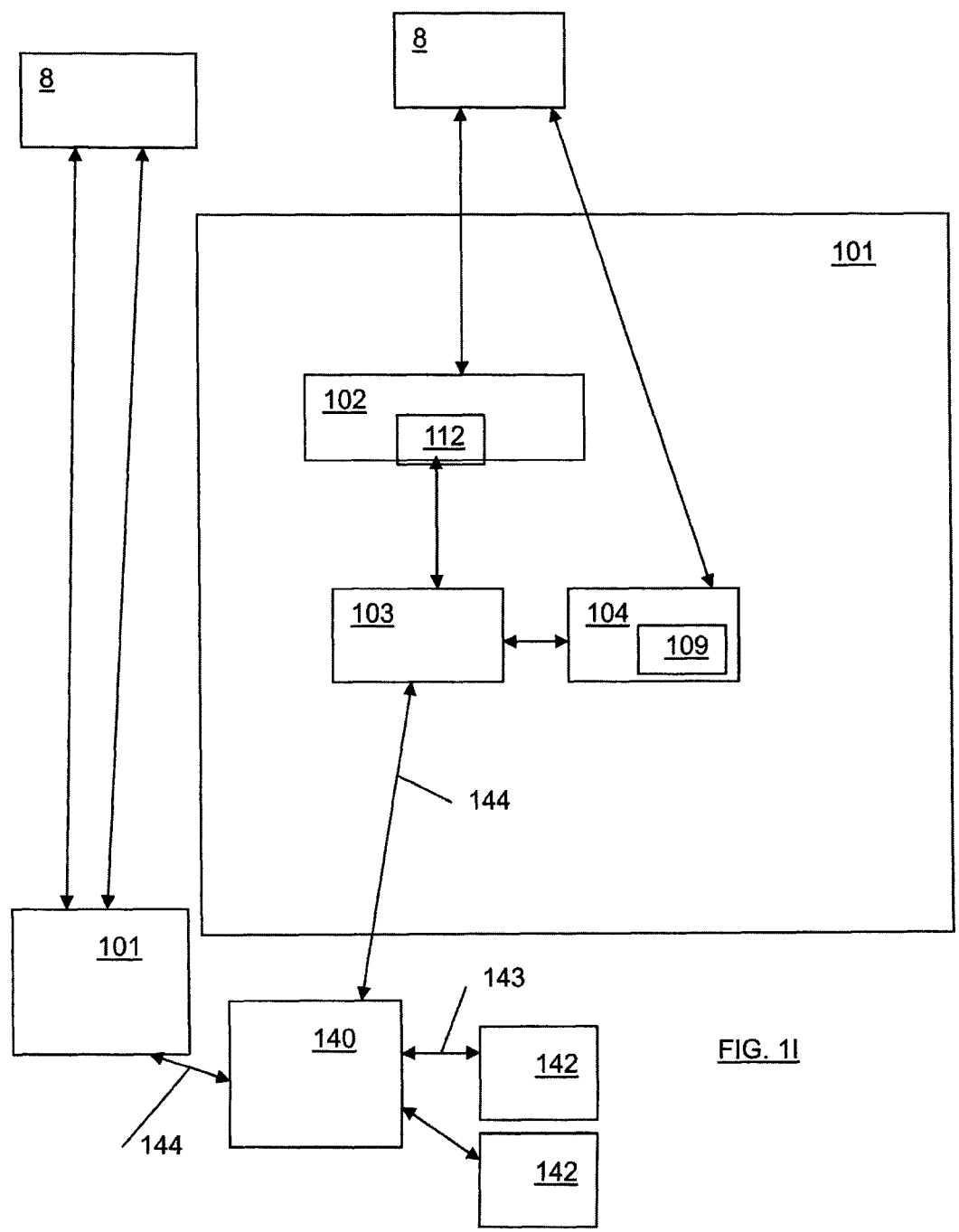
FIG. 1I is a block diagram of a still further example embodiment for components of the safety actuation system of FIG. 1A.

As shown in FIG. 1I, the actuation system 101 can include the mechanical energy storage device 102 provided as a source of mechanical potential energy used to actuate operation of the panel operation component 8 in emergency situations. Alternatively, the mechanical energy storage device 102 can provide a source of mechanical potential energy used to bypass operation of the panel operation component 8, for example when moving the closure panel 6 towards the open position (e.g. in a partially open configuration) in emergency situations. The actuation system 101 can also have the trigger mechanism 103 that can be used to engage or otherwise deploy the mechanical energy storage device 102 with the panel operation component 8, in order to actuate operation of the panel operation component 8 to cause the closure panel 6 to move away from the closed position and towards the open position, or as discussed by example above to cause the closure panel 6 to move away from the open position and towards the closed position. Alternatively, the trigger mechanism 103 can be used to engage or otherwise deploy the mechanical energy storage device 102 with the panel operation component 8 to bypass operation of the panel operation component 8, while at the same time move the closure panel 6 away from the closed position and towards the open position, or as discussed by example above to cause the closure panel 6 to move away from the open position and towards the closed position.

Preferably, the actuation system 101 is configured to couple to the panel operation component 8 without affecting the conventional operation of the panel operation component 8. Further, preferably the actuation system 101, after deployment, can be reset for subsequent deployment without having to replace the mechanical energy storage device 102 (i.e. the mechanical energy storage device 102 can be reset from a secondary position once deployed to a primary or reference position), as further described below. Preferably, the trigger mechanism 103 is replaceable once the mechanical energy storage device 102 has been deployed, replaced as part of the reset process of the mechanical energy storage device 102. Alternatively, the trigger mechanism 103 can also be resettable during reset of the mechanical energy storage device 102 from the secondary position once deployed to the primary or reference position. As discussed above, it is also recognized that rather than the actuation system 101 used to affect movement of the closure panel 8 between the open and closed positions, a further embodiment application of the actuation system 101 is for use in plastically deforming the shape and/or structural integrity of the closure panel 8 for emergency situations.

Referring again to FIG. 1A, the closure panel 6 can be configured as a hood panel of the vehicle 4, such that each hinge 98 and respective actuation system 101 is configured as a hinge assembly 94, and the latch 100 and actuation system 101 is configured as a latch assembly 10.

Figure 1J:
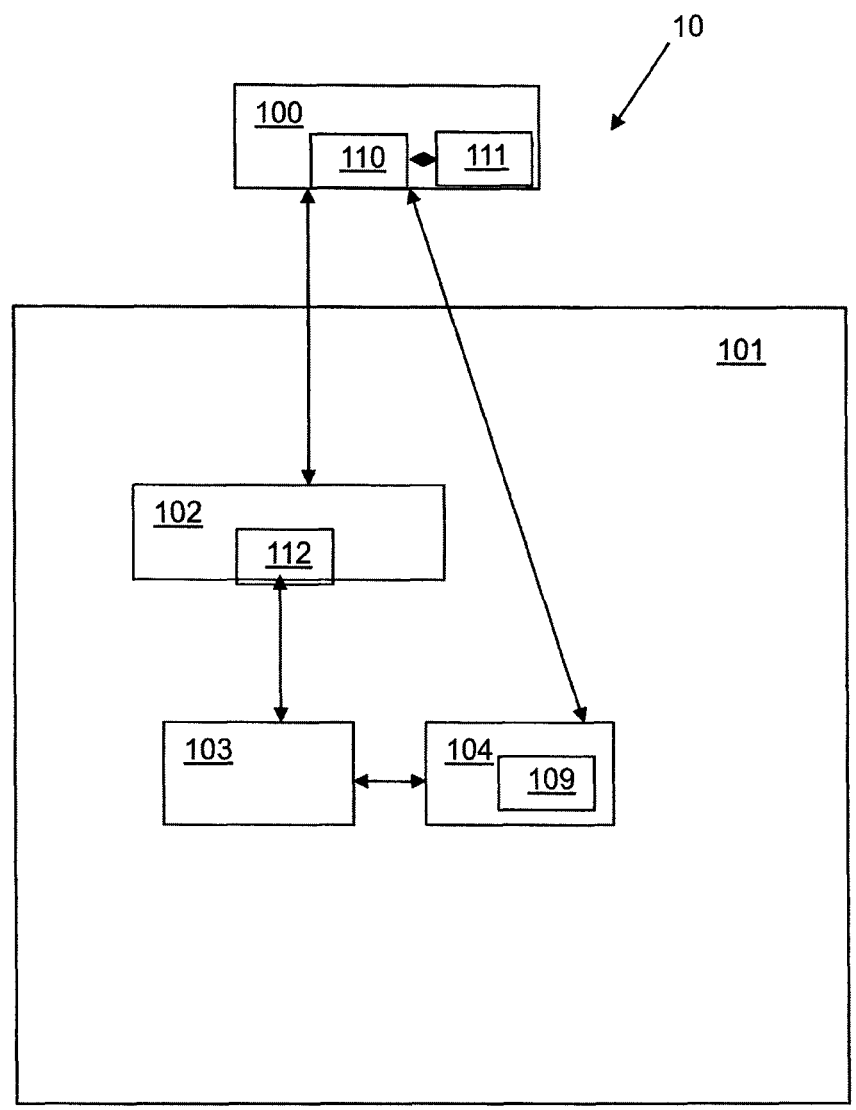
FIG. 1J is a block diagram of a still further example embodiment for components of the safety actuation system of FIG. 1A.

Referring to FIGS. 1A and 1J, one example embodiment is a latch assembly 10 for driving the closure panel 6 from the closed panel position to the open panel position. The latch assembly 10 comprises a latch mechanism 100 having a first latch element 110 for retaining a mating latch component 96 in a latched position and for moving the mating latch component 96 from the latched position to an unlatched position when released, the movement of the first latch element 110 biased towards the unlatched position by a latch biasing element 111. Also included is an actuation system 101 having: a mechanical energy storage system having a device 102 for storing mechanical potential energy for assisting the latch biasing element 111 in moving the mating latch component 96 from the latched position to the unlatched position; a mechanical advantage system 104 having a plurality of advantage elements 109 for engaging at least one of the latch element 110 or the mating latch component 96, such that movement of the plurality of advantage elements 109 is associated with a trigger force and cooperation of the plurality of advantage elements 109 during said movement provides for amplification of the trigger force as an initiating force to release the stored mechanical potential energy; and a trigger system 103 configured to provide the trigger force to release the stored mechanical potential energy.

For example, the mating latch component 96 can be associated with the closure panel 6 and the latch assembly 10 can further include a mounting plate (not shown) for mounting the latch assembly 10 to the body 5 of the vehicle 4 having the closure panel 6. Alternatively, the mating latch component 96 can be associated with the body 5 of the vehicle 4 having the closure panel 6 and the latch assembly 10 includes a mounting plate (not shown) for mounting the latch assembly 10 to the closure panel 6.

As further discussed below, the latch mechanism 100 can further include a second latch element 110 for holding the first latch element 110 in the latched position. For example, the trigger mechanism can be configured to actuate movement of the second latch element 110 in order to release the first latch element 110 from the latched position (e.g. ratchet and pawl design). Another example configuration of the latch mechanism is where the first latch element 110 contacts the mating latch component 96, e.g. the first latch element 110 is a ratchet and the mating latch component 96 is a striker. Further, the second latch element 110 can holding the first latch element 110 in the latched position and the second latch element is a pawl.

In term of the trigger mechanism 103, the trigger mechanism can be configured to actuate movement of the first latch element 110 in order to release the first latch element 110 from the latched position. In conjunction with the mechanical advantage system 104, the trigger mechanism 103 can be configured to provide the trigger force via the plurality of advantage elements 109 to the mechanical energy storage system to release the stored mechanical potential energy from the device 102, which in turn causes the release of the first latch element 110. Alternatively, the trigger mechanism 103 can be configured to first provide the trigger force to cause the release of the first latch element 110 and then second to the mechanical energy storage device 102 (e.g. via the plurality of advantage elements 109) to release the stored mechanical potential energy.

An example of the plurality of advantage elements 109 includes a first advantage member (e.g. cam lever 204 in FIG. 5) pivotally mounted at a first location and configured to force the mating latch component 96 towards the unlatched position when pivoted. The plurality of advantage elements 109 can include a second advantage member (e.g. cam lever 210 in FIG. 5) pivotally mounted to the first advantage member at a second location, the first location and the second location offset from one another. In this example, the second advantage element can be coupled to the mechanical energy storage device 102, such that release of the stored mechanical potential energy causes pivoting of the first advantage member. Alternative embodiments of the advantage elements 109 are shown in FIG. 8C.

As discussed below, the mechanical energy storage device 102 can be configured to deliver the stored mechanical potential energy during movement of the device 102 from a second position to a first position within the actuation system 101. An example of the mechanical energy storage device 102 includes a weighted object that moves due to gravity from the second position to the first position to provide/release the stored mechanical potential energy. A further example is the device as a biasing member (e.g. spring) that moves from the second position to the first position to provide/release the stored mechanical potential energy. The actuation system 101 can be configured as reusable by returning the device 102 to the second position from the first position, such that the replacement of the trigger system 103 provides for retaining of the device 102 in the second position once returned.

A further example of the mechanical energy storage device 102 is a pneumatically actuated piston that uses application of pressurized gas (stored as a pressurized charge) to produce mechanical motion, i.e. displacement of the one or more components of the mechanical energy storage device 102 from a first position to a second position as the mechanical potential energy contained in the pressurized gas is released.

Figure 1K:
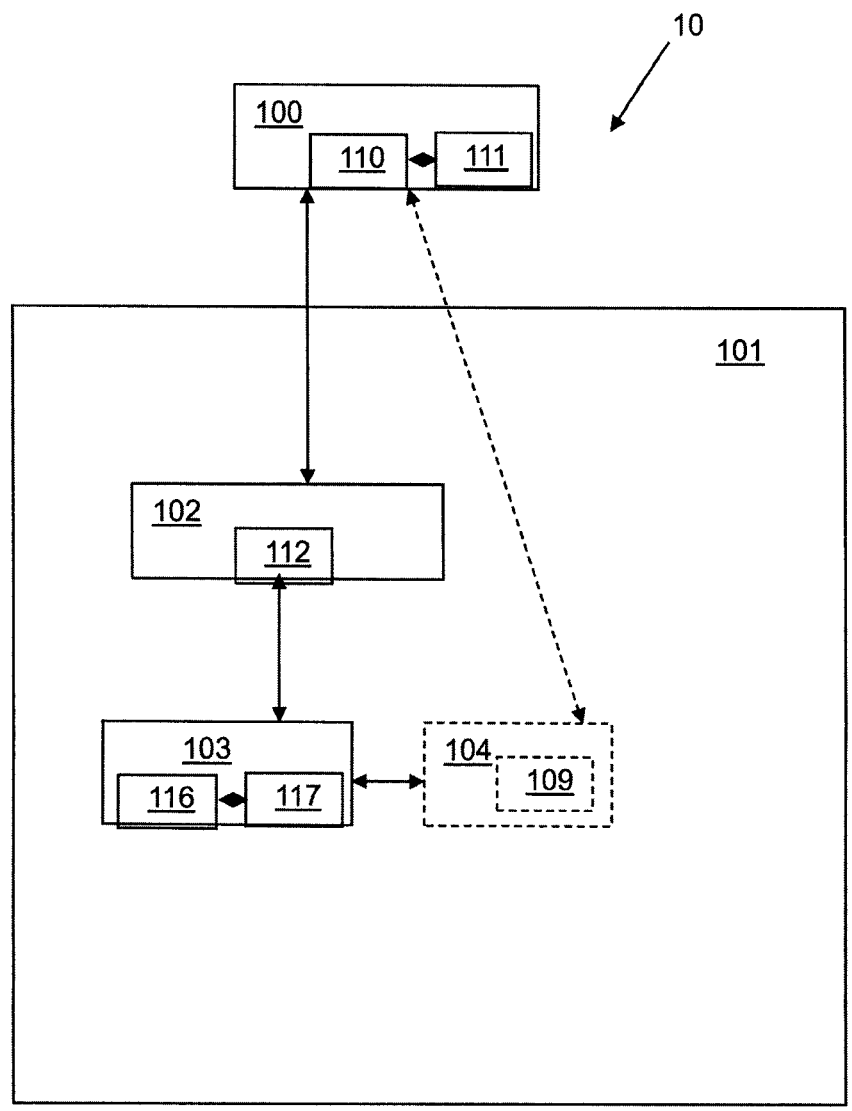
FIG. 1K is a block diagram of a still further example embodiment for components of the safety actuation system of FIG. 1A.

Referring to FIGS. 1A and 1K, shown is a 3 component latch assembly 10 using latch operation with post deployment use, such that the mechanical advantage system 104 can be optional. The latch assembly 10 is configured for driving the closure panel 6 from the closed panel position to the open panel position. The latch assembly includes the latch mechanism 100 having the first latch element 110 for retaining the mating latch component 96 in a latched position and for moving the mating latch component 96 from the latched position to an unlatched position when released, the movement of the first latch element 110 biased towards the unlatched position by the latch biasing element 111. Also included is the actuation system having: the mechanical energy storage system having the device 102 configured for storing mechanical potential energy for assisting the latch biasing element 110 in moving the mating latch component 96 from the latched position to the unlatched position; and the trigger system 103 configured to provide a trigger force to release the stored mechanical potential energy, the stored mechanical potential energy being released during movement of the device 102 from the second position to the first position; wherein the mechanical energy storage system is configured as resettable for subsequent deployment by returning the device 102 to the second position from the first position.

Optionally, the latch assembly 10 can include the mechanical advantage system 104 having the plurality of advantage elements 109 for engaging at least one of the latch element 110 or the mating latch component 96, such that movement of the plurality of advantage elements 109 is associated with the trigger force and cooperation of the plurality of advantage elements 109 during the movement provides for amplification of the trigger force as an initiating force to release the stored mechanical potential energy.

In terms of the trigger system 103, this can be configured as a one-time use component and is therefore replaceable for a subsequent deployment of the mechanical energy storage system. An example embodiment of the trigger system 103 is using a destructive element 116 for destroying a retaining element 117, as further described below. In this manner, once replaced as a new the trigger system 103 having a new retaining element 118, the replacement of the trigger system 103 (post deployment of the actuation system 101) with the new trigger system 103 provides for retaining of the device 102 in the second position once returned.

As an example configuration, the latch assembly 10 of FIG. 1K can have the mating latch component 96 associated with the body 5 of the vehicle 4 and the latch assembly 10 further includes a mounting plate (not shown) for mounting the latch assembly 10 to the closure panel 6.

Figure 1L:
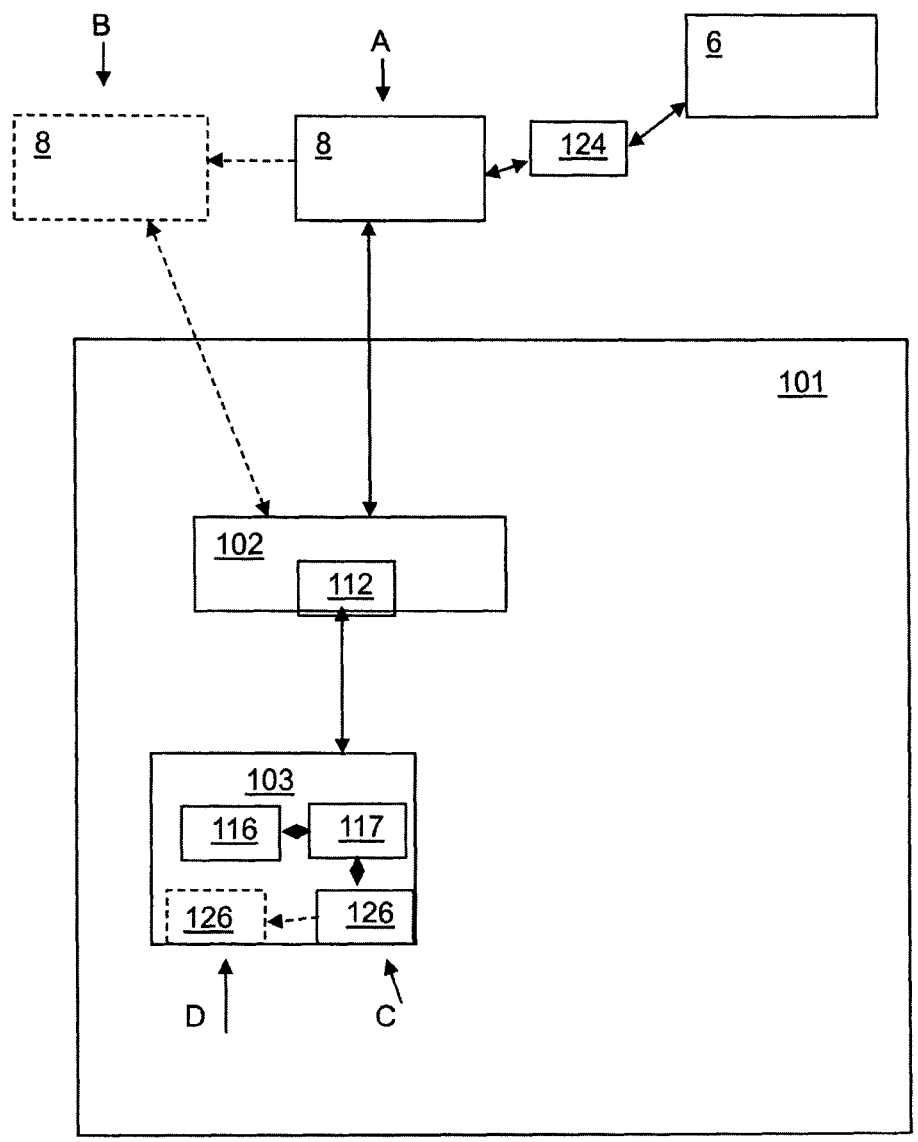
FIG. 1L is a block diagram of a still further example embodiment for components of the safety actuation system of FIG. 1A.

Referring to FIGS. 1A and 1L, shown is an example panel operation assembly 119 for bypassing operation of the panel operation component 8 (e.g. hinge 98 or latch 100). The panel operation assembly 119 assists in movement of the closure panel 6 of the vehicle 4 from the closed panel position to the open panel position. The panel operation assembly 119 includes a panel operation component 8 having a mounting portion 124 (e.g. frame 699—see FIG. 16 or frame 105—see FIGS. E-H) for mounting the panel operation component 8 relative to the closure panel 6, the panel operation component 8 configured to operatively move the closure panel 6 between the closed panel position and the open panel position. Also included is the actuation system 101 coupled to the panel operation component 8 and configured for mounting on the body 5 of the vehicle 4. The actuation system 101 has: a mechanical energy storage system having the device 102 configured for storing mechanical potential energy for displacing the panel operation component 8 from a first component position A to a second component position B spaced apart from the first component position A, the second component position B corresponding to the open panel position for the closure panel 6, the release of the stored mechanical potential energy actuated by a trigger force, such that the displacement of the panel operation component 8 bypasses the operation of the panel operation component 8; and the trigger system 103 configured to provide the trigger force to release the stored mechanical potential energy, the trigger system 103 including a trigger biasing element 126 and the retaining element 117, such that destruction of the retaining element 117 provides for the trigger force as a result of the trigger biasing element 126 moving from a first trigger position C to a second trigger position D.

For example, the panel operation component 8 can be the latch mechanism 100 (see FIG. 1K) containing the first latch element 110 for retaining the mating latch component 96 of the closure panel 6 in a latched position and for moving the mating latch component 96 from the latched position to an unlatched position when released, the movement of the first latch element 110 biased towards the unlatched position by the latch biasing element 111. An alternative embodiment is where the panel operation component 8 is the hinge 98 coupling the closure panel 6 to the body 5.

Figure 1M:
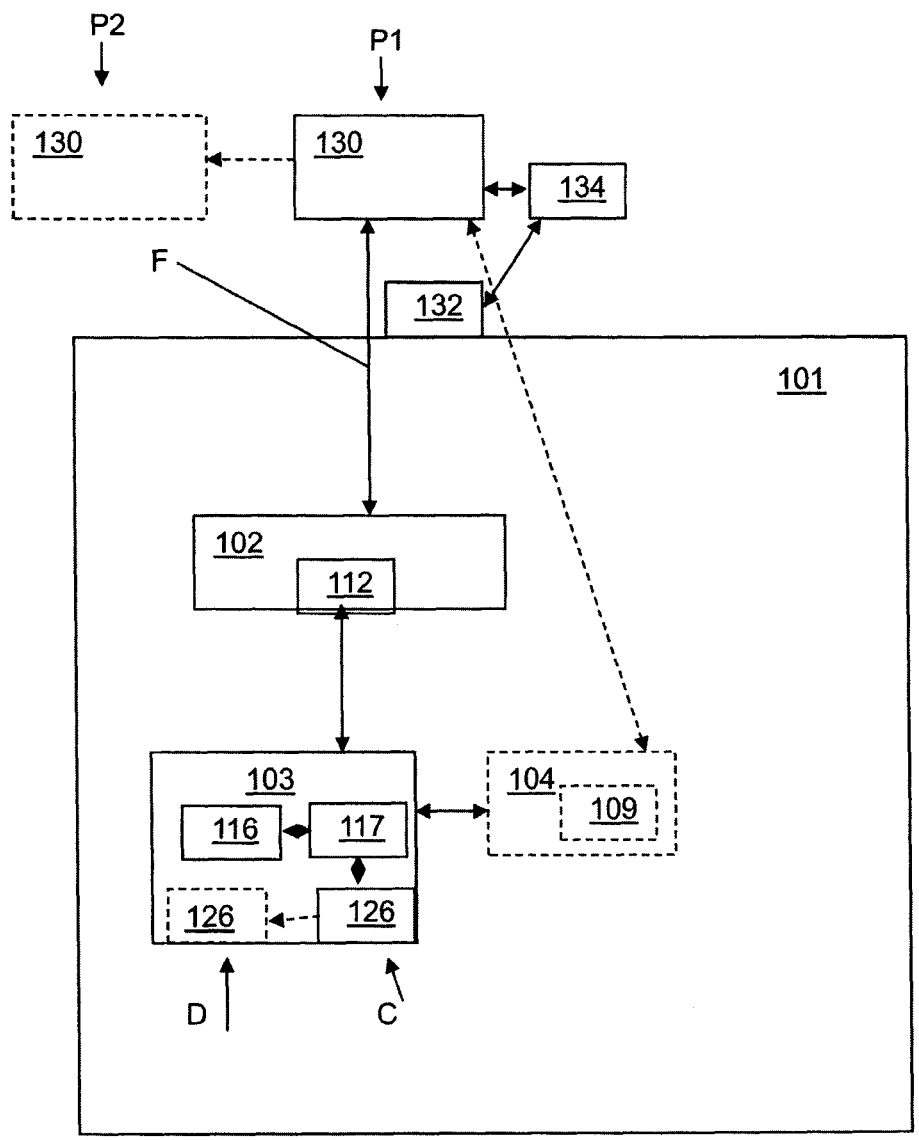
FIG. 1M is a block diagram of a still further example embodiment for components of the safety actuation system of FIG. 1A.

Referring to FIGS. 1A and 1M, shown is an example actuation mechanism 101 with an optional mechanical advantage system 104. The actuation mechanism 101 is configured for releasing stored mechanical potential energy as an application force F for acting on an adjacent object 130 (e.g. panel operation component 8—see FIG. 1L, closure panel 6, etc.). The actuation mechanism 101 can include: a mounting portion 132 configured for mounting the actuation system 101 to a mounting surface 134 associated with the adjacent object 130; a mechanical energy storage system having the device 102 configured for storing mechanical potential energy for displacing the adjacent object 130 from a first position P1 to a second position P2, the release of the stored mechanical potential energy actuated by a trigger force; and the trigger system 103 configured to provide the trigger force to release the stored mechanical potential energy, the trigger system including the trigger biasing element 126 and the retaining element 117, such that destruction of the retaining element 117 provides for the trigger force as a result of the trigger biasing element 126 moving from the first trigger position C to the second trigger position D.

One example is where the mounting portion 132 is a linkage member (e.g. see member 210 of FIG. 8A) for connecting to the adjacent object 130, such that the application force is applied to the adjacent object 130 via the linkage member. In one example, the linkage member can be a cable. In terms of the mounting portion 132, this can be configured to attach to the mounting surface 134 of a latch 100 (e.g. plate 12 of FIG. 2), such that the adjacent object 130 is one or more latch elements 110 of the latch 100 (see FIG. 1K.

Alternatively, the mounting surface 134 can be on the body 5 of the vehicle 4 having the closure panel 6, such that the adjacent object 130 is a panel operation component 8 configured for operatively moving the closure panel 6 between the closed panel position and the open panel position. In one example, the panel operation component 8 is the latch mechanism 100 containing the first latch element 110 (see FIG. 1K) for retaining the mating latch component 96 of the closure panel 6 in a latched position and for moving the mating latch component 96 from the latched position to an unlatched position when released, the movement of the first latch element 110 biased towards the unlatched position by the latch biasing element 111.

For example, the displacement of the panel operation component 8 can be such that the displacement of the panel operation component 8 bypasses the operation of the panel operation component 8 (e.g. hinge 98 remains unused or latch mechanism 100 remains latched).

Alternatively, the mounting surface 134 can be on a frame (e.g. frame 105—see FIGS. 1E-H) of a hinge assembly 94 and the adjacent object 130 is a hinge 98 coupled to the closure panel 6, such that the application force F is applied indirectly to the hinge 98 via the frame 105.

Alternatively, the adjacent object can be a material component 103 (see FIG. 1D) of the closure panel 6. The material component 103 can be a structural member as part of the closure panel 6.

Further, the actuation mechanism 101 can have the mechanical advantage system 104 having the plurality of advantage elements 109 for engaging at least said one or more latch elements 110 or mating latch component 96 cooperating with the one or more latch elements 110, such that movement of the plurality of advantage elements 109 is associated with the trigger force and cooperation of the plurality of advantage elements 109 during the movement provides for amplification of the trigger force as an initiating force to release the stored mechanical potential energy of the device 102.

Figure 1N:
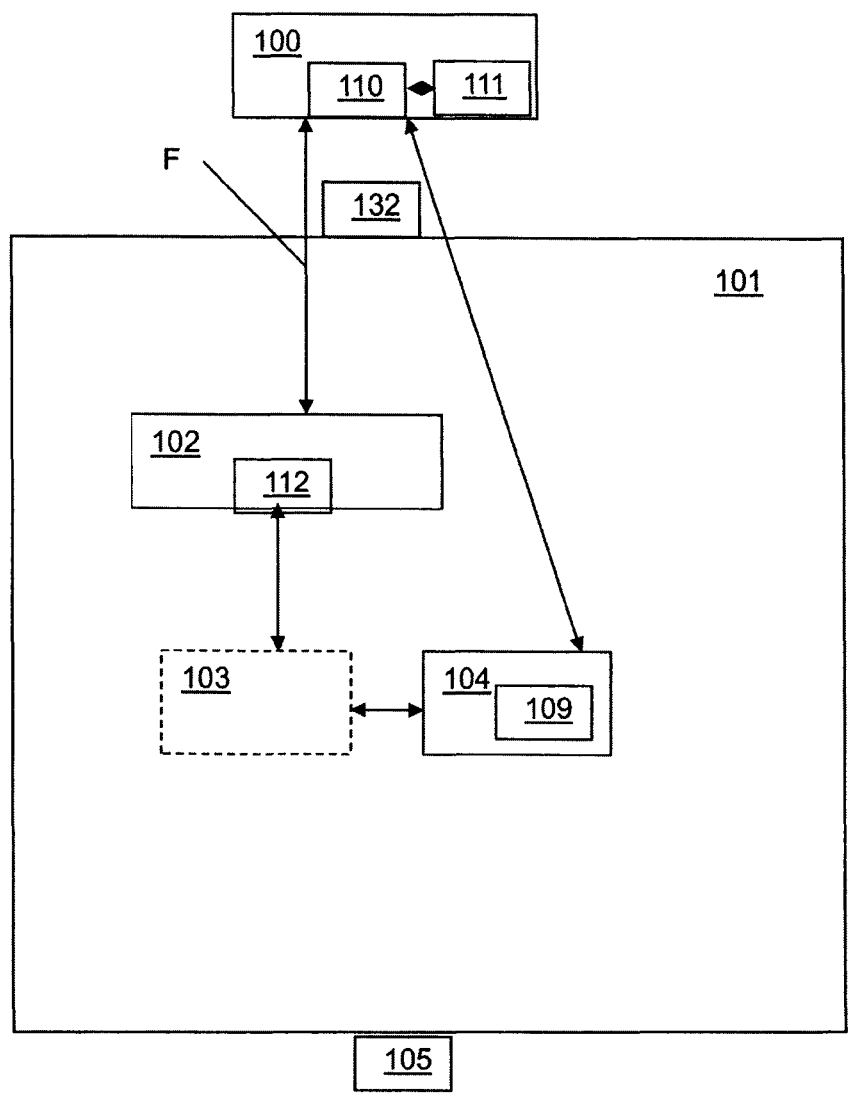
FIG. 1N is a block diagram of a still further example embodiment for components of the safety actuation system of FIG. 1A.

Referring to FIGS. 1A and 1N, shown is an example actuation mechanism 101 with the mechanical advantage system 104 and an optional trigger system 103. The actuation mechanism 101 is configured for releasing stored mechanical potential energy as an application force F when acting on the latch mechanism 100, the latch mechanism 100 having a first latch element 110 for retaining a mating latch component 96 in a latched position and for moving the mating latch component 96 from the latched position to an unlatched position when released. The actuation mechanism includes: the mounting portion 132 configured for coupling the actuation system 101 to the latch mechanism 100; a mechanical energy storage system having the device 102 configured for storing mechanical potential energy for driving the mating latch component 96 from the latched position to the unlatched position, the release of the stored mechanical potential energy associated with a trigger force; and the mechanical advantage system 104 having the plurality of advantage elements 109 for engaging the first latch element 110 or the mating latch component 96, such that movement of the plurality of advantage elements 109 is associated with the trigger force and cooperation of the plurality of advantage elements 109 during said movement provides for amplification of the trigger force as an initiating force to release the stored mechanical potential energy.

The actuation mechanism 101 can optionally include the trigger system 103 as a replaceable system (post deployment of the stored mechanical potential energy) configured to provide the trigger force to release the stored mechanical potential energy, the trigger system including the trigger biasing element 126 and the retaining element 117, such that destruction of the retaining element 117 provides for the trigger force as a result of the trigger biasing element 126 moving from a first trigger position C to a second trigger position D (see FIG. 1M).

The actuation mechanism 101 can have a frame 105 for connecting the actuation mechanism 101 to the body 5 of the vehicle 4 having the closure panel 6 having the mating latch component 96. As discussed above, the latch mechanism 100 can be configured for operatively moving the closure panel 6 between the closed panel position and the open panel position, such that the movement of the first latch element 110 is biased towards the unlatched position by the latch biasing element 111.

Further as discussed above, the mechanical energy storage system can be configured as reusable by returning the device 102 for the stored mechanical potential energy to a second position from a first position, such that the replacement of the trigger system 103 provides for retaining of the device 102 in the second position once returned.

Figure 1O:
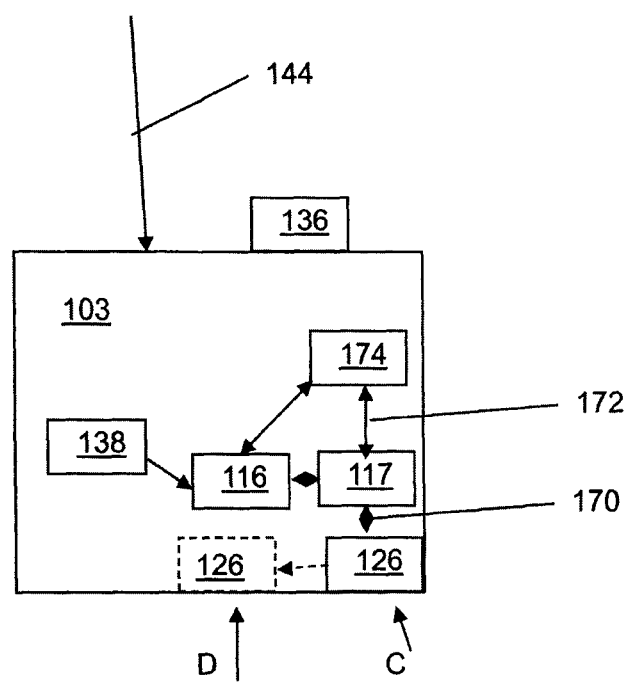
FIG. 1O is a block diagram of a still further example embodiment for components of the safety actuation system of FIG. 1A.

Referring to FIGS. 1A, 1I and 1O, shown is an example trigger mechanism 103 (e.g. as a replacement cartridge for the actuation system 101). The trigger system 103 is configured for releasably coupling to the actuation mechanism 101 having stored mechanical potential energy. The trigger system includes: a mounting portion 136 configured for mounting to the trigger system interface 112 of the actuation system 101; the destructive element 116; and the trigger biasing element 126 coupled to the restraining element 117, such that destruction of the restraining element 117 provides for release of the trigger biasing element 126 to move from the first trigger position C to the second trigger position D.

For example, the trigger biasing element 126 can be a spring (e.g. coil spring, torsion spring, etc) as further described below. For example, the restraining element 117 can be a wire or filament under tension. A further example of the trigger biasing element 126 is a pneumatically actuated piston that uses application of pressurized gas (stored as a pressurized charge) to produce mechanical motion, i.e. displacement of the one or more components of the mechanical energy storage device 102 from a first trigger position to a second trigger position as the mechanical potential energy contained in the pressurized gas is released.

In terms of the destructive element 116, this can be configured to be actuated by a switch 138 or other electronically activated element (e.g. MOSFET or other relay) to damage a structural integrity of the restraining element 117, such that the release of the trigger biasing element 126 is a result of a loss of tension in the restraining element 117 due to a decrease in the structural integrity caused by the damage caused by the destructive element 116. One example of the destructive element 116 is configured to damage a structural integrity of the restraining element 117 (e.g. wire), such that the release is a result of a loss of said tension in the restraining element 117 due to a decrease in the structural integrity caused by said damage. For example, the destructive element 116 can be configured to cause plastic deformation in one or more portions of the restraining element 117. This plastic deformation can be caused by mechanical impact of the destructive element 116 with the one or more portions of the restraining element 117 (e.g. nicking or otherwise cutting or pinching a cross sectional area of a wire). For example, the destructive element 116 can be mechanically actuated and the plastic deformation due to mechanical impact between the destructive element and the one or more portions of the restraining element 117.

Alternatively, the destructive element 116 can be electronically actuated and the plastic deformation due application of a current as the destructive element 116 to the one or more portions of the restraining element 117. Current introduced into the restraining element 117 (e.g. via the switch 138) can cause a softening of the restraining element 117 material due to heating (or burning) of the restraining element 117 material, which can cause plastic deformation of the material. In an extreme case, the current introduced into the restraining element 117 (e.g. via the switch 138) can cause softening of the restraining element 117 material to the point of material melting or vaporization, also referred to as plastic deformation of the material which could occur shortly before the material melts or vaporizes. Alternatively, the destructive element 116 can be electronically actuated and include a heating element positioned adjacent to the one or more portions of the restraining element 117, such that heating of the heating element causes a corresponding heating of the one or more portions of the restraining element 117.

A further example of the restraining element 117 is a magnet (see FIG. 1O), which can be used to restrain activation of the trigger biasing element 126 (i.e. travel of the trigger biasing element 126 from the first trigger position to the second trigger position). The magnet 117 (e.g. permanent magnet) can be of a sufficient magnetic field strength to hold the trigger biasing element 126 stationary (e.g. a restraining force 170 of the restraining element 117 can be a magnetic field acting on a firing member 328—see FIG. 8B—coupled to the trigger biasing element 126). In order to destroy the magnetic attraction of the magnetic field force 170 with the trigger biasing element 126, application of current (e.g. signal 144—see FIG. 1I by the destructive element 116 can provide a reverse magnetic flux 172 (e.g. via an electromagnet 174) to the magnet 117, such that the magnetic attraction between the magnetic field 170 and the trigger biasing element 126 is decreased to allow the travel of the trigger biasing element 126 from the first trigger position to the second trigger position. As such, the destructive element 116 can be a pair of contacts coupled to the electromagnet 174, configured to receive a current (e.g. signal 144) and the energize the electromagnet to reduce the magnetic field force 170 with the trigger biasing element 126 used to retain the trigger biasing element 126 in the first trigger position.

Alternatively, the destructive device 116 can be a movable permanent magnet 174, such that application of the current (e.g. signal 144) to the destructive device 116 causes the destructive device 116 to bring or otherwise move (e.g. via a suitable mechanical device—e.g. electrical step motor) the permanent magnet 174 closer to the magnet of the retaining element 117. As such, the polarity of the permanent magnet 174 could be opposite to the polarity of the magnet of the retaining element 117, thus also providing for a lessening or reversal in the magnetic field 170 to result in a release of the trigger biasing element 126 held in the first trigger position by the retaining element 117, due to interaction between the opposite polarities of the magnets 117,174 as they are brought into proximity with one another.

A further example of the trigger biasing element 126 is a pneumatically actuated piston that uses application of pressurized gas (stored as a pressurized charge) to produce mechanical motion, i.e. displacement of the one or more components of the trigger biasing element 126 from the first trigger position to the second trigger position as the mechanical potential energy contained in the pressurized gas is released during movement of the trigger biasing element 126.

As noted above, the trigger system 103 can be configured as a one-time use component and be replaceable for a subsequent activation of the actuation system, such that the trigger system is releasably coupled to the trigger system interface of the actuation mechanism. Replacement of the trigger assembly 103 can be for all of the trigger assembly 103 components (e.g. 116, 117, 126, 136) and/or one or more selected components. For example, replacement of the trigger system 103 can be defined as replacing the destroyed restraining element 117 while retaining one or more of the other components (e.g. 116, 126, 136) of the trigger system 103. In terms of the restraining element 117 configured as the magnet, it is recognized that this embodiment is reusable as it is only the magnetic field strength 170 used to restrain movement of the trigger biasing element 126 that is destroyed (e.g. lessened or otherwise reversed due to the energized electromagnet 174 or movable permanent magnet 174).

A further embodiment is a trigger system 103 configured for providing a trigger force, the trigger system 103 comprising: the mounting portion 136 configured for mounting to a system (e.g. actuation system 101) configured to receive the trigger force; a destructive element 116; and a trigger biasing element 126 coupled to a restraining element 117, such that destruction of the restraining element 117 provides for release of the trigger biasing element 126 to move from the first trigger position C to the second trigger position D.

It is also recognized that the triggering elements of 116,117 in the trigger system 103 can be substituted for an electronically actuated solenoid to provide for the trigger force by providing for release of the trigger biasing element 126 to move from the first trigger position C to the second trigger position D (e.g. the electronically actuated solenoid is the restraining element 117 and/or moves a detent restraining the trigger biasing element 126 from moving). Alternatively, the restraining element 117 can be a chemically or explosively activated removal of a detent (e.g. the restraining element 117 itself) or a detent that is moved or destroyed that is restraining the trigger biasing element 126 from moving. In this manner, replacement of the entire trigger system 103 (once deployed) can be done. Alternatively, at least the restraining element 117 of the trigger system 103 can be replaced, once deployed, in order to provide for a newly configured trigger system 103 that facilitated resetting of the actuation mechanism 101 for subsequent deployment.

Figure 1P:
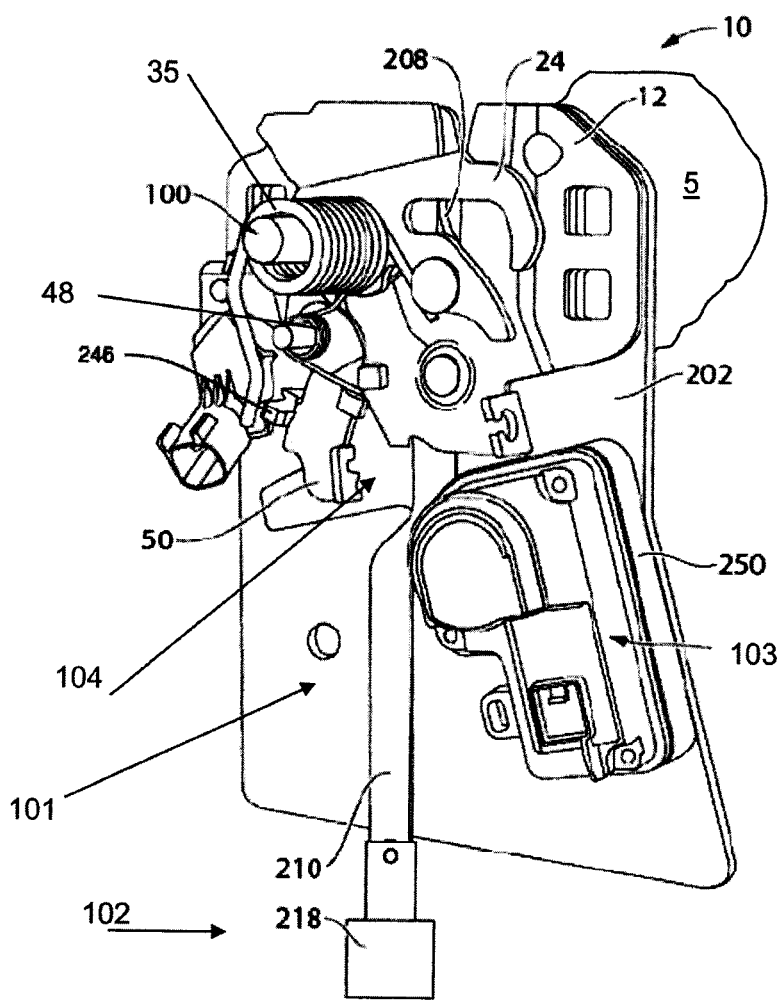
FIG. 1P is a front perspective view of an active pedestrian protection (APP) latch assembly with some elements omitted from view for greater clarity, the APP latch comprising a hood latch in combination with an emergency pop-up mechanism.

Referring to FIG. 1P is a front elevation of an embodiment of an active pedestrian protection (APP) latch assembly 10 (e.g. hood). It will be noted that some components of the latch assembly 10 are not shown in FIG. 1P but are shown in other figures. In order to reduce manufacturing costs, the latch assembly 10 can be advantageously constructed (e.g. modularly) as: a latch 100, shown in isolation in FIGS. 2-4; the mechanical energy storage system 102 provided as a source of mechanical potential energy used to actuate the latch 100 from a first latch position (e.g. fully locked position) to second latch position (e.g. an open position or a partially unlatched position); a optional mechanical advantage system 104 for providing force amplification during opening of the latch 100, such that the mechanical advantage system 104 includes two or more mechanical devices (e.g. one or more levers, one or more gears, one or more pulleys, one or more inclined planes (e.g. screws)) cooperating to preserve an initial latch input force and trade off forces against movement to obtain a desired amplification in the initial latch input force as a latch output force; and a trigger mechanism 103 (e.g. emergency pop-up mechanism), shown in isolation by example in FIGS. 5-7F. In general, the trigger mechanism 103 can be configured to couple to the latch 100 without affecting the conventional operation of the latch 100 (e.g. for routine access to an engine bay 13 of a vehicle 4—see FIG. 1A) as discussed in greater detail below. FIG. 2 and FIGS. 8A-9C and FIGS. 10A-10B show different embodiments of a loading device 218 that can be part of the mechanical energy storage system 102, such that the loading device 218 (e.g. weight, spring, etc.) is an element of the mechanical energy storage system 102 that provides for a release of the mechanical potential energy used to operate the latch 100.

In the case of a hood latch 100, operation of the latch 100 via the mechanical potential energy provides for a resultant hood force 106 (see FIG. 7A) that drives a hood 6 (e.g. closure panel) of a vehicle 4 (FIG. 1A) upwardly in response to the release of the mechanical energy from the mechanical energy storage system 102. Referring to FIG. 1P, shown is an example application of the latch assembly 10 for interacting with a striker 96 (e.g. mating latch component) of a hood 6, which is pivotally connected as a cover to the engine bay 13 via a hinge assembly 94 (see FIG. 1A). As further described below, in reference to FIG. 1A, the mechanical energy storage system 102 and associated trigger mechanism 103 can also be configured as a hinge release mechanism embodiment of the actuation system 101, when coupled to the hinge assembly 94. In general, the trigger mechanism 103 is configured to couple to the hinge assembly 94 without affecting subsequent conventional operation of the hinge assembly 94 (e.g. for routine access to the engine bay 13 of the vehicle 4), as further discussed below.

In general, the mechanical energy storage system 102 of the actuation system 101 provides a source of mechanical potential energy, which can be defined as potential energy of an object (or objects) in the system due to the position of the object(s) within the system. As discussed below, the latch assembly 10 is one example configuration using the mechanical potential energy stored in the mechanical energy storage system 102 to operate the latch 100 to one or more positions between the first latch position to the second patch position (one example is where the mechanical potential energy is used to help force the latch mating component 96 (e.g. striker bar) from the first latch position to the second patch position. Also as further described below, another example configuration is using mechanical potential energy stored in the mechanical energy storage system 102 to move the hinge assembly 94 (see FIG. 1A) from a first hinge position to a second hinge position.

Examples of mechanical potential energy of the mechanical energy storage system 102 are energy associated with restoring forces of a force field, such as a biasing element (e.g. spring) or the force of gravity. As such, the action of stretching/compressing the object (e.g. biasing element) or lifting the object (e.g. a weight) is performed by an external force that works against a force field of the respective potential and thereby changes the portion of the object from a first position to a second position within the force field. This work is stored in the force field, which is said to be stored as the mechanical potential energy of the mechanical energy storage system 102. If the external force is removed (e.g. removal of the element of the system holding the object at the second position), the force field acts on the object to perform the work as it moves the object back to the initial position, e.g. reducing the stretch/compression of the object (e.g. spring) or causing the object (e.g. a weighted body) to fall. Accordingly, the mechanical potential energy can be defined as the energy difference between the potential energy of the object in a given position (e.g. second position) and its energy at a reference position (e.g. first position), such that release of the stored mechanical potential energy is a consequence of the object returning from the second position to the first position. One example release mechanism for the object in the mechanical energy storage system 102 is the trigger mechanism 103.

As discussed above, gravitational energy is an example of the mechanical potential energy associated with gravitational force, as work is required to elevate object(s) (e.g. weight) against Earth's gravity (i.e. force field). The mechanical potential energy due to elevated positions is called gravitational potential energy. A further example of the mechanical potential energy is elastic energy, which can be defined as the mechanical potential energy of an elastic object (e.g. a biasing element such as a spring, a band, etc that can be compressed or stretched from a first position to a second position) that is deformed under tension or compression (or stressed). The elastic energy arises as a consequence of the force of the elastic object that tries to restore the object to its original shape. For example, if a stretched/compressed position (e.g. second position) of the elastic object is released, the energy can be transformed into kinetic energy as the elastic object returns to its original shape at the unstretched/uncompressed position (first position), also referred to as a reference position. An example of a biasing element (e.g. also referred to as elastic object) can be a spring, such that when the spring is compressed or stretched, the force it exerts is proportional to its change in length. The rate or spring constant of the spring is the change in the force it exerts, divided by the change in deflection of the spring. Springs can be classified depending on how the load force is applied to them, such as but not limited to: tension/extension spring designed to operate with a tension load so the spring stretches as the load is applied to it; compression spring designed to operate with a compression load so the spring gets shorter as the load is applied to it; torsion spring, where unlike the load as an axial force, the load is applied as a torque or twisting force and the end of the spring rotates through an angle as the load is applied; constant spring such that the supported load will remain the same throughout deflection cycle; variable spring where resistance of the spring coil to load varies during compression; coil spring made of a coil or helix of wire which are types of torsion spring because the spring wire itself is twisted when the spring is compressed or stretched; flat spring made of a flat or conical shaped piece of metal or other material capable of elastic deformation; machined spring manufactured by machining bar stock with a lathe and/or milling operation rather than coiling wire; and cantilever spring which is fixed only at one end; torsion spring designed to be twisted rather than compressed or extended.

It is further noted that the mechanical energy storage system 102 contains stored mechanical potential energy rather than chemical potential energy. Chemical potential energy can be defined as the kind of potential energy stored in chemical bonds, such that chemical energy of a chemical substance can be transformed to other forms of energy by a chemical reaction. As an example, when a fuel is burned the chemical energy is converted to heat energy and light energy.

Figure 2:
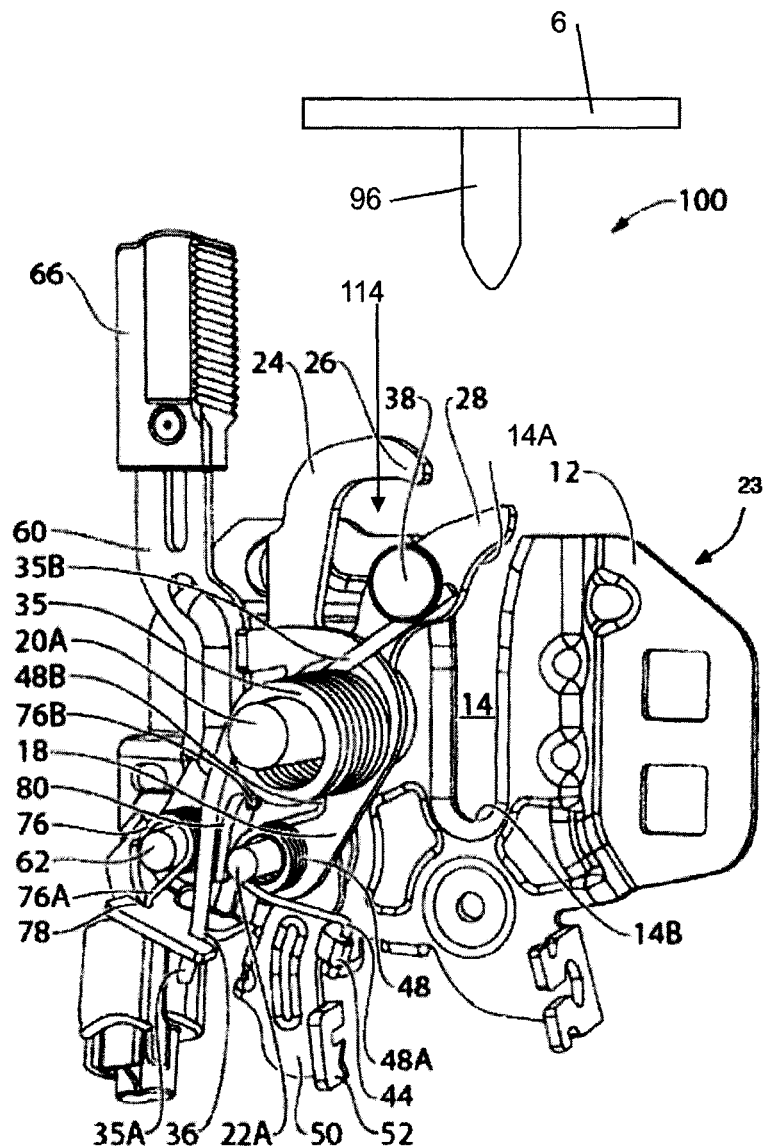
FIG. 2 is a front elevation view of the hood latch of FIG. 1 shown in isolation.

Referring initially to FIGS. 1P and 2-4, one embodiment of the latch assembly 10 includes a mounting plate 202 (similar to the frame 105 of FIGS. E-H) that can be contoured to facilitate attachment of the latch 10 to a frame (e.g. body 5) of the motor vehicle 4 (see FIG. 1A). The mounting plate 202 can be contoured to define a generally planar mounting surface and a plurality of apertures for attaching various components of the latch assembly 10 thereto. Preferably, mounting plate 202 is a stamped metal component. Coupled to the mounting plate 202 is the hood latch 100, for example via a frame mounting plate 12. Referring to FIG. 2, the mating latch component 96 (e.g. striker) is secured to the closure panel 6 (e.g. hood 10) and extends outwardly therefrom. The mating latch component 96 can be a generally U-shaped bar that is engaged by the latch 100 to latch the closure panel 6 in the closed position. The latch 100 is secured to the body 5 by mounting plate 202 (see FIG. 1P) is positioned so that the mating latch component 96 will engage the latch 100 upon the closure panel 6 reaching the closed position. It is appreciated that, alternatively, the latch 100 may be secured to the closure panel 6 and the mating latch component 96 may be secured to the body 5 of the vehicle 4. Positioned on the mounting plate 202 is a fishmouth or slot 14 for receiving the mating latch component 96 therein, in other words the slot 14 of the latch 100 is configured for receiving a keeper of the mating latch component 96. The slot 14 has an open top end 14A and a closed bottom end 14B (see FIG. 2). The latch 100 can also include a cover plate 18 (seen best in FIG. 2). The frame plate 12 and cover plate 18 can be interconnected by first and second rivets that each have respective integral shafts 20A, 22A extending beyond the cover plate 18. The frame plate 12, cover plate 18 and interconnecting rivets provide a housing 23 (FIG. 2) for the latch 100. Those skilled in the art will appreciate that a wide variety of alternative configurations may be deployed to provide the latch housing 23.

The latch 100 includes a number of latch elements 110 (e.g. a ratchet 24 and a pawl 40—see FIG. 4) that are configured to couple to the mating latch component 96 in order to retain the mating latch component 96 within the slot 14 when the closure panel 6 is in the closed position (e.g. locked). Alternatively, the latch elements 110, both of which are pivotally secured to the frame plate 12. The ratchet 28 includes an arm 26 and arm 28 spaced apart to define a generally u-shaped slot 114 there between (e.g. a hook of arm 26 and a lip of arm 28 that extends laterally beyond the hook). The ratchet 24 also includes a primary shoulder stop 32 and a pointed secondary shoulder stop 34, seen best in FIG. 4. Note that in FIG. 2 the latch 100 and ratchet 24 are shown in an open position (e.g. facilitating the release of the mating latch component 96 from the slot 114) and in FIGS. 3 and 4 the latch 100 and ratchet 24 are shown in a fully closed position (e.g. facilitating the retention of the mating latch component 96 in the slot 114) which may also be referred to as the primary closed position.

The ratchet 24 is biased to the open position as shown in FIG. 2 by a substantial torsion spring 35 that is mounted pivotally on the rivet shaft 20A and connected between the cover plate 18 and the plate 12. The torsion spring 35 is an example of a ratchet biasing member, which biases the ratchet 24 towards the open position. More particularly the torsion spring 35 has tangs 35A, 35B, for coupling with a body of the ratchet 24 and the face plate 12 or cover plate 18. The cover plate 18 features a slot 36 for receiving spring tang 35A, and the ratchet 24 includes a pin or rivet 38 for receiving spring tang 35B. The ratchet 24 moves between a unlatched position for releasing the mating latch component 96 and a latched position, such that the mating latch component 96 is received in the slot 114 and cooperates with the receiving slot 14 of the mounting plate 202. The ratchet 24 is biased to the unlatched position via a biasing member 35.

Figure 4:
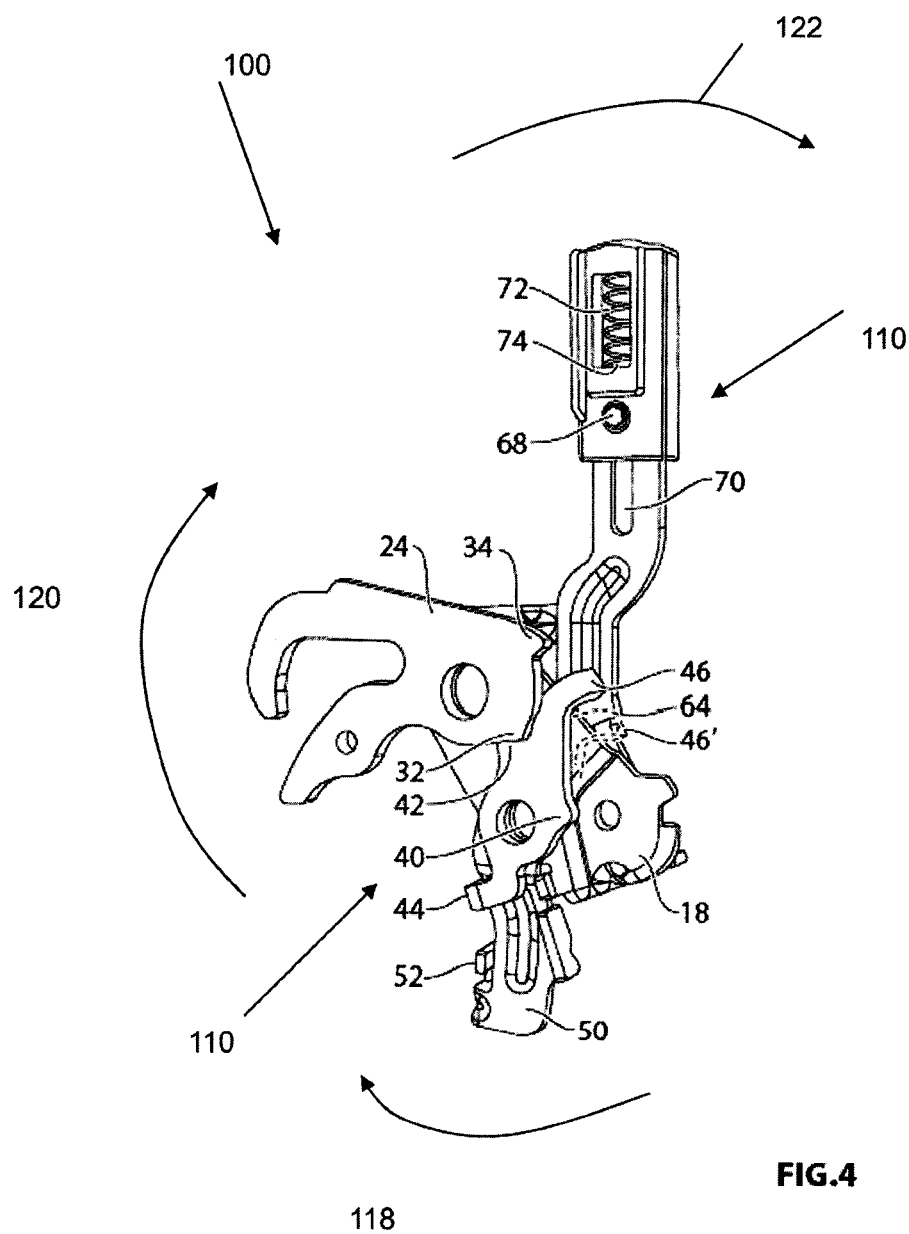
FIG. 4 is a rear, fragmentary, perspective view of the hood latch of FIG. 1 shown in isolation, with the housing and other components removed from view, wherein the latch is shown in the primary closed position.

As seen best in the fragmentary perspective views of FIG. 4 (where plates 12 and 18, rivets and torsion springs are removed from view), the pawl 40 is pivotally mounted on the rivet shaft 22A (see FIG. 2) between the frame plate 12 and cover plate 18. The pawl 40 has a shoulder 42 (or detent) that interacts or otherwise engages with primary and secondary shoulder stops 32, 34 of the ratchet 24, in order to releasably retain the ratchet 24 in the latched position. The pawl 40 also features a primary release tab 44 and a secondary release tab 46.

Figure 3:
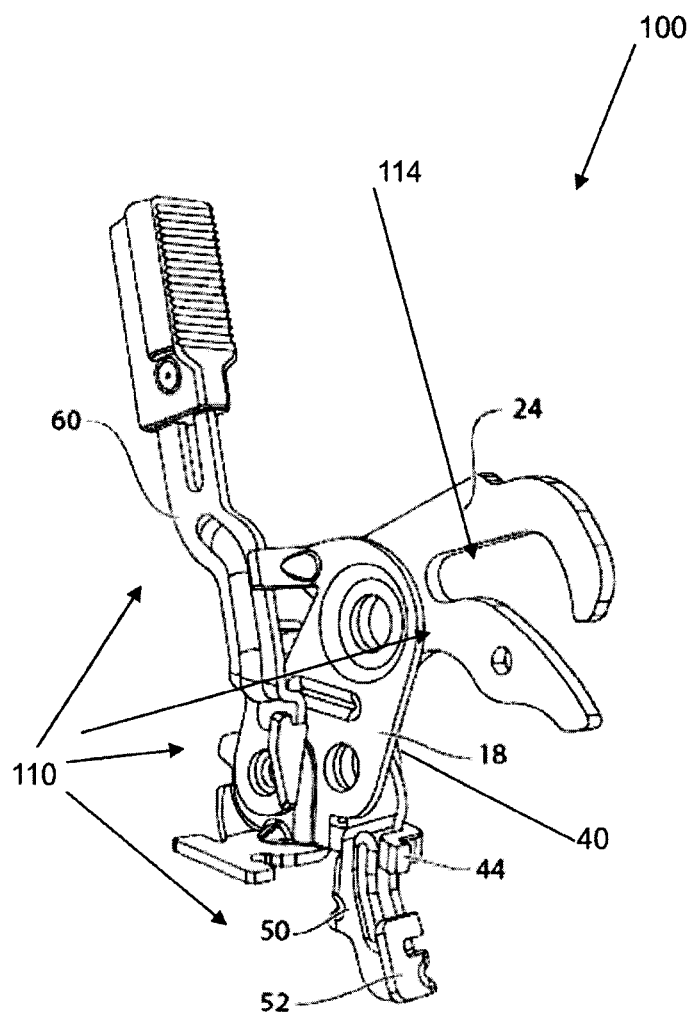
FIG. 3 is a front, fragmentary, perspective view of the hood latch of FIG. 1 shown in isolation, with a housing and other components removed from view, wherein the latch is shown in a primary closed position.

The pawl 40 is biased to a locking position (e.g. latched position) as shown in FIGS. 3 and 4 (where the ratchet 24 is shown in a primary closed position) by a torsion spring 48 (see FIG. 2) that is mounted on rivet shaft 22A and connected between the other rivet shaft 20A and the pawl 40. The torsion spring 48 is an example of a pawl biasing member. The torsion spring 48 has tangs 48A, 48B, such that a primary release tab 44 receives spring tang 48A, and the other spring tang 48B is located under the other torsion spring 35 and supported directly by the other rivet shaft 20A. Accordingly, the pawl 40 is biased to disengage with the ratchet 24 via the pawl biasing member 48.

A primary release lever 50 is also pivotally mounted on the rivet shaft 22 between the frame plate 12 and the cover plate 18. The primary release lever 50 includes a tab 52 for connection to a release cable (not shown) that is connected to a handle (not shown) located in the vehicle 4 compartment for initiating by a driver for opening of the latch 100. The end result of operation of the release lever 50 is that the pawl 40 is disengaged with the ratchet 24, under action of the pawl biasing member 48, thus allowing the ratchet biasing member 35 to assist in pivoting the ratchet 24 from the closed (or latched position—see FIGS. 3,4) to the open or unlatched position (see FIG. 2). The primary release lever 50 interacts with the pawl 40 via its primary release tab 44 and is thus also biased by pawl biasing member 48 into the non-engaged position.

A secondary release lever 60 is pivotally mounted on a pin 62 rigidly connected to the cover plate 18. The secondary release lever 60 has a bend in it that provides a face 64 (see FIG. 4) for interacting with the pawl secondary release tab 46. If desired, the secondary release lever 60 may also include a presenter 66 which can be gripped by hand in order to manually manipulate the secondary release lever 60. The presenter 66 is slidably disposed along the secondary release lever 60, for example, by a pin 68 and slot 70 connection. The presenter 66 encases a coil spring 72 which is mounted on a tip 74 of the secondary release lever 60 and urges the presenter 66 upwards (see cutaway view in FIG. 4). The secondary release lever 60 is biased to a non-engaged position as shown FIG. 2 by a torsion spring 76 that is mounted on the pin 62 and connected between the cover plate 18 and the secondary release lever 60. The torsion spring 76 has tangs 76A, 76B. The cover plate 18 features a slot 78 for receiving spring tang 76A, and the secondary release lever 60 includes a tab 80 for receiving spring tang 76B. As further discussed below, the primary and secondary release levers 50 and 60 provide a release mechanism for opening latch 100, by releasing the pawl 40 from engagement with ratchet 24, thus facilitating operation of the ratchet biasing member 35 to pivot the ratchet 24 about the shaft 20A to release the mating latch component 96 from the slot 14 of the mounting plate 202 and slot 114 of the ratchet 24 (see FIG. 2).

In general operation of the latch elements 110 (e.g. pawl 40 and ratchet 24), the latch 100 is shown in its primary closed position in FIGS. 3 and 4, where the ratchet 24 is in a primary closed position and the pawl 40 is in a primary locking position with the pawl shoulder 42 abutting the ratchet primary shoulder stop 32, thus inhibiting the ratchet 24 from pivoting about the shaft 20A. In operation, to open the latch 100, the primary release lever 50 is engaged by pulling on an associated handle inside a vehicle compartment, not shown, communicating for example through a cable, not shown, causing the primary release lever 50 to rotate in a clockwise direction 118, as shown in FIG. 4. As the primary release lever 50 rotates, it will engage the pawl primary release tab 44 causing the pawl 40, which pivots along the same axis as the primary release lever 50, to rotate in the same direction 118. As the pawl 40 rotates, the pawl shoulder 42 will slip away from the ratchet primary shoulder stop 32, enabling the ratchet 24 to rotate 120 (clockwise in FIG. 4) towards its open position (shown in FIG. 3) due to the bias torque provided by ratchet biasing member 35. However, it should be noted that the ratchet 24 can be prevented from rotating to its fully open position due to the ratchet secondary shoulder stop 34, which can abut the pawl shoulder 42, placing the ratchet 24 into a secondary closed position and the pawl 40 into a secondary locking position.

Upon activation of the primary release lever 50, once disengaged from the pawl 40, under direction of the ratchet biasing member 35 the ratchet will pivot in direction 120 (see FIG. 4) about shaft 20A from the latched position to the unlatched position (e.g. to secondary closed position) in a first predefined time period. The duration of the first predefined time period is dependent upon the biasing strength (e.g. stored spring energy) of the ratchet biasing member 35.

In the secondary closed/locking position, the ratchet 24 repositions the pawl 40 slightly to the secondary release position causing the pawl secondary release tab 46 to come into the path of the secondary release lever interaction face 64 as indicated in FIG. 4 by the partial stippled lines 46'. To open the latch 100, the secondary release lever 60 can be manually pivoted in clockwise direction 122 in FIG. 4. In the secondary closed/locking position, due to the repositioning of the ratchet 24 in comparison to its primary closed position, the hood becomes slightly elevated leaving a gap for manual access to the secondary release lever 60. When the secondary release lever 60 is manually pivoted 122 in FIG. 4, the pawl 40 is also caused to rotate further in the clockwise direction 118 into the fully open position (or unlatched position) whereby the pawl shoulder 42 slips away from the ratchet secondary shoulder stop 34, enabling the ratchet 24 to rotate completely into its open position as shown in FIGS. 1J and 2 as a result of the bias torque on the ratchet 24 provided by ratchet biasing member 35.

To close the latch 100 from the open position shown in FIG. 2, as the closure panel 6 moves from an open position to the closed position, the mating latch component 96 impacts the ratchet lip 28 causing the ratchet 24 to rotate (e.g. clockwise in FIG. 2) about the shaft 20A towards the primary closed position, thus causing the mating latch component 96 to be retained both in the slot 114 and slot 14 via reengagement of the pawl 40 with the ratchet 24, as given by example above. Thus far, the latch 10 assembly has been described with respect to operation of latch 100 for facilitating use the latch 100 in accessing the engine bay 13 for servicing purposes. It will be noted that the latch 100 can take many other forms for the purposes described herein. As just one example, the secondary release may be activated using a double pull mechanism from within the vehicle compartment, obviating the need for the secondary release lever 60. As such, example use of the actuation mechanism 101 (see FIG. 1A) will now be described, as a means to automatically assist in operation of the latch elements 110 of the latch 100 (see FIG. 4), such that the once disengaged from the pawl 40, under direction of the ratchet biasing member 35 and at least a portion of the stored mechanical energy of the mechanical energy storage system 102 (see FIG. 1I), the ratchet 24 will pivot in direction 120 (see FIG. 4) about shaft 20A from the latched position to the unlatched position (e.g. to secondary closed position) in a second predefined time period. The duration of the second predefined time period is less than the duration of the first predefined time period, such that the duration of the second predefined time period is dependent upon the biasing strength (e.g. stored spring energy) of the ratchet biasing member 35 and a magnitude of stored mechanical potential energy released from the mechanical energy storage system 102 and applied to the latch elements 110 (e.g. via the mating latch component 96).

Figure 5:
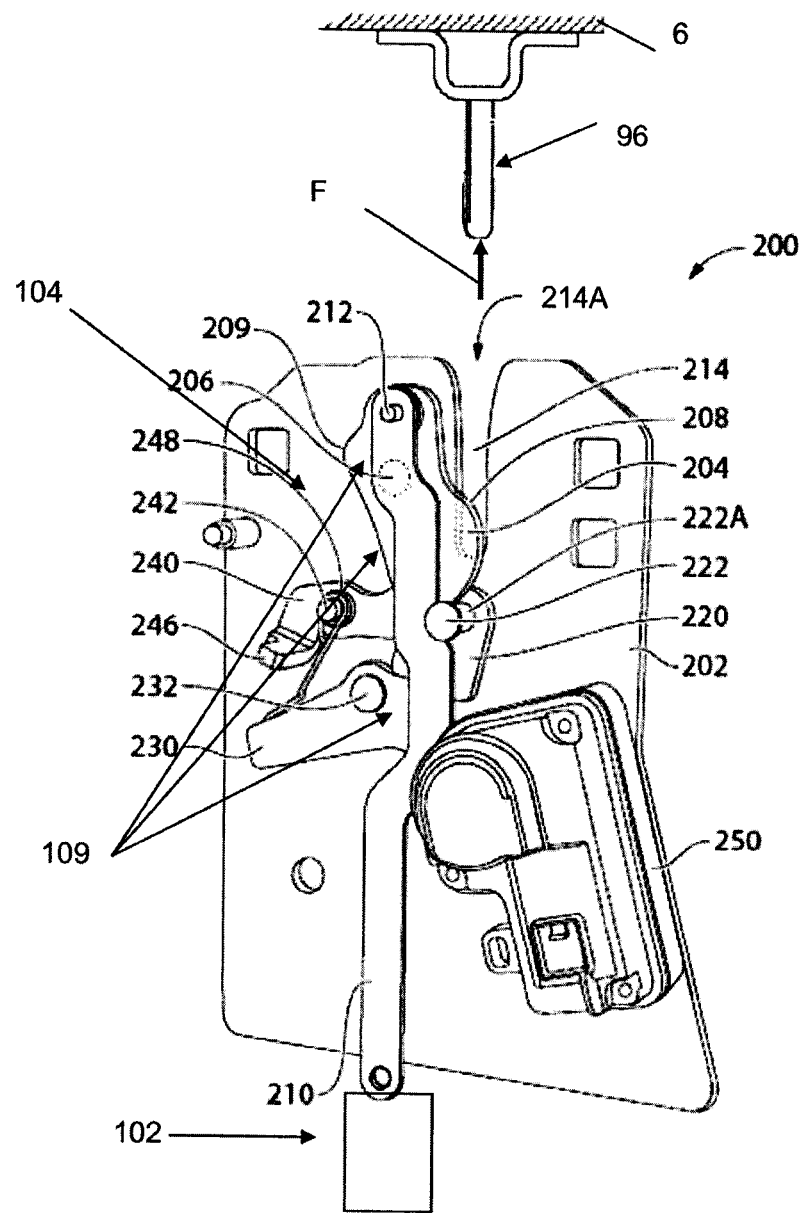
FIG. 5 is a front perspective view of the pop-up latch of FIG. 1 shown in isolation.

As noted above, however, the latch assembly 10 can be coupled to actuation mechanism 101, shown in FIGS. 1 and 5. The actuation mechanism 101 can include the support plate 202 (e.g. frame 105 of FIGS. E-H) that can connect to the frame plate 12 of the latch 100 and thereby can form part of the latch housing 23 (see FIG. 2), as desired. The support plate 202 has a support plate striker slot or fishmouth 214 with an open top end 214A and a closed bottom end 214B that can define a corresponding depth as that of the frame plate slot 14 in FIG. 1P. The slot 14 and the slot 214 can together make up latch slots 14, 214, in the case where the actuation mechanism 101 is mounted to the latch 100 as a latch assembly 10 (see FIG. 1J). The latch slots 14, 214 can differ from a conventional fishmouth in that the latch slots 14, 214 can have extra long depths to enable the mating latch component 96 (shown in FIGS. 7A-7F) to move downwardly upon impact as will be discussed in greater detail below. In alternative embodiments there need not be two plates 12 and 202 each having a slot. There could be two plates where one defines the latch slot and the other has a larger opening and has no engagement with the mating latch component 96. In other alternative embodiments, there may be only one plate instead of two plates 12, 202, in which case the latch slot would be defined by that one plate.

Figure 6:
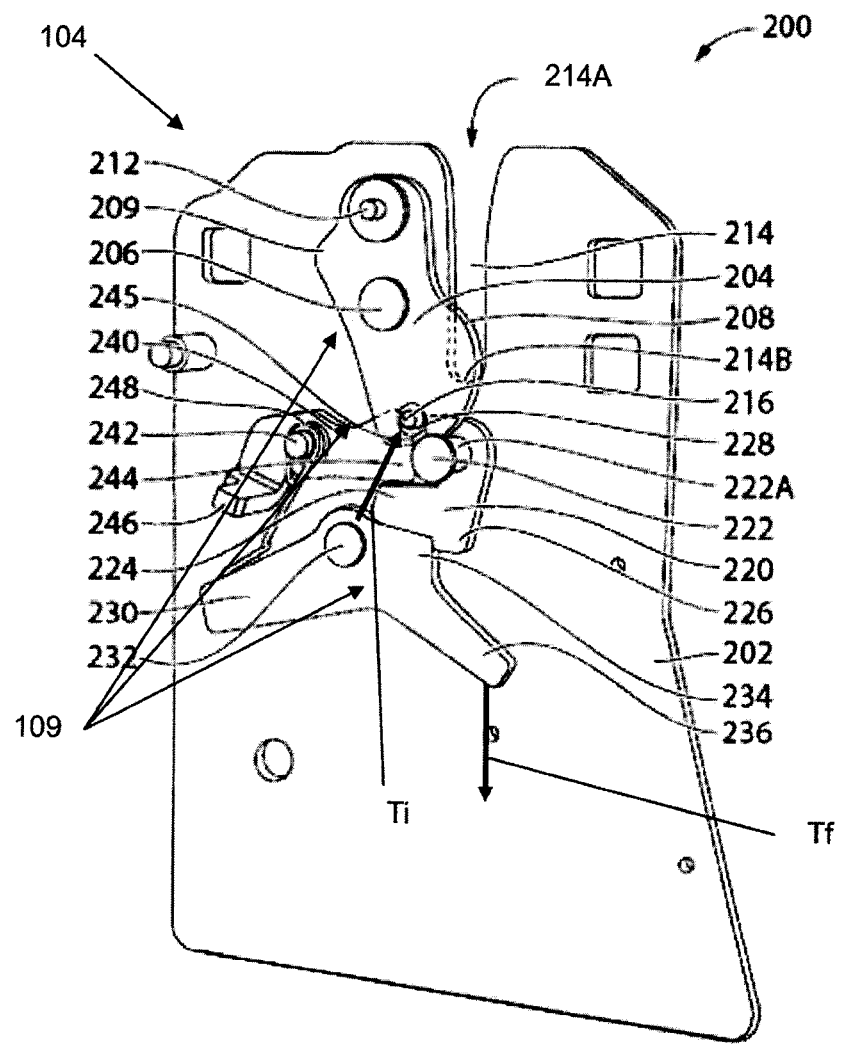
FIG. 6 is a front, fragmentary, perspective view of the pop-up latch of FIG. 1 shown in isolation, with an actuator and link arm removed from view.

A cam lever 204 (example advantage component 109—see FIG. 1J) is pivotally mounted to the support plate 202 via a pin 206 (seen in FIG. 6). The cam lever 204 has a first striker engagement surface 208 that, in a rest state as shown in FIGS. 5 and 6, extends alongside the fishmouth 14 to provide a seat or rest for the striker 16 (see FIG. 7A) at a location above the bottom 214B of the fishmouth 14. Thus the first striker engagement surface 208 prevents the striker 16 from reaching the bottom end of the fishmouth 14, 214 and the first striker engagement surface 208 establishes the penetration depth of the striker 16 for normal use which corresponds substantially to the position of the ratchet 24 in the primary closed position as seen in FIG. 1.

The cam lever 204 has a second striker engagement surface 209 located on the other side of the cam lever at a position that may be generally diametrically opposed to the first striker engagement surface 208 (relative to the cam center of rotation). The function of the second striker engagement surface 209 is explained in greater detail below. The cam lever 204 also includes a rearward facing projection 216 (seen best in FIG. 6).

A link member 210 (example advantage component 109—see FIG. 1J) (which may be referred to as a link arm 210) is pivotally mounted at an upper end thereof to the cam lever 204 via a pin 212 (FIG. 5). The pivot axis of the link member/cam lever at pin 212 is thus offset from the pivot axis of the cam lever/support plate at pin 206. A lower end of the link member 210 is connected to a loading device 102, shown schematically at 218 in FIG. 1, such as a compressed spring which provides a substantial force (possibly hundreds or even thousands of pounds of force) downwards with the consequent result that the cam lever 204 has a tendency to pivot counterclockwise in FIGS. 5 and 6. Some examples of loading devices 218 discussed further below. In the rest position the force vector along the link member 210 is substantially (although not completely) directed toward the rotational axis of the cam lever 204 at pin 206 which receives much of this force and thus limits the moment provided by the loading device 218 in the rest state. However, during operation as discussed in greater detail below the moment on the cam lever 204 increases as the position of pin 212 changes relative to pin 206 such that the direction of the force vector along the link member diverges away from the pin 206.

A catch lever 220 (example advantage component 109—see FIG. 1J) is pivotally mounted to the support plate 202 via a pin 222. The pin 222 has an integral projecting shaft 222A that functions to limit the travel of the link member 210. The catch lever 220 can also feature a kick portion 224, a shoulder 226 and an edge 228. The edge 228 receives force from the rearward projection 216 of the cam lever 204.

A crash lever 230 (example advantage component 109—see FIG. 1J) is pivotally mounted to the support plate 202 via a pin 232. The crash lever features an input arm 236 and a check shoulder 234 that interacts with the catch shoulder 226.

An auxiliary release lever 240 is pivotally mounted to the support plate 202 via a pin 242. The auxiliary release lever 240 has a leg 244 that interacts with the kick portion 224 of the catch lever 220. The leg 244 includes a leading edge 245 that may interact with the rearward projection 216 of the cam lever 204 in the rest state. The auxiliary release lever 240 also includes a projecting tab 246 that, as seen in FIG. 1, interacts with the primary release lever 50 of latch 100. A spring 248 biases the projecting tab 246 of auxiliary release lever 240 away from the primary release lever 50 to prevent accidentally triggering it.

A rotary release actuator 250 (FIG. 5) (e.g. trigger system 103 of preceding Figures) is mounted to the support plate 202. The actuator 250 has a rotary output arm (not shown) that interacts with the input arm 236 (FIG. 6) of crash lever 230.

A rotary release actuator 250 (FIG. 5) (e.g. trigger system 103 of preceding Figures) is mounted to the support plate 202. The actuator 250 can have a rotary output arm (not shown) that interacts with the input arm 236 (FIG. 6) of crash lever 230, and as such can provide for application of a trigger force Tf. (see FIG. 6) on one or more advantage elements 109 of the mechanical advantage system 104. Upon application of the trigger force Tf, the cooperative movement of respective advantage elements 109 provides amplification of the trigger force Tf as initiating force Ti, which can be used to couple the release of the stored mechanical potential energy of device 102 with the advantage element 109 adjacent to the one or more latch elements 110 and/or the mating latch component 96. Accordingly, by example, the initiating force Ti biases the advantage element 109 into contact with the adjacent one or more latch elements 110 and/or the mating latch component 96, shown in FIG. 6 by example as the cam lever 204 biased into contact with the mating latch component 96 of the latch mechanism 100. When in contact, any further release of the stored mechanical potential energy of device 102 is used as the drive force F to move the one or more latch elements 110 and/or the mating latch component 96 from the first latch position (e.g. latched) to the second latch position (e.g. unlatched).

Figure 7A:
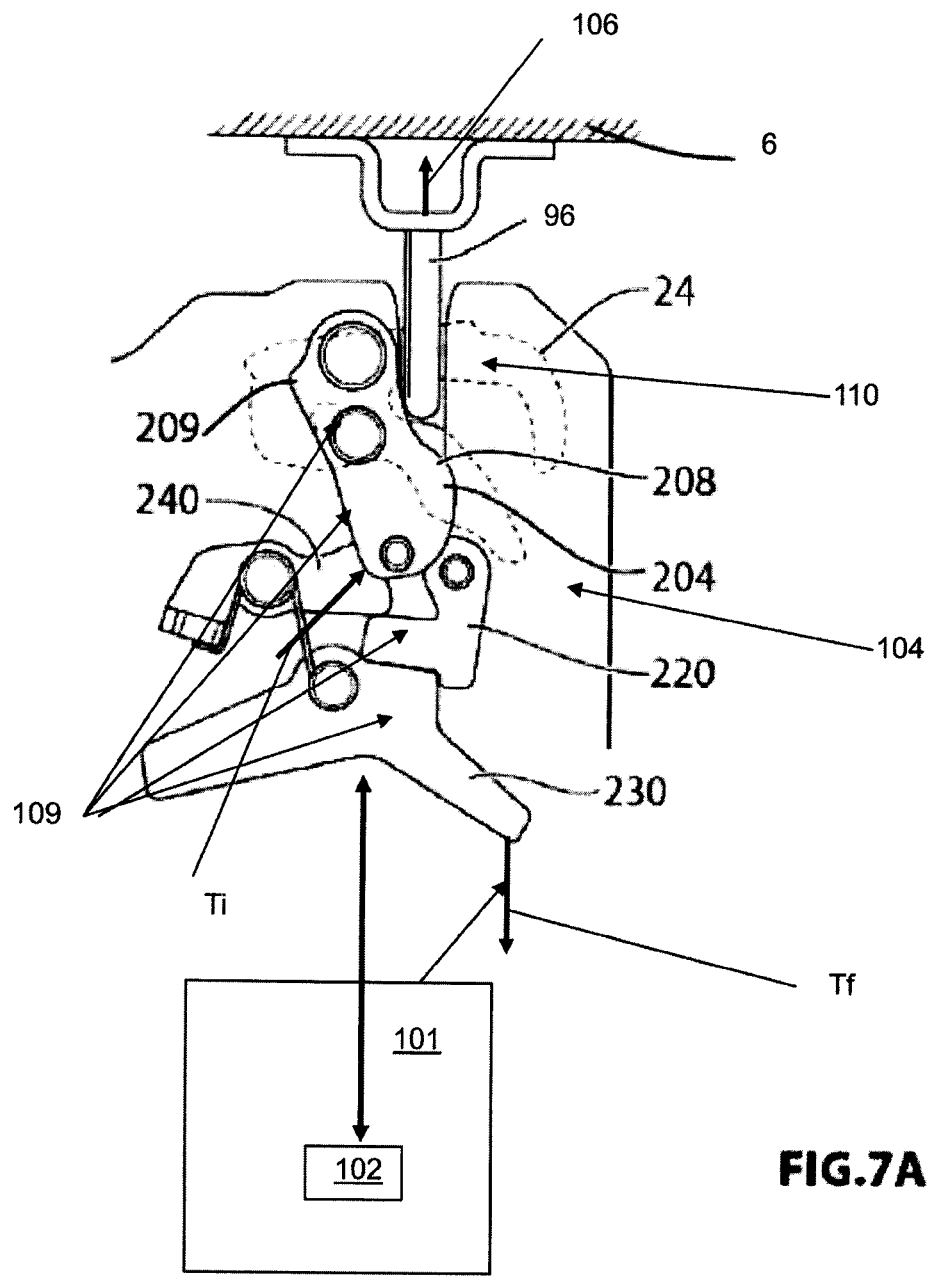
FIGS. 7A-7F are front fragmentary, perspective views of the pop-up latch of FIG. 1, in isolation, which collectively show an operating sequence of the pop-up latch as it moves from a rest state to an active state.

FIGS. 7A-7F show an operating sequence for the actuation mechanism 101 (see FIG. 1J). FIG. 7A shows the actuation mechanism 101 in the rest state where the tendency of the cam lever 204 (e.g. advantage element 109 of the mechanical advantage system 104) to rotate (e.g. counterclockwise) due to the moment provided the device 102 is checked by the edge 228 of the catch lever 220 (e.g. advantage element 109 of the mechanical advantage system 104) which receives one side of the cam lever rearward projection 216. Due to this force the catch lever 220 is urged to rotate (e.g. clockwise), but this tendency is checked in turn by the crash lever 230 (e.g. advantage element 109 of the mechanical advantage system 104) as a result of the force vector between shoulders 226 and 234 being directed substantially toward pin 232 (e.g. advantage element 109 of the mechanical advantage system 104). Additionally, the possibility of the catch lever 220 to rotate in the opposing (e.g. counterclockwise) direction is prevented by the leading edge 245 of the auxiliary release lever 240 (e.g. advantage element 109 of the mechanical advantage system 104) which abuts the opposite side of the cam lever rearward projection 216. The release actuator 250 does not move the crash lever 230 and consequently in the rest state the levers 204, 220, 230 and 240 (e.g. advantage elements 109 of the mechanical advantage system 104) are locked enabling the first engagement surface 208 to provide the bottom rest for the mating latch component 96 (e.g. striker) and absorb the impact of the mating latch component 96 as the closure panel 6 (e.g. hood)—coupled to the mating latch component 96—is opened and closed in normal use. In the rest state the ratchet 24 (e.g. latch element 110 of the latch 100), which is shown in phantom in FIG. 7A, is situated in the primary closed or latched position.

Referring to FIGS. 1I and 7A, when a vehicle controller 140 (e.g. vehicle computer) detects a frontal crash, for example, by monitoring electronic signals provided by a sensor 142 (e.g. an accelerometer) located on the vehicle body 5 and/or on the closure panel 6 (e.g. at the front of the vehicle 4 such as in the vehicle front bumper—see FIG. 1A). In turn, the controller 140 sends a trigger signal 144 to the trigger system 103 (e.g. release actuator 250) to move the crash lever 230 (e.g. advantage element 109 of the mechanical advantage system 104) via trigger force Tf (provided by trigger system 103 as a result of receiving trigger signal 144) so as to provide for the initiating force Ti used to move or otherwise actuate one or more of the latch elements 110 and/or the mating latch component 96 (e.g. release the pawl 40 which causes release of the ratchet 24 and then movement of the mating latch component 96 within the slot 14 from the latched position to the unlatched position). It is recognized that due to the cooperating movement of the advantage elements 109, trigger force Tf is amplified into initiating force Ti, such that magnitude of force Ti is greater than magnitude of force Tf. In this example, movement of the advantage elements 109 via trigger force Tf also causes for engagement of the device 102 with the mating latch component 96, via movement of cam lever 204 (e.g. advantage element 109), thus causing the release of stored mechanical potential energy of the device 102 to be applied as part of driving force F (e.g. in combination with latch biasing element 35—see FIG. 2). As recognized, coupling of the release of stored mechanical potential energy from the device 102 causes the magnitude of driving force F to be greater than a magnitude of driving force F due to the latch biasing element 35 alone (i.e. during normal latch mechanism 100 operation when the stored mechanical potential energy of the device 102 is remains stored).

Figure 7B:
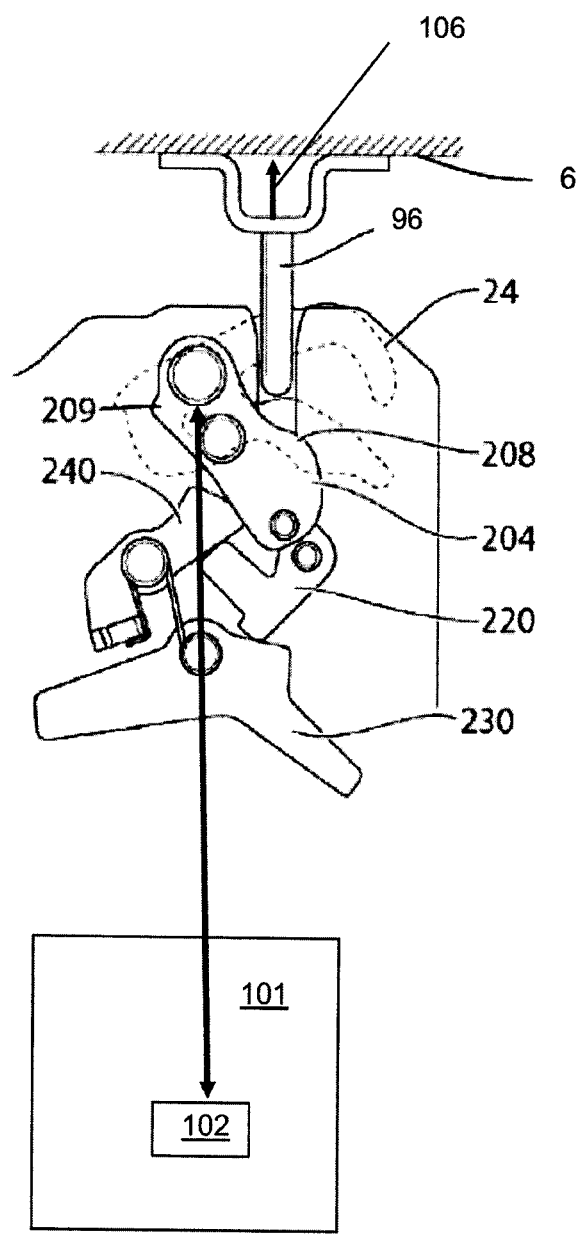

Thus as shown in FIG. 7B, the crash lever 230 (e.g. advantage element 109) is rotated (e.g. clockwise) to move its check shoulder 234 away from the catch lever shoulder 226 (e.g. advantage element 109). In doing so the moment provided by the loading device 102 on the cam lever 204 (e.g. advantage element 109) is unchecked, and the cam lever 204 begins to rotate (e.g. counterclockwise), due to the release of the stored mechanical potential energy from the device 102, urging the catch lever 220 (e.g. advantage element 109) to rotate (e.g. clockwise). As the catch lever 220 rotates its kick portion 224 acts against the auxiliary release lever leg 244 (e.g. advantage element 109) urging the auxiliary release lever 240 (e.g. advantage element 109) to rotate (e.g. counterclockwise) against the bias force provided by the spring 248 (e.g. advantage element 109) so that the auxiliary release lever projecting tab 246 (FIG. 5) actuates the primary release lever 50 (e.g. latch element 110) (FIG. 1P) of latch 100 to release the ratchet 24 (e.g. latch element 110) from its primary closed position.

Figure 7C:
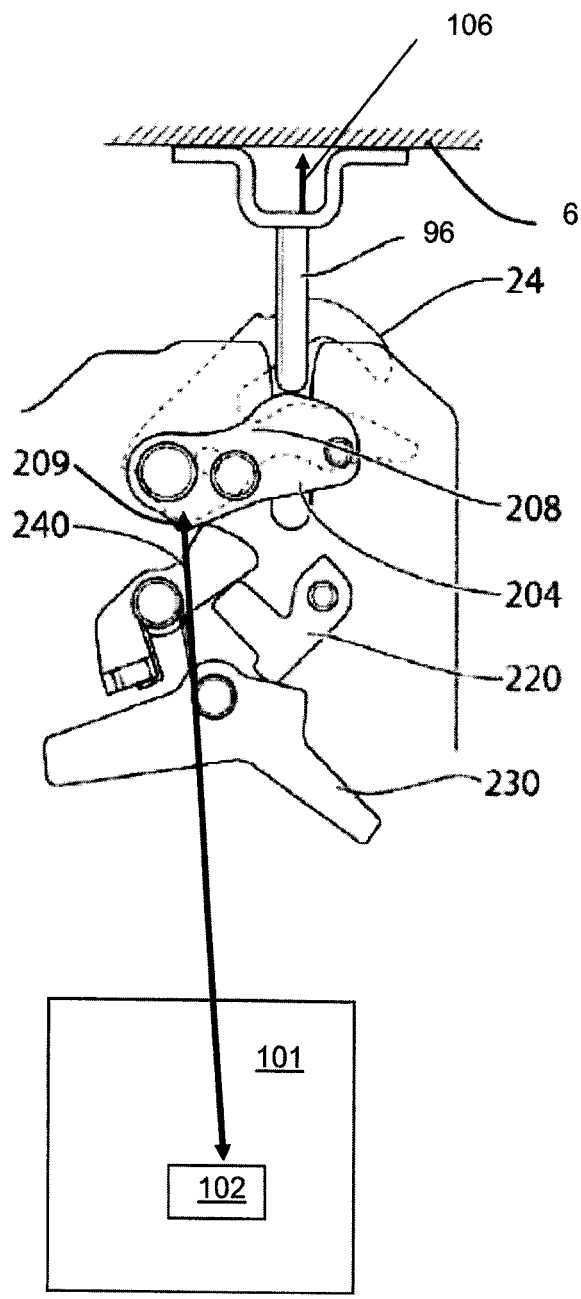

At this point there are two forces combined to provide force 106 acting to lift the mating latch component 96 out of the slots 14, 214. The mating latch component 96 is entrained in the ratchet 24 (e.g. latch element 110—see FIG. 1J) which is urged to rotate (e.g. counterclockwise) due to the conventional bias force provided by the torsion spring 35 (e.g. latch biasing element 111). However, this conventional bias force can be insufficient to lift the mating latch component 96 upwards in the desired reduced period of time (e.g. within a few milliseconds) for crash conditions (e.g. discussed above in reference to first and second predefined periods of time) so the loading device 102 provides a second or additional force (e.g. as a consequence of the release of the stored mechanical potential energy) that acts on one or more of the latch elements 110 and/or mating latch component 96 (e.g. the striker) via the cam lever 204 (e.g. latch element 110—see FIG. 1J). More particularly, the cam lever 204 rotates counterclockwise to lift the mating latch component 96 towards the opening of the slot 14, 214. The moment on the cam lever 204 increases as pin 212 moves laterally as seen in FIG. 7C with respect to the cam center of rotation at pin 206. In this manner, the coupling of the stored mechanical potential energy to the driving force 106 provides for operation of the mating latch component 96 from the closed/latched position to the open/unlatched position within the slot 14,114 in the second predefined time period. The duration of the second predefined time period is less than the duration of the first predefined time period (due to driving force 106 as a result of driving force 106 caused by latch biasing element 111 alone), such that the duration of the second predefined time period is dependent upon the biasing strength (e.g. stored spring energy) of the ratchet biasing member 35 and a magnitude of stored mechanical potential energy released from the mechanical energy storage system 102 and applied to the latch elements 110 (e.g. via the mating latch component 96).

Figure 7D:
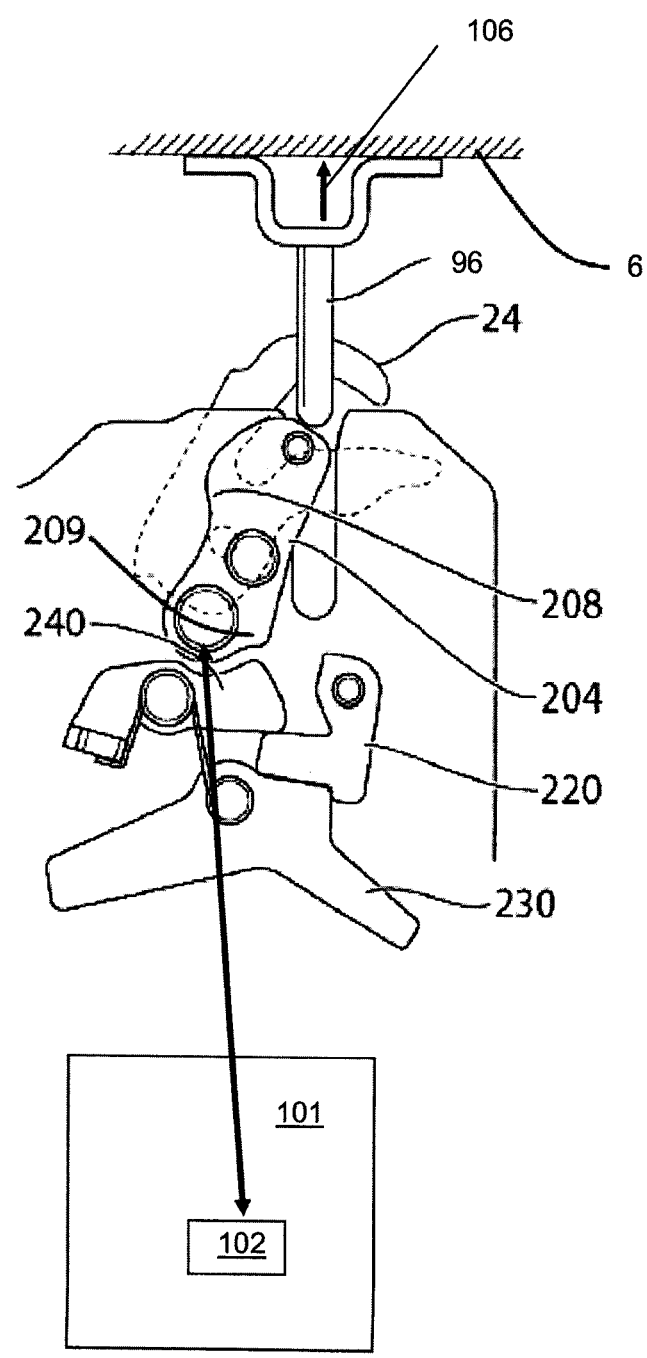
Figure 7E:
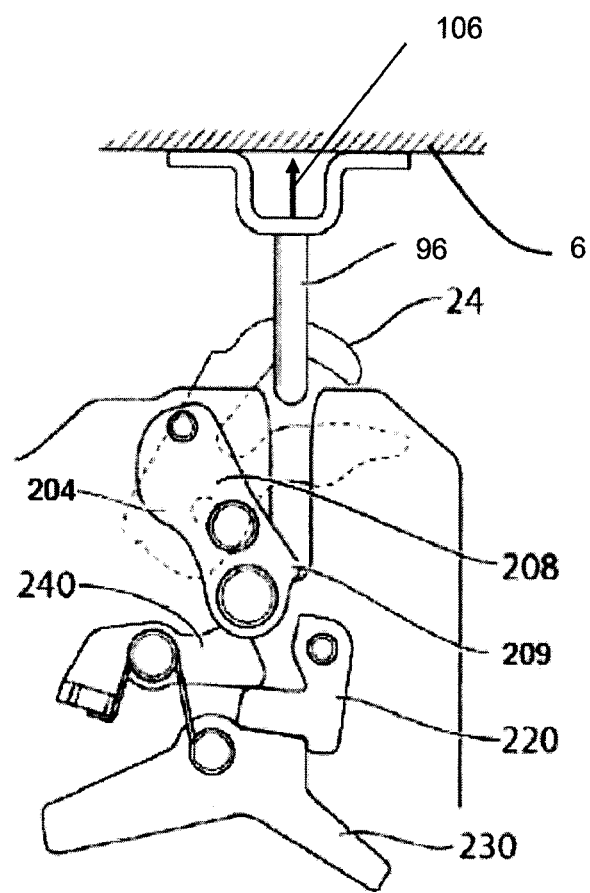

As the cam lever 204 continues to rotate counterclockwise the mating latch component 96 reaches a position seen in FIG. 7D where it clears the path of the cam lever 204. This position corresponds to the secondary closed position of the ratchet 24, with the mating latch component 96 being pushed as far up as possible to contact the underside of the ratchet hook 26. The cam lever 204 continues to rotate counterclockwise until the link member 210 is stopped by shaft 222A (see FIG. 6) and as seen in FIG. 7E the second engagement surface 209 is juxtaposed with the slots 14, 214. Note that the ratchet 24 remains in the secondary closed position. The secondary closed position is an example embodiment of the second position P2 (shown in ghosted view of FIG. 1M), with the object 130 being similar to the mating latch component 96 (e.g. striker) as moved from the closed/latched position (e.g. initial position P1).

Figure 7F:
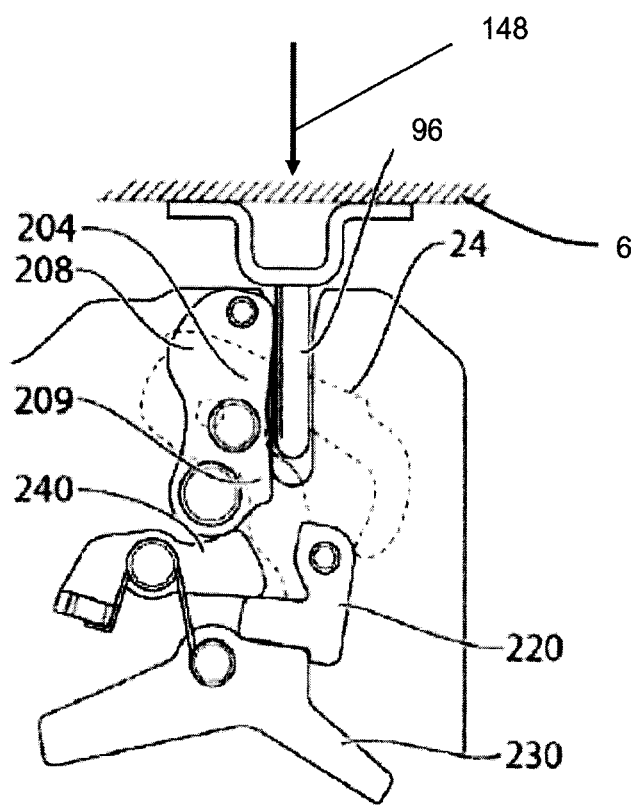

In the example where as a result of the impact to the vehicle 4 (and subsequent operation of the latch 100 as shown in FIGS. 7A-E by example), preferably prior to impact with the closure panel 6 by a pedestrian, subsequently the pedestrian hits the closure panel 6. This impact of the pedestrian can cause a downwards force 148 on the closure panel 6, driving the mating latch component 96 back towards and into the slot 14, 214. In application of the force 148 (or additional force on the closure panel 6 as provided by a person—e.g. driver), subsequent to the original crash and deployment of the actuation mechanism 101), the return stroke of the mating latch component 96 can pass the primary closed position of the ratchet 24 as shown in FIG. 7F, enabling the closure panel 6 to increase its travel and depress a greater distance than conventional hood latches thus increasing the deceleration time during the pedestrian impact. In the process, the mating latch component's 96 movement can be resisted by cam lever 204 due to the force exerted on the cam lever 204 by the loading device 201. This resistance can help to absorb the impact energy of the pedestrian.

It will be noted that the actuation mechanism 101 can be used by itself (i.e. not in combination with latch 100) to pop up the closure panel 6 (e.g. move it from a first position P1 to a second position P2 in the case where the closure panel 6 is referred to as object 130) to an injury-reduction position in a crash of the vehicle 4. In this case the actuation mechanism 101 can be mounted in one or more locations around the closure panel 6, for example, to actuate and lift the rear of the closure panel 6 in the vicinity of one or more panel operation components 8 (e.g. hinges 98—see FIG. 1A). In this case, the mating latch component 96 (or other hard point can be mounted to this position (e.g. rear) of the closure panel 6. During normal operation of the panel operation components 8 of the vehicle 4, the locking mechanism of the actuation mechanism 101 (e.g. associated with trigger device 103) retains the loading device 102 and provides for the cam lever 204 (e.g. advantage element 109) not to rotate. In the event of a collision a trigger signal is sent to the actuation mechanism 101, which releases the loaded cam lever 204 allowing it to rotate. The rotating cam lever 204 can be used to convey or otherwise couple the stored mechanical potential energy of the device 102 into the closure panel 6, thereby lifting the closure panel 6 out of its closed position to provide more impact protection for the pedestrian.

As discussed in relation to the above provided examples of the actuation system 101 and panel operation components 8, the rotating cam lever 204 of the actuation system 101 can be a useful feature. It is possible to lift the closure panel 6 using some kind of linear motion, e.g., using a rod driven by a compressed spring, but this would create a hard point that could cause significant injuries to a pedestrian, particularly when the latch 100 (and thus the hard point) is positioned at a front end of the closure panel 6. Because there can be a relatively higher risk of a pedestrian coming into contact with the front end of the closure panel 6 during a collision, it is desirable in at least some embodiments to avoid putting a hard point at the front end of the closure panel 6. In contrast the cam lever 204 lifts the closure panel 6 and then continues to move to clear the mating latch component 96 as discussed above. The mating latch component 96 can then be free to be pressed back into the slot 214 past the initial rest position.

This can not only remove or otherwise reduce a potential hard point that could injure the pedestrian but can also allow for greater travel of the closure panel 6 to help increase the deceleration time of the pedestrian impact. In addition to clearing the mating latch component 96, the opposite side of the cam lever 204 can be tailored to provide a resistance to the movement of the hood as it returns and passes the initial rest position. This resistance can assist in absorbing the impact energy of the pedestrian by conveying the pedestrian impact energy back into the loading device 102 (e.g. through the various advantage elements 109 coupled to operation of the latch elements 110). In other words, application of the return force 148 by impact or force applied to the closure panel 6, can provide for part (or all) of the energy associated with the return force 148 to be used to recharge all or a portion of the stored mechanical potential energy of the device 102, via operation of the advantage elements 109 and/or latch elements 110,111 in a reverse order to the operation as described in relation to FIGS. 7A-E.

Integrating the actuation system 101 with the latch 100 can provide for one or more benefits or advantages. The secondary closed position on the latch 100 can limit the travel of the closure panel 6 when released, providing for a stop if the system is released accidently. Further, optionally, the increased depth of the slot 14, 214 can provide for even greater travel on the return stroke after impact. Yet, the latching/release mechanism of the emergency actuation system 101 can integrate nicely with the latch 100, e.g. via operative coupling of the advantage elements 109 with the latch elements 110,111), thus providing for the closure panel 6 to pop-up during initial vehicle 4 impact with the pedestrian but having no effect on normal operation of the latch 100. In other words, the latch elements 110,111 can operate independently of the actuation system 101, thus providing for movement of the latch elements 110,111 under direction of the latch biasing members to move the mating latch component 96 in the slot 14 in the first predefined time period, which is greater than movement of the mating latch component 96 the second predefined time period that includes coupling of the device 102 to movement of the latch elements 110,111 and/or the mating latch component 96. The integrated system can thus provide increased pedestrian deceleration times, and more clearance to hard vehicle components than a conventional hood latch or a lone rear mounted pop-up hinge mechanism that is not actuated using a respective actuation system 101.

Figure 8A:
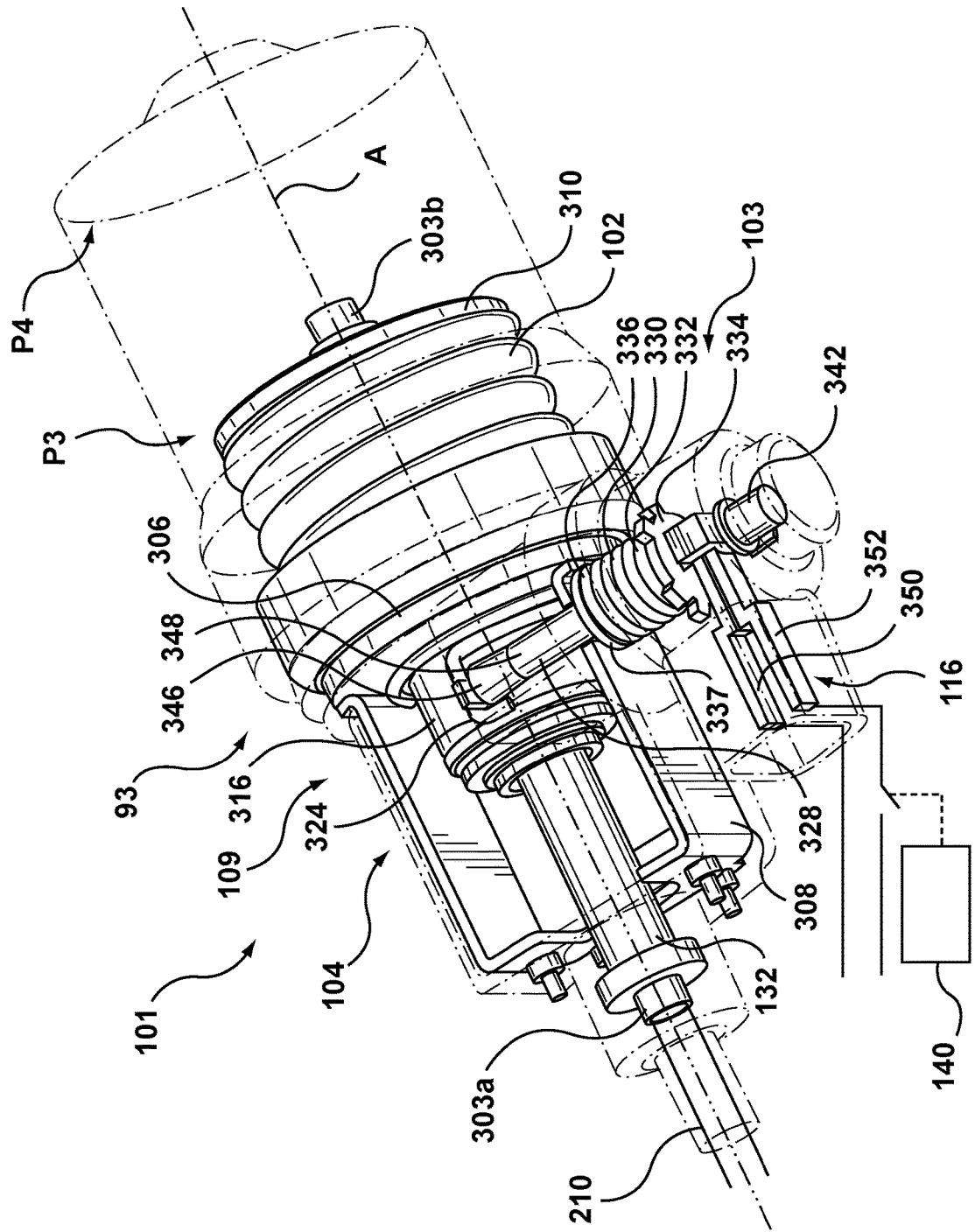
FIGS. 8A, 8B and 8C are perspective, plan and sectional views of a loading device that is part of the pop-up mechanism shown in FIG. 1, shown in an unactuated state.
Figure 8B:
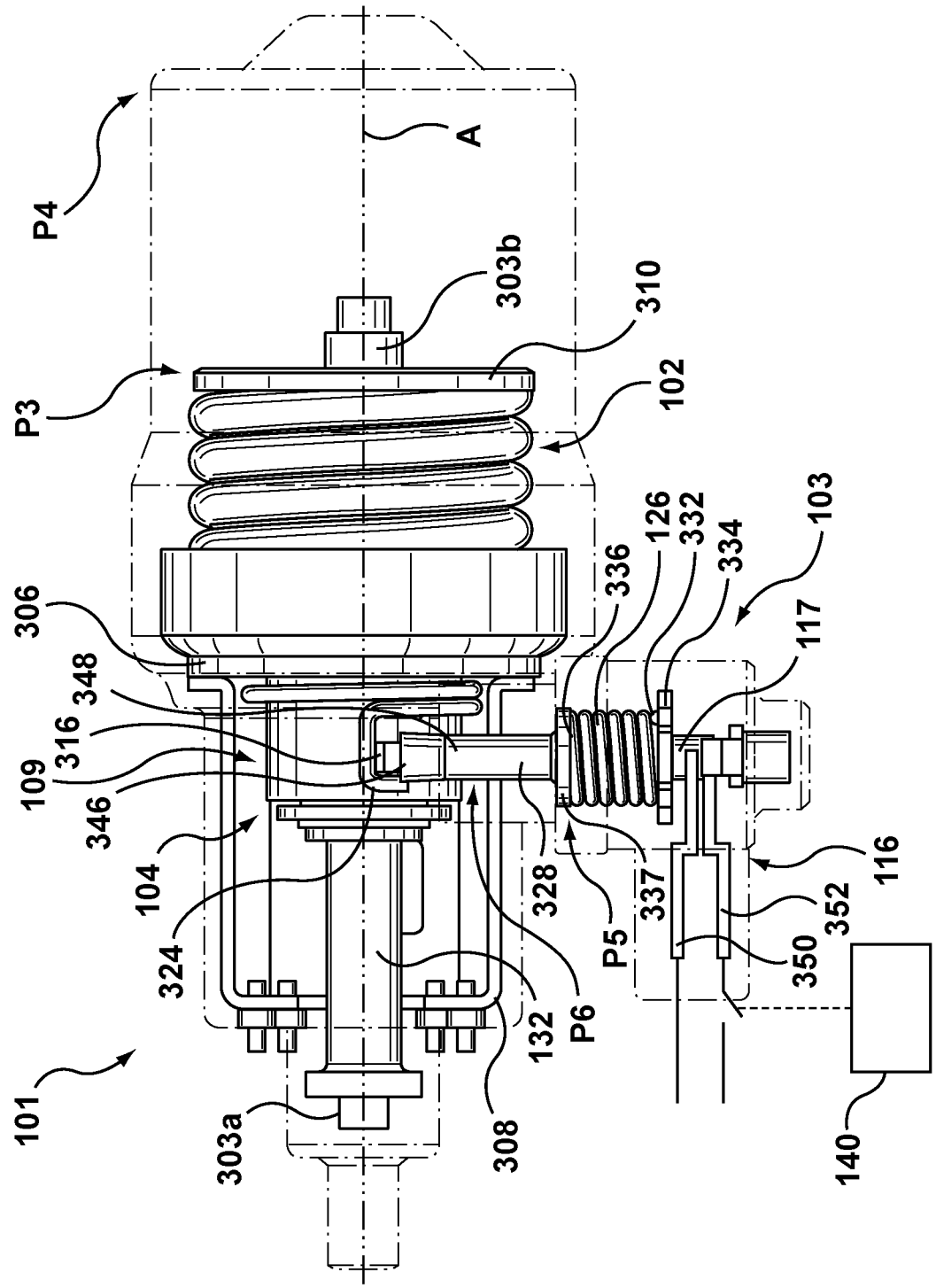
Figure 8C:
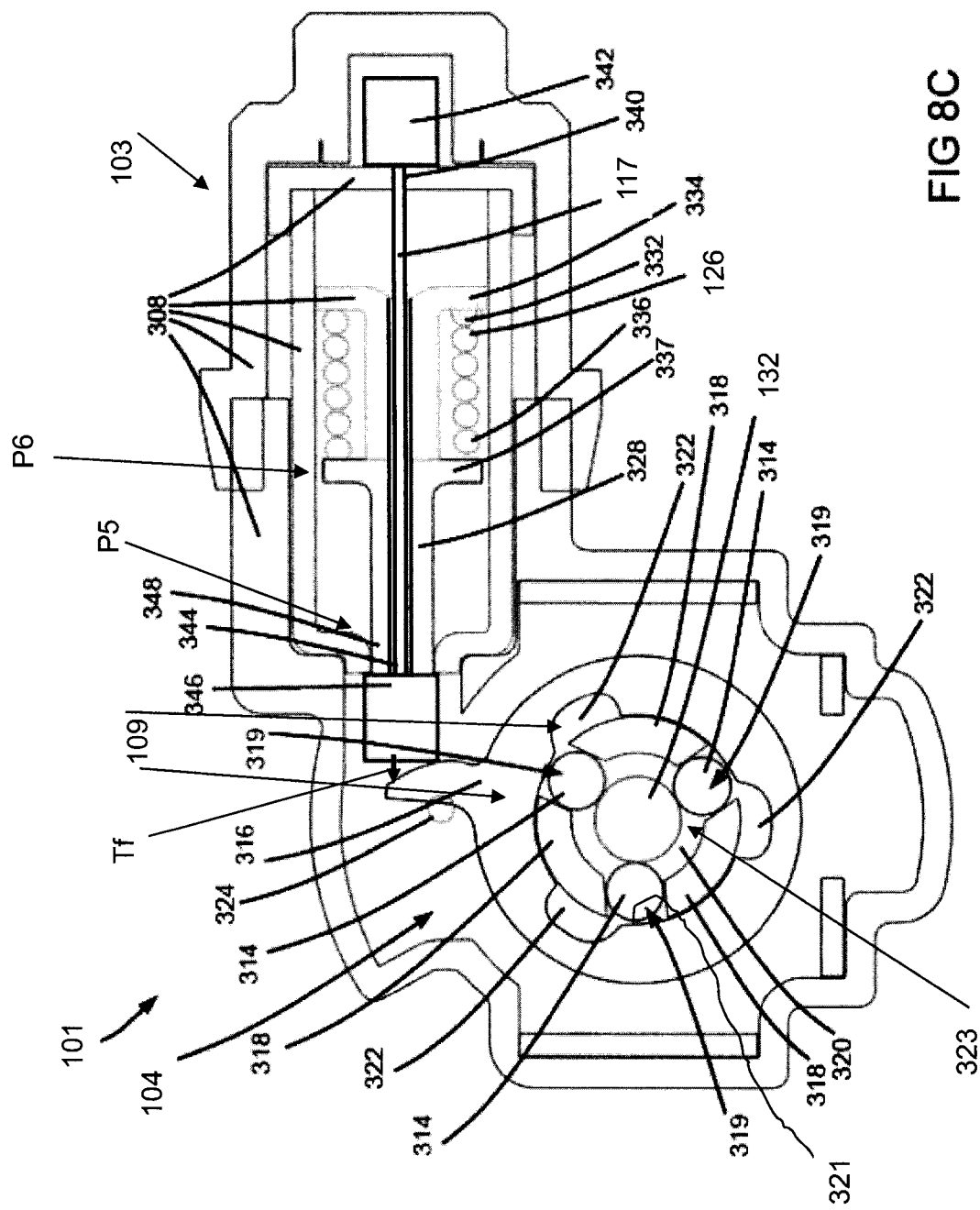
Figure 9A:
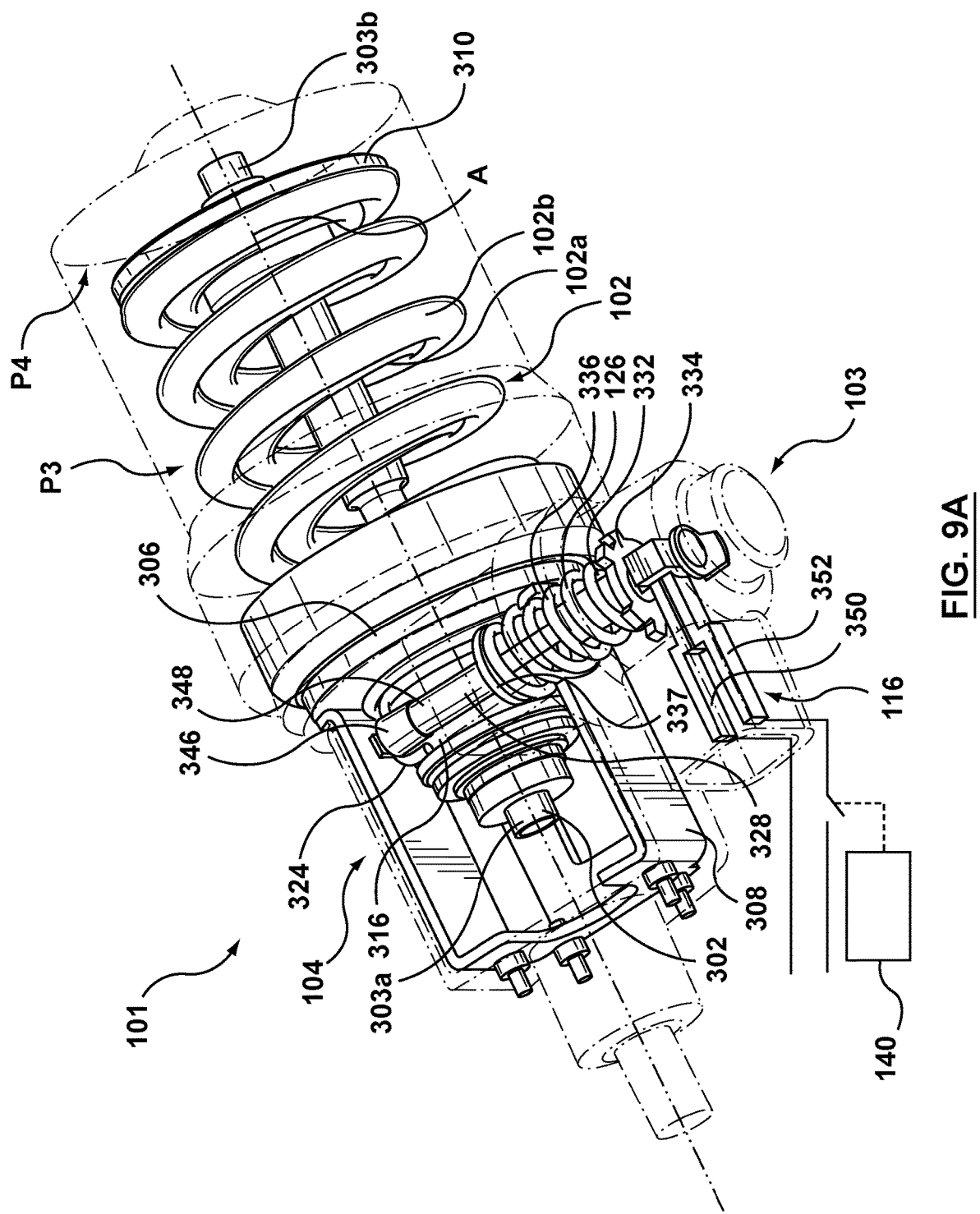

Examples of the actuation system 101 are shown in FIGS. 8A-9C, and FIGS. 10A-10B respectively. The actuation device 101 includes a driver assembly (e.g. trigger system 103) (FIG. 8A) and optionally a driven assembly (e.g. mechanical potential energy storage system 93). In the embodiment shown in FIGS. 8A-9C, the driven assembly can include a driven assembly actuation member (e.g. mounting portion 132—see FIG. 1M) that can be operatively connected to the latch mechanism 100 (see FIG. 2) via coupling member 210 (e.g. cable or other link element—see FIG. 1P) (as described in more detail further below) and that is movable between an unactuated position (FIGS. 8A-8C) and an actuated position (FIGS. 9A-9C). As such, the mounting portion 132 is used to couple the actuation system 101 to a panel operation component 8 (e.g. latch 100) and/or an object 130 (see FIGS. 1L, 1M), in particular by example also coupling the device 102 to the panel operation component 8 and/or object 130. In the present example, the movement of the panel operation component 8 and/or object 130 (between positions A,P1 and B,P2) as discussed above is directly coupled via the mounting portion 132 (e.g. rod) to displacement of the device 102 between a first position P3 (e.g. initial position) as shown in FIGS. 8A-C and a second position P4 shown in FIGS. 9A-C, such that release of the stored mechanical potential energy of the device 102 occurs as a result of the change in position between positions P3 (position at which the energy is stored and available) and P4 (position at which the energy is released and unavailable).

In the embodiment shown in FIGS. 8A-9C, the driven assembly actuation member may be referred to as a driven assembly pull-rod because it acts on (e.g. pulls or pushes) another component such as the coupling member 210 (e.g. link member). For example, a pin connection may be provided between a trailing end (shown at 303a in FIG. 8a) of the actuation member and the coupling member 210. However it will be understood that the actuation system 101 could alternatively be arranged so that the driven assembly actuation member pushes another component such as the coupling member 210 (e.g. via a pin connection between a leading end 303b of the actuation member and the coupling member 210). Movement of the driven assembly pull-rod towards the actuated position can drive (e.g. via the coupling member 210) one or more of the latch elements 110,111 and the mating latch component 96 (see FIG. 7A by example) and optionally one or more latch advantage elements 109 (e.g. the cam lever 204 (FIGS. 7A-7F)) towards the activated position (see for example FIG. 7F) of the latch 100 (e.g. panel operation component 8). The pull-rod has a first end 303a that can be pivotally connected to a free end 305 of the coupling member 210 (FIG. 1P), and a second end 303b. In the present example, the pull-rod is referred to as the mounting portion through which the actuation system 101 is coupled to the generic panel operation component 8 or object 130 (see FIGS. 1L, 1M).

In the present example, it is recognized that a trigger mechanical advantage system 104 is positioned between the trigger device 103 and the device 102 via the mounting portion 132, such that advantage elements 109 of the trigger mechanical advantage system 104 FIGS. 8A-9C do not act on (e.g. are uncoupled from) the generic panel operation component 8 or object 130 (e.g. latch elements 110,111 of the latch mechanism 100) via the mounting portion 132. In this manner, the trigger mechanical advantage system 104 is used to transform the trigger force Tf of the trigger system 103 into the initiating force Ti used to release the stored mechanical potential energy of the device 102, via unlocking of a restraining mechanism 323, which in turn moves or otherwise actuates the coupling member 210 that couples the actuation system 101 with the panel operation component 8 or object 130 (e.g. latch elements 110,111 of the latch mechanism 100). Optionally, the actuation system 101 can have a latch mechanical advantage system 104 positioned between the trigger system 103 and the object 130, such that all or part of the initiating force Ti (resulting from the trigger force Tf) can be used to actuate latch elements 110,111 and/or the mating latch component 96 of the latch mechanism 100 (e.g. object 130). An example of the latch mechanical advantage system 104 is shown with reference to system 104 in FIG. 7A.

The actuation system 101 includes the device 102 (e.g. driven assembly biasing member) that biases the driven assembly (e.g. mounting portion 132) towards the actuated position. The device 102 may be referred to as a closure panel actuation biasing member because it can ultimately act to drive the closure panel 6 (see FIG. 1A) away from the body 5 of the vehicle 4. For convenience it can also, in reference to the embodiment shown in FIGS. 8A-9C, be referred to as a driven assembly pull-rod biasing member or mounting portion 132 biasing member.

For example, the device 102 is what provides all or part of the force (e.g. force 106 of FIG. 7A) (via release of the stored mechanical potential energy) that ultimately drives, e.g. via the cam lever 204 (FIGS. 7A-7F), the one or more of the latch elements 110,111 and/or the mating latch component 96 associated with the closure panel 6 in a direction towards leaving the slot 14, 214. Alternatively, as is shown in FIGS. 1L, 1M, the device 102 of the actuation system 101 can be used (via the mounting portion 132) to move a generic panel operation component 8 and/or an object 130 between first and second positions as noted. It is also recognized that the actuation system 101 can be mounted to the body 5 and/or the closure panel 6 of the vehicle 4, as desired, in order to effect this movement between the positions. As discussed above, one example of the object 130 is the mating latch component 96. As such, the following discussion is with respect to actuation of the mating latch component 96 between positions with respect to the slot 14 of the latch mechanism 100. Further, it is recognized that use of the latch mechanical advantage system 104 can be optional (e.g. the device 102 is directly coupled to the latch element(s) 110 and/or mating latch component 96 without use of interposed latch advantage elements 109 as shown in FIG. 7A).

The device 102 may be any suitable type of biasing member, and may include, for example, a compression spring, a torsion spring, a leaf spring, a spring made from compressed closed-cell foam, a spring made using stored energy in a piston and a cylinder holding a compressed gas, or any other suitable type of spring. In the example shown in FIGS. 8A-9C, the device 102 is made up of two compression springs shown at 102a and 102b respectively in FIG. 9a, which are concentric with one another about a pull-rod axis A. Providing the compression spring 102b within the occupied volume of compression spring 102a can increase the force exerted by the pull-device 102 with no appreciable increase in occupied volume. As shown, both compression springs 102a and 102b may be made from helically coiled circular cross-section spring steel wire, however other materials of construction and other cross-sectional shapes for the material are possible. A first end of the compression springs 102a and 102b are connected to a base plate 306, which is part of a housing shown at 308. A second end of the compression springs 102a and 102b is connected to a driver plate 310 that is connected to the second end 303b of the mounting portion 132. Thus, the compression springs 102a and 102b are operatively connected to the mounting portion 132. While the term 'pull-rod biasing member' has been used in relation to the embodiment shown in FIGS. 8A-9C, the device 102 may more generally be referred to as a mounting portion biasing member, since, in some embodiments, the mounting portion 132 can be other than a pull-rod, as noted above.

The actuation mechanism 101 can optionally include a driven assembly actuation member release mechanism or trigger mechanical advantage system 104 (also referred to as movable between a locking position (FIGS. 8A-8C) in which the trigger mechanical advantage system 104 holds the mounting portion 132 in the unactuated position, and an unlocked position (FIGS. 9A-9C) in which the trigger mechanical advantage system 104 permits the device 102 to move the mounting portion 132 towards the actuated position). In embodiments wherein the mounting portion 132 is a pull rod, the trigger mechanical advantage system 104 can be referred to as a pull-rod release mechanism. The trigger mechanical advantage system 104 may also be referred to as a closure panel actuation biasing member mechanical advantage system 104, since the mechanical advantage system 104 is part of a release chain that results in releasing the stored mechanical potential energy of the device 102 so that the device 102 can drive the closure panel 6 away from the body 5 of the vehicle 4, as coupled via the mounting portion 132, as is described further below.

In the embodiment shown in FIGS. 8A-9C, the trigger mechanical advantage system 104 can include a number of different advantage elements 109, such as but not limited to a plurality of moveable elements (e.g. balls 314) configured with a release collar 316 having collar pockets or recesses 322 configured to receive the movable elements 314 therein upon movement (e.g. rotation) of the release collar 316, whereby the trigger force Tf (see FIG. 8C) from the trigger device 103 is used to actuate the trigger mechanical advantage system 104. The release collar 316 can be biased or otherwise restrained toward the unactuated position by a release collar biasing member 324 (e.g. spring). As such, displacement of the release collar 316 provides for movement via the initiating force Ti (see FIG. 9C) of the moveable elements 314 away from the mounting portion 132 and into the collar recesses 322, i.e. out of a groove or recess 320, thus providing for release of the stored mechanical potential energy through movement of the device 102 from a first position P3 to a second position P4—see FIGS. 8A-C and 9A-C).

The restraining mechanism 323 to retain the mounting portion 132 in the unactuated position is the groove 320 (best seen in FIGS. 8C, 9C) provided in the mounting portion 132 (e.g. pull-rod) for receiving a portion of the balls 314, when the mounting portion 132 is in the unactuated position, such that cooperation of the groove 320 and balls 314 contained therein provide for restraining or retaining the mounting portion 132 (coupled to the device 102) in the unactuated position (i.e. restricting or otherwise inhibiting displacement of the device 102 from the initial position P3 to the second position P4. As such, the advantage elements 109 of the trigger mechanical advantage system 104 act on the restraining mechanism 323 via trigger force Tf, in order to provide for initiating force Ti that unlocks the restraining mechanism 323 (i.e. moves the moveable elements 314 out of the groove 320).

As discussed above, the trigger force Tf used to move the release collar 316 is advantageously less than the initiating force Ti used move the moveable elements 314 into the collar recesses 322, and as such the trigger mechanical advantage system 104 is used to provide amplification of the trigger force Tf as the initiating force Ti to release the stored mechanical potential energy of the device 102. As can be appreciated, the moveable elements 314 are used with other advantage elements 109 (e.g. collar 316 with recesses 322) of the trigger mechanical advantage system 104 to extract the moveable elements 314 from the restraining mechanism 323 (or balls 314 inserted in groove or recess(es) 320) holding back or otherwise inhibiting activation of the device 102 in moving from position P3 to position P4, whereby the release of the stored mechanical potential energy of the device 102 occurs as a result of the change in position between positions P3 (position at which the energy is stored and available) and P4 (position at which the energy is released and unavailable).

Therefore, since the device 102 contains the stored mechanical potential energy, any force Ti used to move the moveable elements 314 directly out of the groove or recesses 320 would use a force greater that the force Tf used to move the release collar 316, which aligns the collar recesses 322 with element guide apertures 319. The following describes use of the trigger mechanical advantage system 104 between the trigger system 103 and the device 102. However, it is recognized that in the alternative, the trigger force Tf can be configured to act directly on the moveable elements 314 and/or mounting portion 132, thus forcing the moveable elements 314 directly out of the restraining mechanism of the moveable elements 314 seated in the groove or recess 320 positioned in the mounting portion 132 (e.g. groove(s) in a periphery of the pull rod).

In configuration of the trigger mechanical advantage system 104, the balls 314 (e.g. advantage elements 109) are constrained angularly about an axis A at selected angular positions by a plurality of ball guides 318 (e.g. advantage elements 109), see FIGS. 8C and 9C, which have a plurality of ball guide apertures 319 (e.g. advantage elements 109) for constraining the movement of the balls 314. The ball guides 318 may extend from the base plate 306 and are thus stationary so that they constrain the balls 314 angularly. In the example embodiment shown, there are three balls 314 at positions that are constrained angularly and that are 120 degrees apart from each other about the axis A. In addition to constraining the balls 314 angularly, the ball guides 318 also constrain the balls 314 axially. The balls 314 however, are free to move radially towards and away from the axis A and out of the groove/recess 320, under initiating force Ti, as the release collar 316 is acted upon by the trigger force Tf. In this position the balls 314 are each held in the groove 320 ball guide apertures 319 by an inside surface 321 of the collar 316, such that the balls 314 extend radially between the groove 320 and via the ball guide aperture 319 and the inside surface 321. Because the apertures 319 constrain the balls 314 axially, the mounting portion 132 is retained in the unactuated position. When the release collar 316 is rotated to the actuated position (see FIG. 9C) via trigger force Tf, pockets shown at 322 on the release collar 316 align with the apertures 319, which permits the balls 314 to move out of the groove 320 and into the recesses 322 via initiating force Ti. The force of the device 102 on the mounting portion 132 drives the mounting portion 132 forward, which pushes the balls 314 out of the grooves 314 and into the pockets 322, and as such the initiating force Ti forcing the balls 314 out of the groove 320 is greater that the trigger force Tf. As a result, the mounting portion 132 is free to be driven forward to the actuated position by the device 102, thereby actuating the panel operation components 8 or object 130 (e.g. the cam lever 204 in FIGS. 7A-7F to drive the striker in a direction towards leaving the slot 14, 214).

While three balls 314 and three pockets 232 have been shown, one or more balls 314 and one or more pockets 322 can be used. While a continuous groove 320 has been shown and described in the mounting portion 132, it is not necessary to provide a continuous groove. Alternatively, individual pockets could be provided in the pull-rod for each ball 314. Any reduction in the diameter of the mounting portion 132 where there is a wall that behind the balls 314 so that the balls 314 can obstruct the movement of the mounting portion 132 to the actuated position could be sufficient to restrain or otherwise inhibit (via the mounting portion 132) movement of the device 102 along the axis A to effect the release of the stored energy. Further, instead of balls any other suitable rolling member or, more generally any other suitable retaining member or moveable element could be used, such as, for example spherical roller bearing elements (i.e. capsule shaped elements), spring loaded pins, etc.

While the term 'pull-rod release mechanism has been used in relation to the embodiment shown in FIGS. 8A-9C, it will be noted that in embodiments wherein the mounting portion 132 is not a pull-rod (e.g. in embodiments wherein it pushes another component instead of pulls another component), the trigger mechanical advantage system 104 may be referred to as a driven assembly actuation member release mechanism.

Figure 9B:
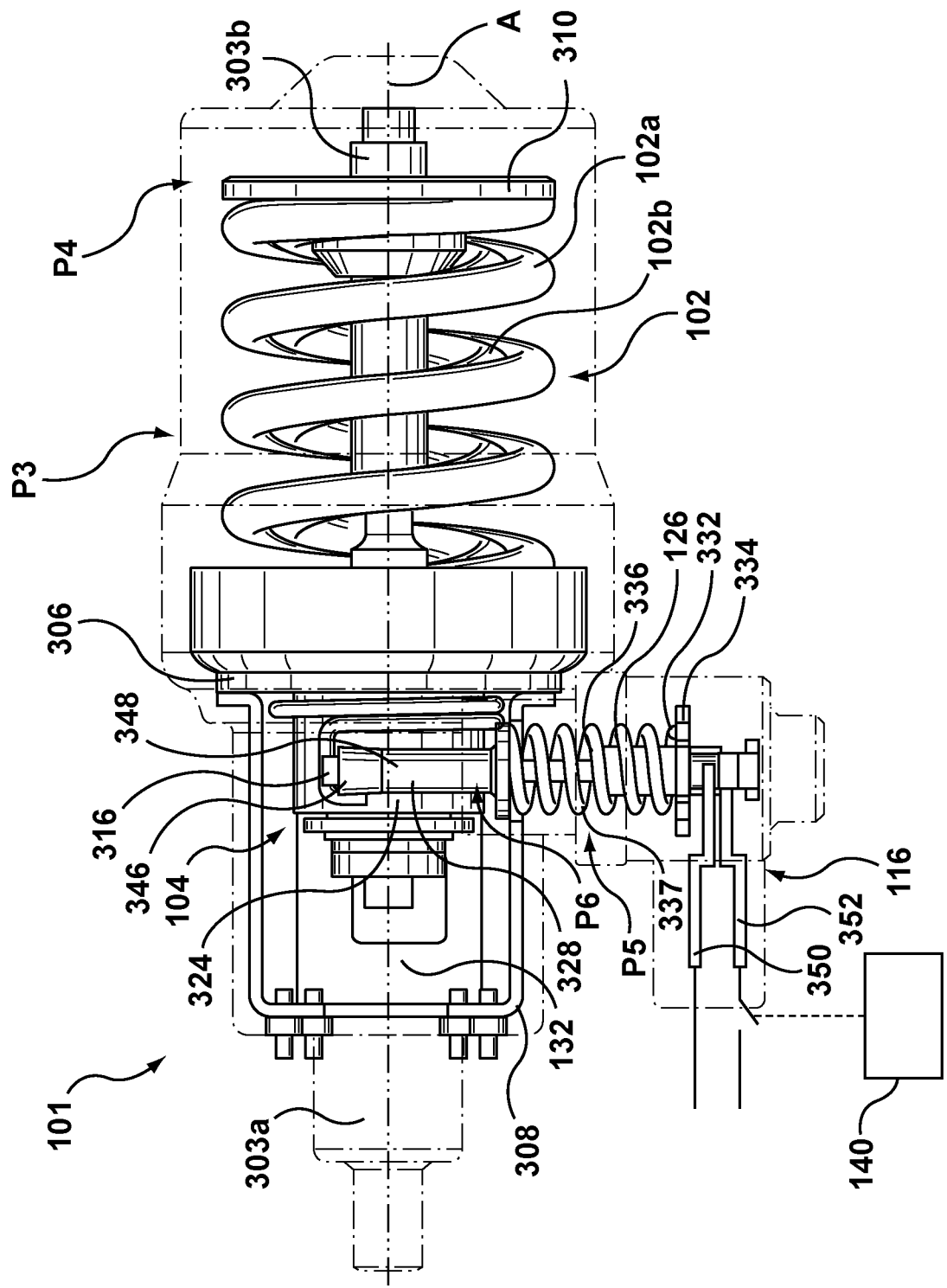

The trigger system 103 includes an actuation member 328, which in the embodiment shown in FIGS. 8A-9C is a rigid member and may be referred to as a firing pin 328, that is movable between an unactuated position P5 (FIGS. 8A-8C) and an actuated position P6 (FIGS. 9A-9C). Movement of the firing pin 328 to the actuated position P6 can unlock the restraining mechanism 323, for example using the advantage elements 109 of the trigger mechanical advantage system 104. Alternatively, movement of the firing pin 328 to the actuated position P6 can unlock the restraining mechanism 323 by unlocking the restraining mechanism 323 directly by forcing the balls 314 out of contact with the groove 320 (e.g. providing a force tangential to the mounting portion 132 and impacting a portion (e.g. balls 314) of the restraining mechanism 323 directly, as compared to using the trigger mechanical advantage system 104 to allow a portion of the stored mechanical potential energy of the device 102 to provide the initiating force Ti.

In the example where the firing pin 328 acts upon the intermediate trigger mechanical advantage system 104, the firing pin 328 is shown as pushing the release collar 316 to the actuated position. It will be understood that in an alternative embodiment the firing pin 328 could be arranged so that the firing pin 328 pulls the release collar 316 to the actuated position.

The firing pin 328 can be biased towards the actuated position by a driver assembly loading mechanism actuation member (e.g. trigger biasing member 126—see FIG. 1O), which in the embodiment shown in FIGS. 8A-9C may be referred to as a driver assembly firing pin biasing member or simply a firing pin biasing member. The trigger biasing member 126 may be any suitable type of biasing member, such as, for example, a compression spring that has a first end 332 that abuts a base plate 334 that is part of the housing 308, and a second end 336 that abuts a first end 337 of the firing pin 328. As discussed above, the trigger biasing member 126 moves between a trigger initial position C and a trigger second position D, as the frying pin 328 moves from the first position P5 to the second position P6.

A driver assembly fuse member 117 (e.g. biasing element restraining member—see FIG. 1O) retains the driver assembly firing pin 328 and the coupled trigger biasing element 126 in the unactuated position C,P5. In the embodiment shown, the biasing element restraining member 117 has a first end 340 with a first ferrule 342 on it that is engaged with the housing 308, and a second end 344 with a second ferrule 346 on it that abuts a second end 348 of the firing pin 328. The length of the biasing element restraining member 117 is selected so that there is a selected amount of potential energy stored in the biasing member 126 when the firing pin 328 is in the unactuated position. The biasing element restraining member 117 may be made from any suitable material such as a suitably conductive material with a selected amount of resistance to electrical current. Furthermore, the biasing element restraining member 117 can be made from a material that is capable of withstanding the biasing force of the biasing member 126 when no current is passed through it and that softens sufficiently when a selected current is passed through it that the biasing force of the biasing member 126 causes it to fail in tension. Once the biasing element restraining member 117 fails, the biasing force of the biasing member 126 drives the firing pin 328 towards the actuated position. Optionally, in turn the firing pin 328 can drive the release collar 316 towards the unlocking position, which brings the pockets 322 into alignment with the balls 314. This in turn provides a space for the balls 314 to get out of the way of the restraining mechanism 323 of the mounting portion 132, thereby permitting the rod to advance towards the actuated position by the device 102.

Electrical conduits shown at 350 and 352 (FIGS. 8A, 8B, 9A and 9B) are one example of the destructive element 116 (see FIG. 1O), such that each of the conduits 350,352 connect at one end to the biasing element restraining member 117. When the other ends of the electrical conduits 350 and 352 are connected to an electrical source, a current can pass through the length of biasing element restraining member 117 between the conduits 350 and 352, which, due to the resistance of the biasing element restraining member 117, can generate heat in the fuse member 338. Specifically it can generate sufficient heat in the biasing element restraining member 117 to soften the biasing element restraining member 117 sufficiently to permit the biasing member 126 to overcome the biasing element restraining member 117 by providing for plastic deformation of the material of the biasing element restraining member 117 under tension (i.e. to cause the biasing element restraining member 117 to fail in tension) and drive the firing pin 328 towards the actuated position. In some cases it can even melt or partially melt the section of biasing element restraining member 117 that is between the joints with the first and second electrical conduits 350 and 352. In the embodiment described above, the biasing element restraining member 117 may also be referred to as a driver assembly restraint member, since it retains the firing pin 328 in the unactuated position and restrains the firing pin 328 from leaving that position. The electrical conduits 350 and 352 may thus together be referred to in broader terms as a driver assembly restraint member disabler or destructive device 116 that is controllable to disable or destroy the restraint member 117 to permit the biasing member 126 to drive the firing pin 328 towards the actuated position.

Alternatively, the biasing element restraining member 117 can be under compression, as acted upon by the trigger biasing element 126. In this embodiment, destruction to the material of the biasing element restraining member 117 by the destructive element 316 would cause the biasing element restraining member 117 to fail in compression, thus permitting the biasing member 126 to drive the firing pin 328 towards the actuated position.

In some embodiments, the biasing element restraining member 117 may itself not be the conductor of the electric current, but may be heated by a conductor of the electric current as implemented by the destructive element 116 positioned adjacent to the biasing element restraining member 117 (not shown). For example, a separate resistive heating element (not shown) may be electrically joined to the electrical conduits 350 and 352, and can be heated by an electrical current, and transfer its heat to the biasing element restraining member 117 to soften it and cause it to fail under load (e.g. compression or tension) as provided by the trigger biasing member 126.

This indirect heating example could render more flexible the choice of materials from which to make the biasing element restraining member 117, since it need not have any special degree of electrical conductivity (although it may have a selected thermal conductivity with a selected cross sectional area sufficient to restrain the trigger biasing member 126 in the unactuated position). In some embodiments, the aforementioned separate resistive heating member as the destructive element 116 can be embedded within or positioned on rather than adjacent to the biasing element restraining member 117. In embodiments where the separate resistive heating member is provided as the destructive element 116, the biasing element restraining member 117 can be solely a restraint member instead of being referred to as a fuse member.

A further example of the biasing element restraining member 117 is a retaining pin or clip having sufficient structural integrity to hold the trigger biasing member 126 in the unactuated position, such that action on the pin or clip by the destructive element 116 causes plastic deformation (or melting) with the material of the pin or clip, such that the structural integrity of the pin or clip is destroyed sufficiently to allow for the release of the trigger biasing member 126 from the first position C to the second position D (see FIG. 1O).

Alternatively, the destructive device 116 can be embodied as a mechanical device, such that when actuated by a controller 140 (see FIG. 1I), the mechanical device (e.g. a blade, a hammer, etc) can sufficiently destroy the structural integrity of the biasing element restraining member 117, thus allowing for the release of the trigger biasing member 126 from the first position C to the second position D (see FIG. 1O).

As such, in general, the controller shown at 140 (see also FIG. 1I) may be provided to receive the signal 143 indicating that a collision is occurring or is imminent. In the embodiment shown in FIGS. 8A-9C, when the controller 140 receives such a signal 143, it sends current (or other trigger signal 144) to the trigger system 103 (e.g. to the electrical conduits 350 and 352 (e.g. by closing a switch) to cause the biasing element restraining member 117 to fail under load). This in turn permits the trigger biasing member 126 to drive the firing pin 328 to the actuated position, which can drives the release collar 316 to the unlocked position. As a consequence of the firing pin 328 firing, the mounting portion 132 is driven to the actuated position (e.g. by the device 102 due to release of the stored energy). Due to its connection with the coupling member 210, the mounting portion 132 is operatively connected to the panel operation component 8 or object 130 (e.g. cam lever 204) and thus the movement of the mounting portion 132 drives the movement of the panel operation component 8 or object 130 (e.g. cam lever 204 to drive the striker towards leaving the slot 14), as described.

As discussed above, instead of a restraint member 117 that is softened directly via an electric current passing through it and heating, or indirectly by being heated by a separate resistive heating element that is heated by an electric current, it is possible to provide a restraint member 117 that is cut or otherwise weakened by some mechanical means, such as a blade (not shown) that is actuated to strike the restraint member 117. In such embodiments the mechanical means (e.g. the blade) may be referred to as a restraint member disabler or device 116. Actuation of the blade may be by any suitable means, such as by an electric solenoid, by a pneumatic cylinder, or by any other suitable means. The carrying out of the actuation of the blade may be controlled by the controller 140. The restraint member 117 in such embodiments may nonetheless be made from a metallic wire, although it need not be any particular electrical or thermal conductivity. In such embodiments, the electrical conduits 350 and 352 can be optional.

In some embodiments the driven mounting portion 132 may act directly on the latch advantage elements 109 (e.g. cam lever 204) and not indirectly through the coupling member 210. In some embodiments, the mounting portion 132 can act on the latch advantage elements 109 through a cable or the like instead of the coupling member 210. In some embodiments, the mounting portion 132 can act on the coupling member 210 via a cable or the like or via some other member.

In embodiments wherein the actuation mechanism 101 is provided, it is not necessary to arrange the coupling member 210 to initially direct forces generally through the pivot point of the latch advantage elements 109 (e.g. cam lever 204). This is because the actuation mechanism 101 only exerts a load on the latch advantage elements 109 when there is a collision event that is sensed as occurring or is imminent.

Also, in some embodiments, it may not be necessary to provide the other elements of the actuation mechanism 101 aside from the advantage elements 109, although some means for actuating the latch elements 110,111 (e.g. pawl 40) (such as an arm extending from the latch advantage elements 109—e.g. cam lever 204 that would engage the release lever 50) could be used in embodiments wherein the pawl 40 and ratchet 24 are provided. Such an arm can be considered to be an auxiliary release lever. Any auxiliary release lever that is described herein as engaging the release lever 50 could alternatively be arranged to directly release the pawl 40 instead or could be arranged to cause the release of the pawl 40 in some other way. Thus, the auxiliary release lever could be described as being operatively connected to the pawl 40.

In some embodiments, it may be possible to omit the trigger mechanical advantage system 104 and device 102, and to directly drive the movement of the coupling member 210 with the trigger assembly 103 and/or the (e.g. with the driver member 328).

It will be noted that the firing pin 328 causes an opening force to be exerted that results in driving the striker towards leaving the slot 14, in the case of the latch mechanism 100, such that the opening force (e.g. from the device 102) is separate from the biasing force from the ratchet biasing member 35 (which also drives the striker towards leaving the slot 14 when it drives the ratchet 24 towards the open position). Thus the closure panel 6 when coupled to the latch mechanism 100 (e.g. latch elements 110,111 coupled to the closure panel 6 and mating latch component 96 coupled to the body 5, or latch elements 110,111 coupled to the body 5 and mating latch component 96 coupled to the closure panel 6) is driven outwards away from the body opening 13 even faster than it would be simply if it simply relied on the ratchet biasing member 35 as the driving force.

It has been found through experimentation that in at least some embodiments, the actuation mechanism 101 was deployed within about 18 milliseconds. To melt or sufficiently soften the restraint member 117 (e.g. fuse) the electrical conduits 350 and 352 were shorted. It will be noted that the conduits 350 or 352 can connect to the vehicle battery through an automotive fuse (not shown), as can be dictated by local regulations or as can be dictated by the vehicle manufacturer. In at least some embodiments, if the automotive fuse were to blow prior to sufficient softening of the restraint member 117, the firing pin 328 could fail to actuate. It has been found experimentally, however, that an automotive fuse can be selected for use in this application, whereby the automotive fuse takes longer to blow than it takes for the restraint member 117 to fail and the firing pin 328 actuated. In an example, the automotive fuse may be selected to handle about 30 amps and the current carried by the conduits 350 and 352 when shorted is about 300 amps. During an experiment it was found that the automotive fuse could withstand such an event for about 30 milliseconds before blowing, while the restraint member 117 would soften sufficiently to permit actuation of the firing pin 328 in about 2-3 milliseconds. As a result, the firing pin 328 was actuated reliably without blowing of the automotive fuse.

While the actuation member 328 has been shown as a firing pin in the figures, it will be noted that it could alternatively be some other element, such as, for example, a cable, that is connected to an end of the member biasing member 126 by a flange or the like. In such an instance, the device 102 may be positioned on the other side of the release collar 316 (i.e. to the left of the release collar 316 in the view shown in FIG. 8*c*), with the cable connected to the release collar 316. Actuation of the device 102 would drive the flanged end of the biasing member 126 away from the release collar 316 which, through the cable, would pull the release collar 316 in the same direction that the collar 316 is shown to be pushed by the firing pin 328 in FIGS. 8A-9C.

While the trigger biasing member 126 has been shown to be a compression spring, it may alternatively be a tension spring, a torsion spring, a leaf spring, a spring made from compressed closed-cell foam, a spring made using stored energy in a piston and a cylinder holding a compressed gas, or any other suitable type of spring.

It will be noted that the biasing member 126 may be weaker than the device 102, optionally much weaker. Thus, by providing both a trigger system 103 the device 102, it is advantageous to input relatively little energy (e.g. trigger force Tf) to the device 102 (e.g. via the trigger mechanical advantage system 104) (enough to soften the restraint member 117 sufficiently to permit the biasing member 126 to overcome the restraint member 117), while exerting a large force to actuate the coupling member 210 (i.e. a larger force than would be exerted if the firing member 328 were directly connected to the coupling member 210). By contrast if a loading mechanism were provided that only included the trigger assembly 103 with associated biasing element 126 that were configured to exert the same force as is provided by the biasing member of the device 102, a relatively thick restraint member 117 may be required, and so a relatively large amount of current (or other destructive force) by the destruction element 116 might be required to quickly cause such a restraint member 117 to fail. Such a relatively larger current (or mechanical destructive force) can necessitate larger gage electrical conduits than can be provided in the device 102 shown in FIGS. 8A-9C and a relatively high amperage automotive fuse that can withstand the high current used without blowing prematurely. It is nonetheless contemplated that in some embodiments it may be practical to provide the device 102 with only a driver assembly such as trigger system 103 such that the firing member 328 acts on another component such as the link pivot or on any other suitable component used to drive the closure panel 6 outwards from the body opening 13 (e.g. to an injury-reduction position).

Figure 10A:
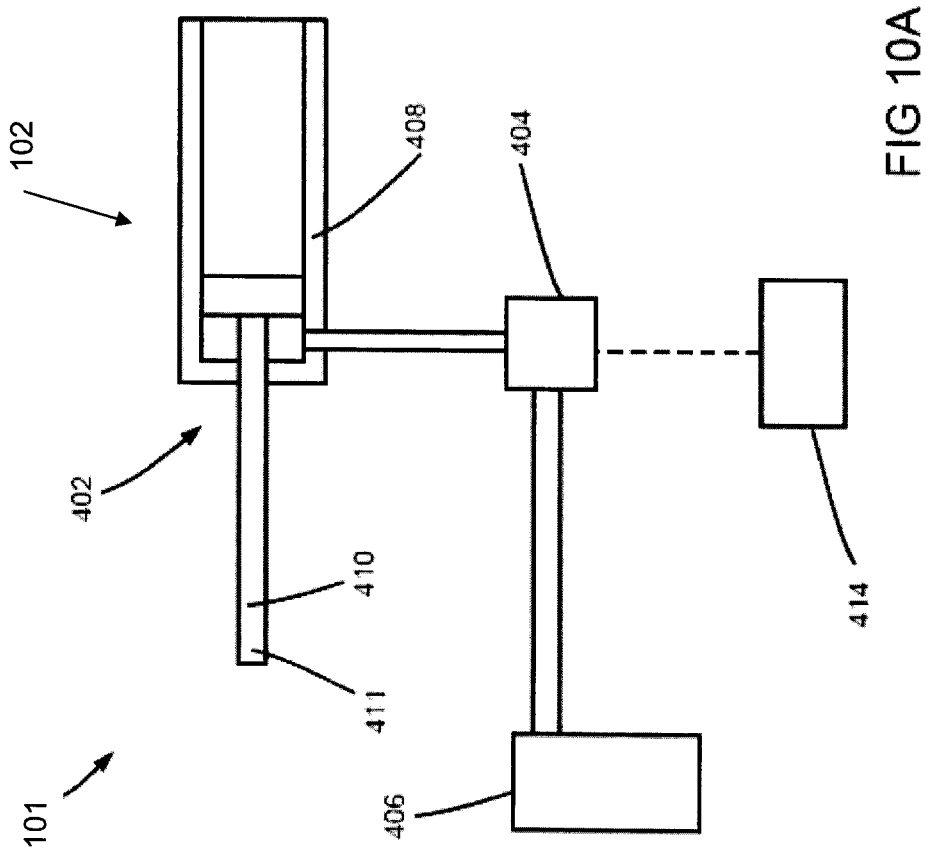
FIGS. 10A and 10B are schematic views of an alternative loading device that can be part of the pop-up mechanism shown in FIG. 1, in unactuated and actuated states respectively.
Figure 10B:
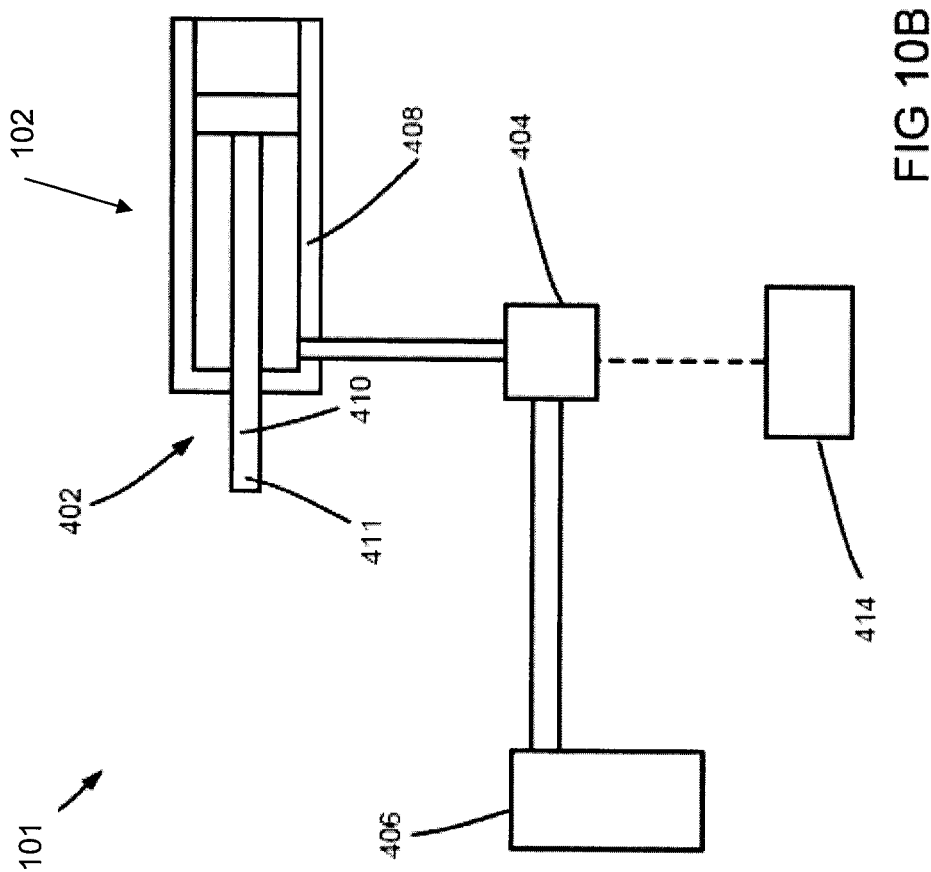

Reference is made to FIGS. 10A and 10B, which show the alternative actuation system 101. The device 102 of the actuation system 101 includes a fluid-actuated cylinder 402, a control valve 404 and a source of pressurized fluid 406. The cylinder 402 includes a cylinder housing 408 and a piston 410 that is movable in the cylinder housing 408 between an unactuated position (FIG. 10A) and an actuated position (FIG. 10B). A piston biasing member (not shown) may be provided and can bias the piston 410 towards the unactuated position, so as to keep the piston 410 in the unactuated position when the vehicle 4 is not incurring a collision event. The piston 410 acts as a pull-rod and has a free end 411 that may connect pivotally to a connecting member (e.g. a rigid bar or a cable), which in turn may connect pivotally to a free end of the coupling member 210 (see FIG. 2 by example), which in turn connects to the panel operation component 8 and/or object 130 (see FIGS. 1L,1M). Alternatively, any other suitable connection may be provided. For example, the free end 411 of the piston 410 may connect pivotally directly to the free end of the coupling member 210.

The control valve 404 is actuated by a controller, shown at 414, which may be similar to the controller 140, between a closed position (FIG. 10A) and an open position (FIG. 10B). In the closed position, the control valve 404 prevents fluid flow to the cylinder 402 thereby preventing actuation of the cylinder 402. In the open position the control valve 404 permits fluid flow from the source of pressurized fluid 406 to the cylinder 402 to drive the piston 410 to the actuated position. The source of pressurized fluid 406 may simply be a vessel containing any suitable fluid, such as, for example, compressed Carbon Dioxide at a suitable pressure, such as, for example 2000 psi. In this embodiment, the control valve 404 may be referred to as a release member that is controllable to expose the piston 410 to the pressurized fluid. In another embodiment, the source of pressurized fluid 406 may be an inflation device that is similar to an airbag inflation device, and that includes an igniter and two combustible chemicals, such as Sodium Azide and Potassium Nitrate, which, when ignited by the igniter, generate Nitrogen at high pressure which can be used to drive the piston 410 to the actuated position. In such an embodiment, a control valve would not be needed. However, a controller, similar to controller 140 controls the operation of the igniter. In such an embodiment, the igniter may be referred to as a release member that is controllable to expose the piston 410 to the pressurized fluid.

Reference is made to FIGS. 11-14 which show an alternative actuation mechanism 101 and latch 502 to the actuation mechanism 101 and latch 100 shown in FIGS. 1A-9C. The latch 502 includes a ratchet 504 and pawl 506 (e.g. latch elements 110), which are similar to the ratchet 24 and pawl 40 of FIG. 2, and which pivot about pivot points 505 and 507 (e.g. latch elements 110) respectively. The latch 502 further includes a ratchet biasing member 508 (e.g. latch retaining element 111) and a pawl biasing member 510 (e.g. latch retaining element 111) which bias the ratchet 504 and pawl 506 towards an open position and a primary locking position respectively, used to facilitate movement (or retention) of the mating latch component 96 in the slot 526 of the latch 502.

The actuation mechanism 101 includes the trigger system 103 having firing pin 328, the restraint member (e.g. the fuse member 117—see FIG. 8C) and the firing pin biasing member (126—see FIG. 8C) which are similar as those shown in FIGS. 8A-9C, and a closure panel biasing member 514 (similar to device 102—see FIG. 8B used to store the mechanical potential energy activated by the trigger system 103) and a mechanical advantage system 104 having advantage elements 109 of a closure panel actuation biasing member release mechanism 516, which can include a restraint member lever 518 and a closure panel actuation biasing member release lever 520. The mechanical advantage system 104 (and associated advantage elements 109) are used to provide the initiating force Ti based on the trigger force Tf (see FIGS. 9C and 7A as examples). The closure panel actuation biasing member 514 (for storing the mechanical potential energy is used to drive the closure panel 6 outwards from the vehicle opening 13—see FIG. 1A, as actuated by the trigger system 103) in this instance is a torsion spring that has a first end 521 engaged with an end support 522 that will be described further below and a second end 523 that is engageable with a roller 524 that extends from the ratchet 504.

The closure panel actuation biasing member 514 is movable from an unactuated position shown in FIGS. 11-14, to an actuated position in which it engages the roller 524 on the ratchet 504 and drives the ratchet 504 towards the open position, thus providing for movement of the ratchet 504 (e.g. latch element 110) and associated mating latch component 96 positioned therein in the second predefined time period. As noted above, the second predefined time period is less than the first predefined time period experienced when operating the ratchet 504 using the ratchet biasing member 508 alone, without activation of the closure panel actuation biasing member 514. The movement of the ratchet 504 (under bias by the both the ratchet biasing member 508 and closure panel actuation biasing member 514 when triggered) can drive the mating latch component 96 in a direction towards leaving the slot shown at 526 in the latch housing shown at 528 and thus drives the closure panel 6 (see FIG. 1A) towards the injury-reduction position. Thus movement of the closure panel actuation biasing member 514 toward the actuated position drives the closure panel 6 towards the injury-reduction position.

The closure panel actuation biasing member release lever 520 of the mechanical advantage system 104 is pivotable about a pivot point 530 and is movable (i.e. pivotable in this instance) between an unactuated position (FIGS. 11-14) in which it holds the biasing member 514 in the unactuated position (via engagement of a projection 533 on the release lever 520 and the second end 523 of the biasing member 514) and an actuated position in which it moves out of the way and thus permits the biasing member 514 to move to the actuated position.

The restraint member lever 518 mechanical advantage system 104 is itself pivotable about a pivot point 531 and is movable (i.e. in this instance, pivotable) between an unactuated position and an actuated position in which it drives the movement of the closure panel actuation biasing member release lever 520 to the actuated position. More specifically, the restraint member lever 518 mechanical advantage system 104 includes a projection 532 that is captured by a fork 534 on the firing pin 328. As a result, movement of the firing pin 328 to its actuated position drives movement of the restraint member lever 518 of the mechanical advantage system 104 to its actuated position. The restraint member lever 518 has a cam surface 536 (e.g. advantage element 109) thereon that engages a head 538 on the closure panel actuation biasing member release lever 520, though which it drives the movement of the release lever 520 to the actuated position. In the view shown in FIG. 11, the movement of the restraint member 518 toward the actuated position is to the left, the pivoting of the restraint member lever 518 towards the actuated position is counterclockwise, and the pivoting of the release lever 520 towards the actuated position is counterclockwise.

The biasing member 514 need not directly engage the ratchet 504 during movement to the biasing member's actuated position, nor during movement of the ratchet 504 all the way to the ratchet's ultimate position when bringing the closure panel 6 to the injury-reduction position. It is sufficient for the biasing member 514 to impart an initial force to the ratchet 504 and to permit the ratchet 504 to complete the movement on its own, via the momentum it gained from the biasing member 514 and under the bias of the ratchet biasing member 508. The ratchet 504 may move to a secondary closed position or secondary locking position which is similar to the secondary position of the ratchet shown and described in the embodiment shown in FIGS. 1A-9C. In this secondary position, the ratchet 504 is restrained from movement all the way to its open position by engagement of surface or shoulder 540 on the ratchet with pawl 506.

Figure 11:
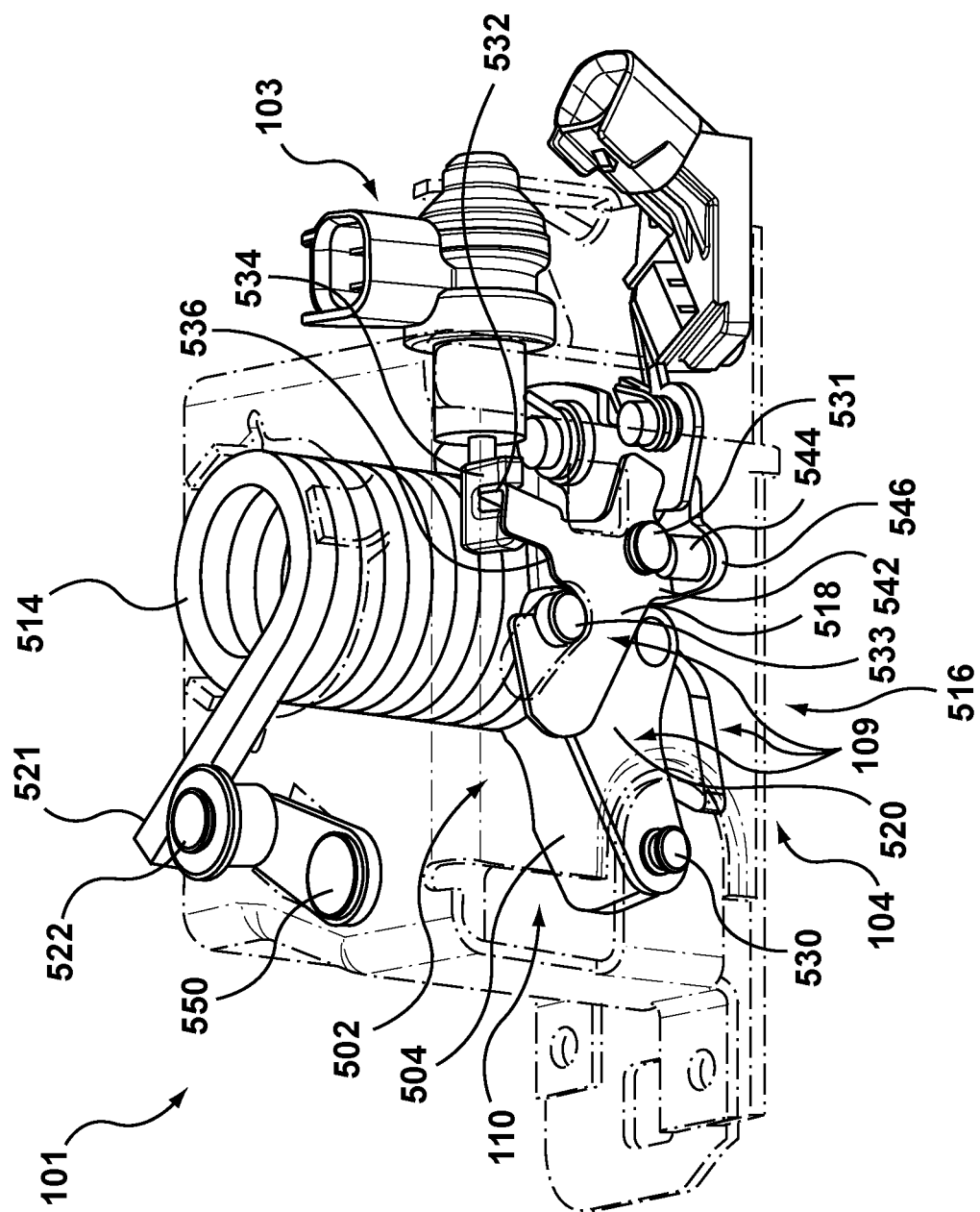
FIGS. 11-14 are perspective and plan views of another embodiment of a latch and pop-up mechanism.
Figure 12:
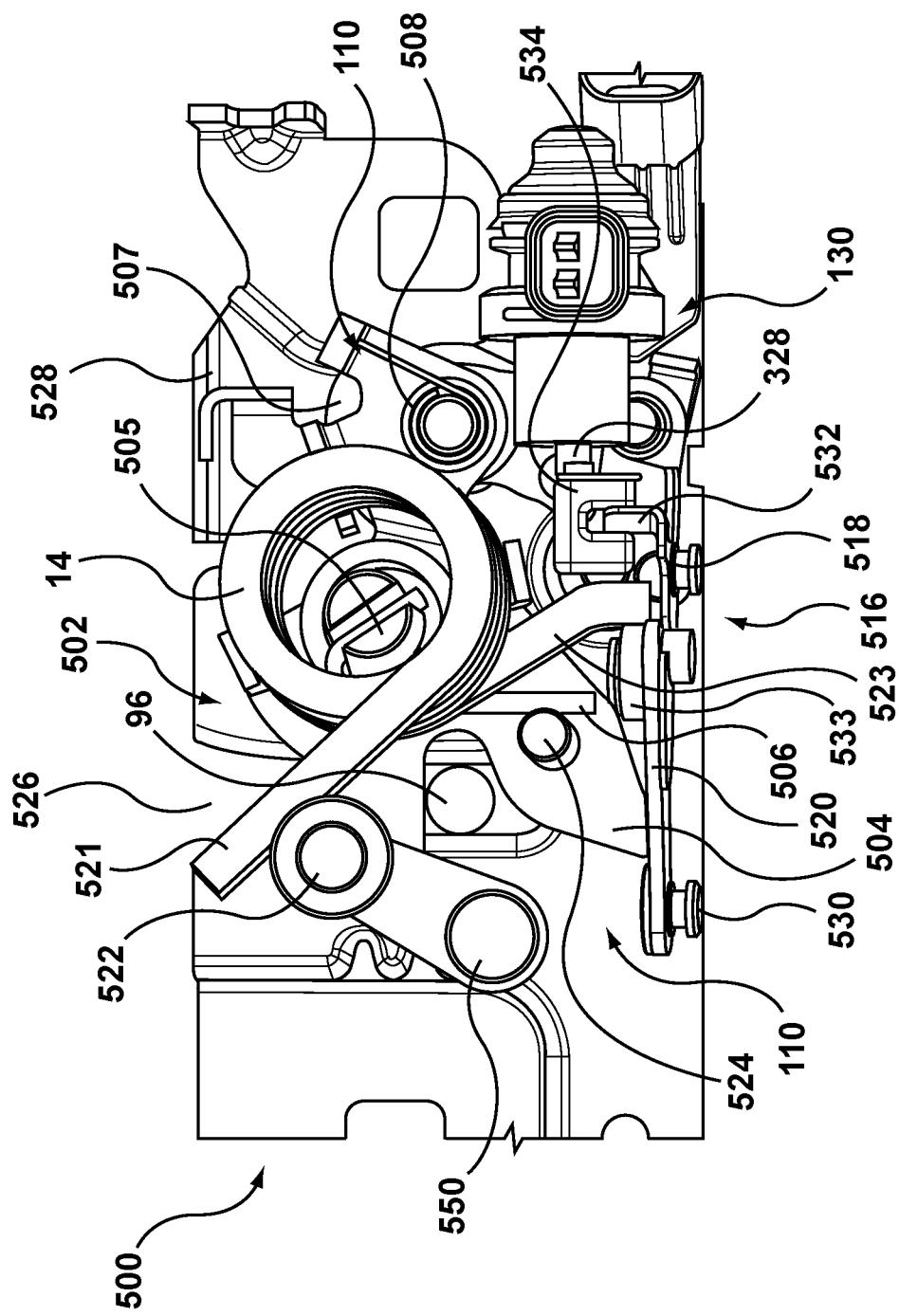
Figure 13:
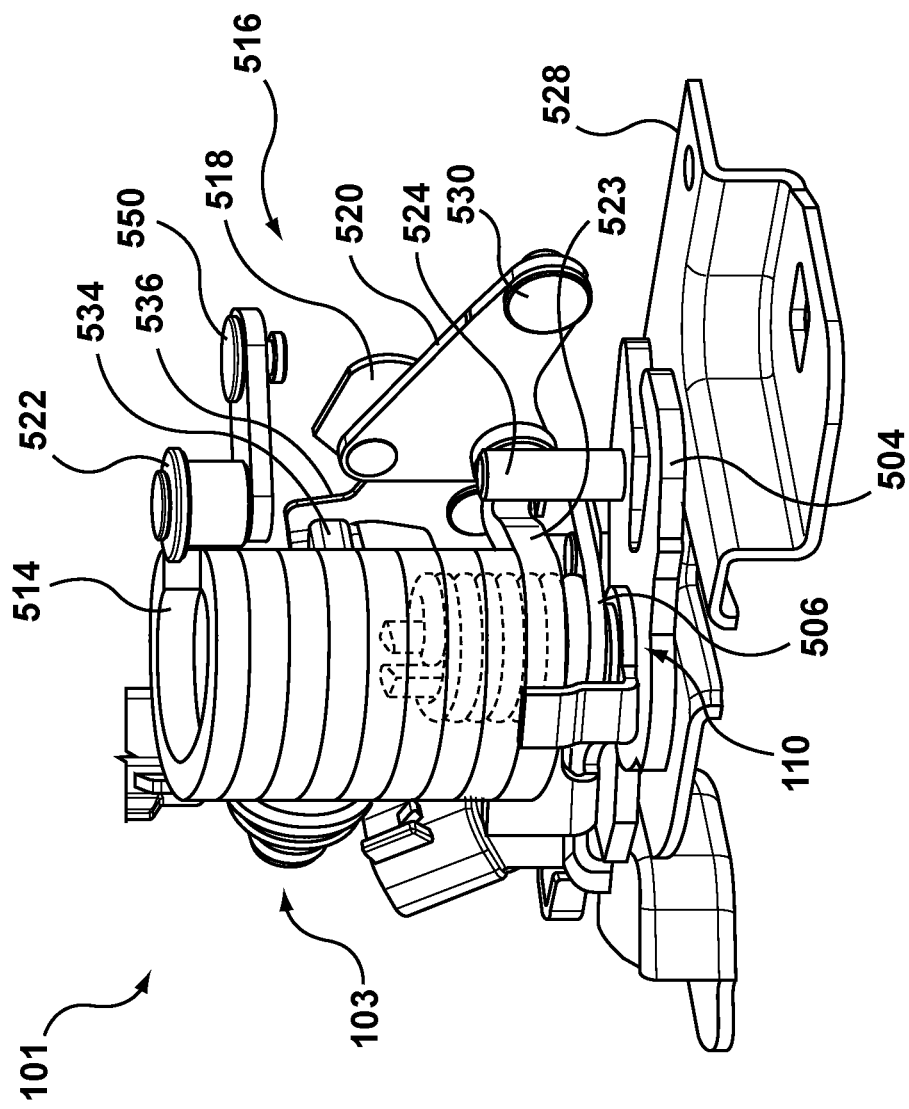
Figure 14:
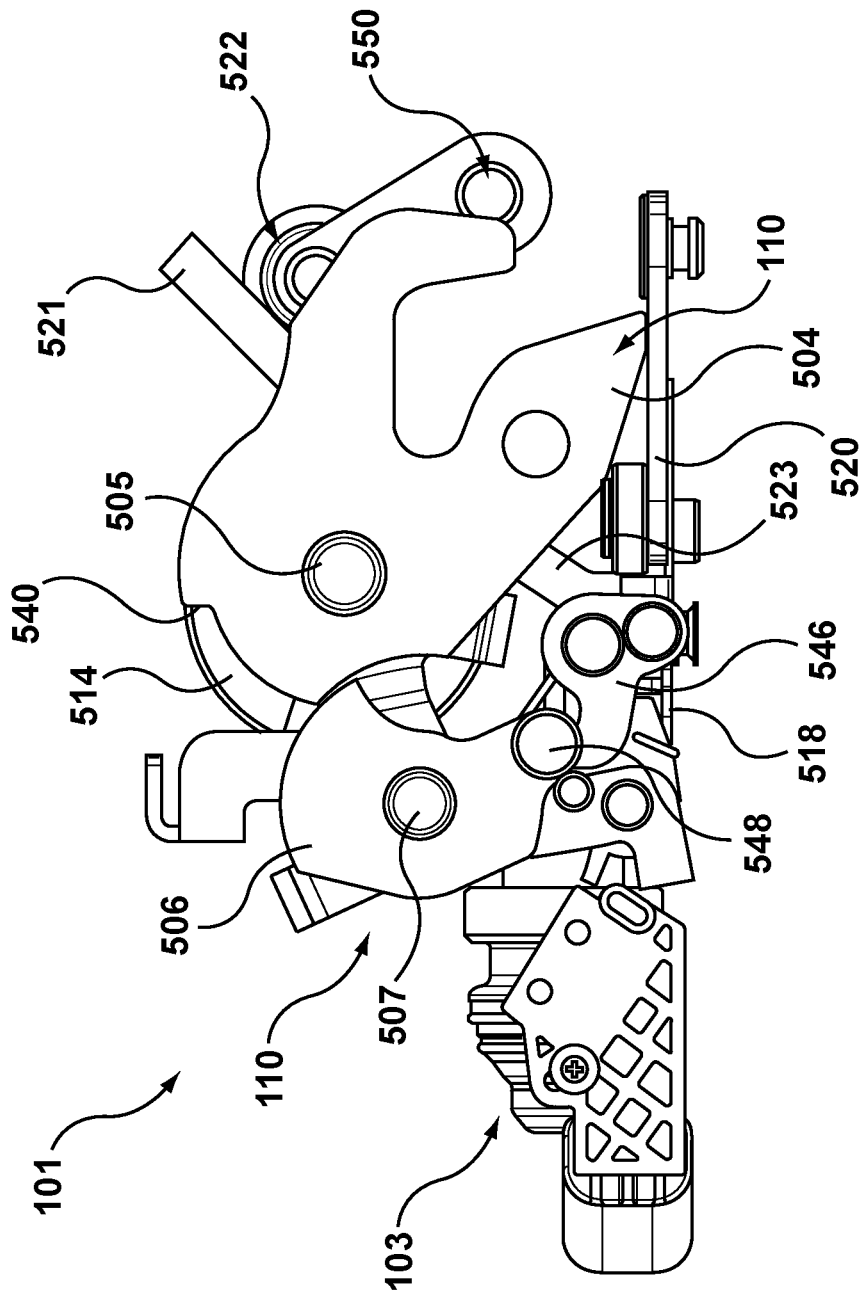

In addition to driving the closure panel 6 to the injury-reduction position, the actuation system 101 may also be responsible for the bringing the pawl 506 to a position in which it permits the ratchet 504 to move towards the open position (i.e. to move to the secondary closed position). Referring to FIG. 11, the restraint member lever 518 includes an arm 542 that is engageable with a projection 544 on a pawl unlocking member 546. Movement of the restraint member lever 518 moves the pawl unlocking member 546 to a pawl unlocking position in which it engages a projection 548 on the pawl 506 and drives rotation of the pawl 506 to a secondary locking position in which it permits movement of the ratchet 504 (and associated mating latch component 96 in slot 526) from the primary closed position to the secondary closed position.

The actuation of the firing pin 328 by the trigger biasing member (not shown in FIGS. 11-14), and the restraint of the firing pin 328 by the restraint member (not shown in FIGS. 11-14) and the disablement/destruction of the restraint member can be similar to that shown in FIGS. 8A-9C. It will be noted that the release lever 520 can be configured so that, when it is in the unactuated position and restrains the biasing member 514, the line of force of the biasing member 514 on the projection 533 is approximately through the pivot point 530 of the release lever 520 (i.e. advantage elements 109 so configured). As a result, relatively little force is needed to hold the release lever 520 in the unactuated position so as to hold the biasing member 514 in the unactuated position. As such, use of the mechanical advantage system 104, and associated advantage elements 109, is similar to those mechanical advantage system 104 shown for FIGS. 1A-9C, such that the trigger force Tf supplied by the trigger system 103 (e.g. pin 328) is less that the initiating force Ti used to release the biasing member 514 via the advantage elements 109 (e.g. via release lever 520 and pivot point 530).

After use of the actuation system 101, structure may be provided to reset the biasing member 514. To do this the end support 522 is pivotable about pivot point 550 between a biasing member loading position (as shown in FIGS. 11-14) in which it loads the biasing member 514 so that it is ready for use, and a biasing member reset position in which it permits easy movement of the biasing member 514 to its unactuated position. This facilitates movement of the ratchet 504 (e.g. latch element 110) back to its primary closed position so that the vehicle 4 can be safely driven to a service station if necessary. As such, upon replacement of the trigger system 103 as a replacement module) post firing, or for example as simply replacing the restraining element 117 that was destroyed in the trigger system 103 mounted on the actuation system 101 and moving the trigger biasing element 126 (see FIG. 8C) back to the first position from the second position, the biasing member 514 is resettable.

The actuation system 101 has been described as including the firing pin 328, the restraint member 117 (e.g. the fuse member) and the firing pin biasing member 126—see FIG. 1O. The firing pin 328 was operatively connected to the closure panel 6 of the vehicle via the mounting portion 132, the pull-rod biasing member 102 and the pull-rod release mechanism of mechanical advantage system 104 in the embodiment shown in FIGS. 8A-9C, or the biasing member 514, and release mechanism 516 (of mechanical advantage system 104) in the embodiment shown in FIGS. 11-14. It will be understood however that the firing pin 328 may be operatively connected to the closure panel 6 by any other suitable means instead of the means shown in FIGS. 8A-9C and 11-14. It may be operatively connected directly with the closure panel 6, for example, if the firing pin biasing member 126 is sufficiently strong to directly move the closure panel 6 to the injury-reduction position.

Figure 15:
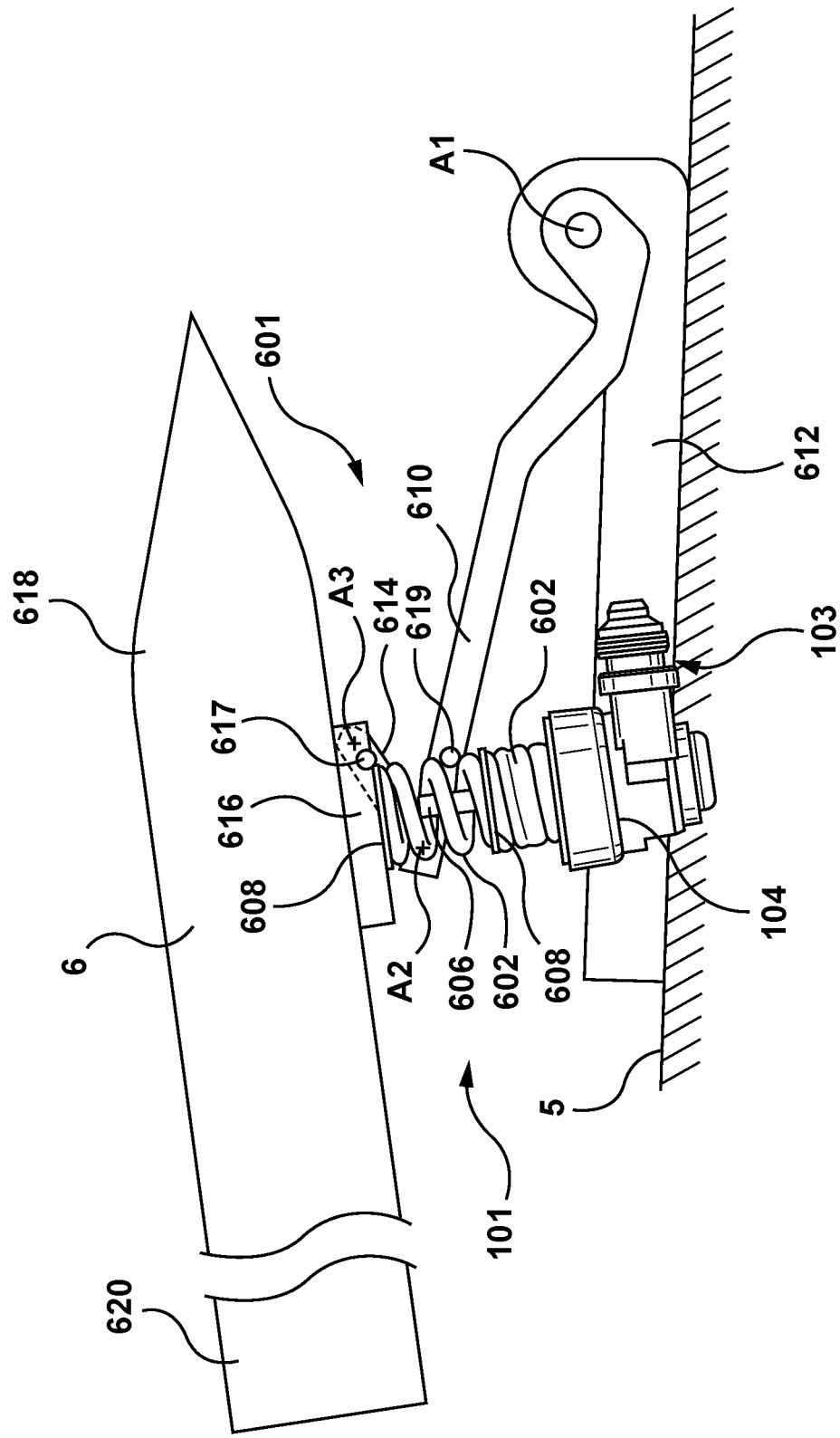
FIG. 15 is a side view showing another embodiment of a pop-up mechanism and a hinge mechanism that is shown as transparent so as not to obscure components covered thereby.

While it has been shown to provide the actuation mechanism 101 on a vehicle closure panel latch 100, it is alternatively or additionally possible to provide a actuation mechanism 101 at the hinged end of the closure panel 6, e.g. via the hinge assembly 94 (see FIG. 1A). An example of such an embodiment is shown in FIG. 15. The closure panel 6 is mounted to the body 5 of the vehicle via a hinge mechanism 601. The actuation mechanism 101 may include the firing pin 328 (which may be referred to as the driver assembly actuation member 328), the restraint member 117 (which may be referred to as the driver assembly restraint member 117), the firing pin biasing member 126 (which may be referred to as the driver assembly actuation member biasing member 126), and, in situations where the force of the firing pin 328 is not sufficient, additional structure can be provided, such as the closure panel actuation biasing member 602 (which may also be referred to as the driven assembly actuation member biasing member 602 similar to the device 102 used to store the mechanical potential energy released via the trigger system 103), and a closure panel actuation biasing member release mechanism 104 that can contain one or more mechanical advantage elements 109—see FIGS. 8A and 8C by example).

The biasing member 602 is shown in both the unactuated and actuated positions in FIG. 15. In this embodiment, the closure panel actuation biasing member 602 is similar to the closure panel actuation biasing member 102 and may includes one or more compression springs, and the closure panel actuation biasing member release mechanism 104 can be similar to the closure panel actuation biasing member release mechanism 104 shown in FIGS. 8A-9C. In this embodiment, an actuation member 606 (which may be referred to as a driven assembly actuation member), which is engaged with the biasing member 602 through driver plate 608, is driven into the closure panel 6 (upon actuation via the trigger system 103 of the biasing member 602) and pushes the closure panel 6 upwards away from the vehicle body 5. Thus, in this instance, the actuation member 606 is not a pull-rod in the sense that it pushes instead of pulls, although aside from that difference, the actuation member 606 may be similar to the actuation member 132. The vehicle body 5, for the purposes of the description herein, may include all the portions of the vehicle 4 that remain essentially fixed in position relative to each other under normal circumstances, such as the vehicle frame, the body panels, the roof, the windshield and other components. In FIG. 15, the driver plate 608 and the biasing member 602 are shown in both the unactuated (shown as retracted) and actuated (shown as extended) positions.

The hinge mechanism 601 (e.g. hinge 98 of FIG. 1A), which is provided at a hinged end (shown at 618) of the closure panel 6, may be different than a typical, single pivot, hood hinge in that the hinge mechanism 601 can be articulated and can include a first hinge member 610 that is pivotally connected to a stationary member 612 about first hinge pivot axis A1. The stationary member 612 may be a first hinge base that is fixedly mounted to a portion of the vehicle frame 5 and may thus be considered to be a portion of the vehicle body 5. The hinge mechanism 601 can include a second hinge member 614 that is pivotally connected to the first hinge member 610 about a second hinge pivot axis A2 that is spaced from the first hinge pivot axis A1. The second hinge member 614 is also pivotally connected to a second hinge base 616 which may be on the closure panel 6 about a third hinge pivot axis A3 that is spaced from the pivot axis A2. The second hinge base 616 may be considered to be part of the closure panel 6. The hinged end 618 of the closure panel 6 may be the rear end, however, it may alternatively be the front end of the closure panel 6. There are some vehicles 4 that have closure panels 6 that open forwardly and that therefore have a hinged end that is the front end of the closure panel 6, and consequently have a latched end that is at the rear end of the closure panel 6.

While only a single hinge mechanism 601 is visible in the side view shown in FIG. 15, it will be understood that the closure panel 6 may be connected to the vehicle body 5 by any suitable number of hinges, such as one hinge, two hinges as is typical in automobiles, or more. In the embodiment shown, a second hinge mechanism 601 is provided but is directly behind the hinge mechanism 601 that is shown in FIG. 15, and so the second hinge mechanism 601 is not visible in that view. The actuation system 101 may be provided at each hinge mechanism 601, or alternatively may be provided somewhere else that is suitable at the hinged end of the closure panel 6. For example, a hinge mechanism 601 may be provided along a hinged rear end of the closure panel 6, near the sides of the closure panel 6, and the actuation system 101 can be provided along the hinged rear end of the closure panel 6, generally centered along the hinged rear end of the closure panel 6. Thus there is no need for the actuation system 101 to be physically close or otherwise adjacent to the hinges 601.

A detent of any suitable kind may be provided between the second hinge member 614 and the closure panel 6 (e.g. with the second hinge base 616 specifically) so as to provide resistance to pivoting of the second hinge member 614 about the pivot axis A3. Alternatively or additionally a detent could be provided between the second hinge member 614 and the first hinge member 610 so as to resist pivoting of the first hinge member 610 about the second axis A2. In either case, the detent substantially eliminates articulation of the first and second hinge members 610 and 614 relative to each other when the latched end 620 of the closure panel 6 is lifted in normal closure panel operation (i.e. separate to otherwise not in conjunction with actuation of the actuation system 101), so that effectively the hinge mechanism 601 acts as a single-pivot hinge unless a force provided by the actuation system 101 is exerted that overcomes the detent. In the embodiment shown in FIG. 15, the detent is provided by a ball plunger 617 on the second hinge member 614 which engages a depression 619 on the first hinge member 610.

When the closure panel 6 is moved along a first path (i.e. pivoted open by lifting the latched end 620), a moment is exerted on the closure panel 6 that urges the second hinge member 614 to move in a clockwise direction (in the view shown in FIG. 15) about the second pivot axis A2, however such movement of the second hinge member 614 is resisted by the abutment of a shoulder or the like (not shown) on the second hinge member 614 with a shoulder or the like (not shown) on the first hinge member 610. As a result, the first hinge member 610, the second hinge member 614 and the closure panel 6 all move as one and pivot about the first pivot axis A1, and the closure panel 6 opens with the hinge mechanism 601 operating as a single-pivot hinge. It will be noted that the moment referred to above is also generated when a person lowers the closure panel 6 towards its closed position and so the hinge mechanism 601 acts as a single-pivot hinge during closing of the closure panel 6 also. However, when the closure panel 6 is latched at its front end 620 in the primary closed position, actuation of the actuation mechanism 101 lifts the hinged end 618 of the closure panel 6, overcoming the detent (if a detent is provided) and drives the closure panel 6 to move upwards along a second path to its injury-reduction position, and the hinge mechanism 601 articulates as necessary to accommodate this movement of the closure panel 6. Similarly, if the closure panel 6 were latched in the secondary closed position or were being driven to the secondary closed position by actuation mechanism 101, the actuation of the actuation mechanism 101 again lifts the hinged end 618 of the closure panel 6, overcoming the detent (if a detent is provided) and drives the closure panel 6 to move upwards along a second path to its injury-reduction position, and the hinge mechanism 601 articulates as needed to accommodate this movement of the closure panel 6.

Thus, as can be seen, the hinge mechanism 601 operates as a single-pivot hinge when the latched end 620 of the closure panel 6 is lifted, and articulates to permit translation of the hinged end 618 of the closure panel 6 away from the vehicle body 603 when the hinged end 618 is lifted. It will be noted that movement of the driver assembly actuation member 328 of the trigger device 103 to the actuated position may be said to cause lifting of the hinged end 618 of the closure panel 6 (i.e. it causes movement of the closure panel 6 along the aforementioned second path). It will be further noted that movement of the driven assembly actuation member 606 to the actuated position (in embodiments wherein the actuation member 606 is provided) may also be said to cause lifting of the hinged end 618 of the closure panel 6.

It will be noted that the actuation mechanism 101 may abut the closure panel 6 when the closure panel 6 is closed, but it might not be fixedly connected to it. This permits the closure panel 6 to be opened without the need for the actuation mechanism 101 to move with it.

Figure 16:
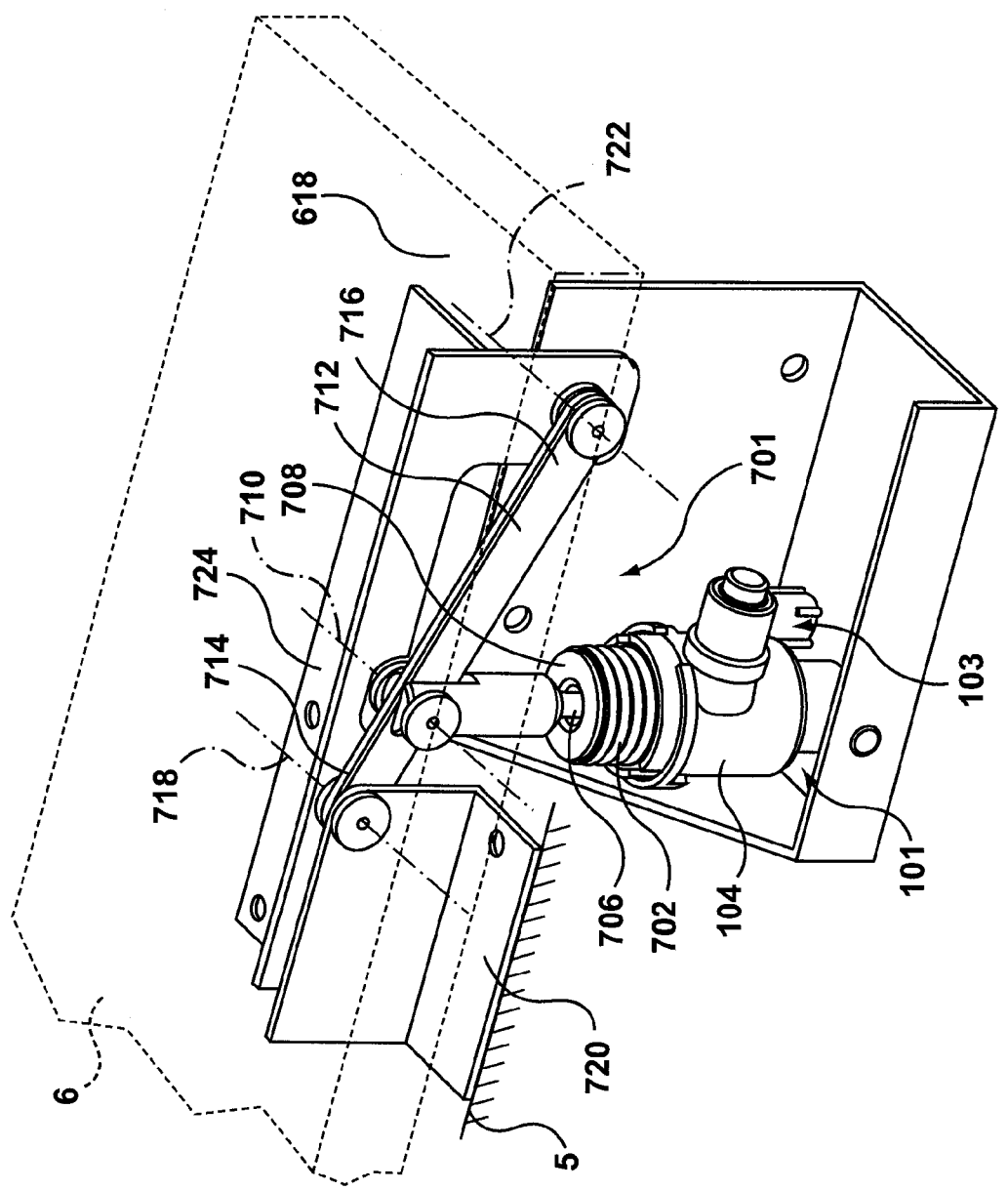
FIG. 16 is a perspective view of another embodiment of a pop-up mechanism and another hinge mechanism.

Reference is made to FIG. 16, which shows an actuation mechanism 101 and hinge mechanism 701 that may be used in place of the hinge mechanism 601 at the rear of the closure panel 6 (shown as being transparent, and shown only partially in FIG. 16). The actuation mechanism 101 may include the firing pin 328, the restraint member 117, the firing pin biasing member 126 (none of which are shown in FIG. 16) of the trigger system 103, and, in situations where the force of the firing pin 328 is not sufficient, additional structure can be provided, such as the closure panel actuation biasing member 702 (which may be referred to as a driven assembly actuation member biasing member 702 similar to the device 102 and as such provides the stored mechanical potential energy as triggered by the trigger system 103) and a closure panel actuation biasing member release mechanism as the mechanical advantage system 104 having appropriate advantage elements 109—not shown). The biasing member 702 is shown in the unactuated position in FIG. 16. The closure panel actuation biasing member 702 may be similar to the closure panel actuation biasing member 102 (FIG. 8A-9C) and may includes one or more compression springs, and the closure panel actuation biasing member release mechanism 104 is similar to the closure panel actuation biasing member release mechanism 104 shown in FIGS. 8A-9C.

In the embodiment shown in FIG. 16, an actuation member 706 (which may be referred to as a driven assembly actuation member 706), which is engaged with the biasing member 702 through driver plate 708, is pivotally connected via a pin joint at an engagement axis 710 with a pivot link 712. The engagement axis 710 is positioned between a first end 714 of the pivot link 712 and a second end 716 of the pivot link 712. The pivot link 712 is pivotally connected at a first end pivot axis 718 to a stationary member 720. The stationary member 720 may be a first hinge base that is fixedly mounted to a portion of the vehicle frame and may thus be considered to be a portion of the vehicle body 5. The pivot link 712 is pivotally connected at a second end pivot axis 722 to a hood bracket 724, which mounts fixedly to the closure panel 6 and which may be considered to be part of the closure panel 6. The pivotal connection at the second end pivot axis 722 between the pivot link 712 and the hood bracket 724 is the hinge point of the closure panel 6 during normal use. In other words, when the closure panel 6 is opened by lifting the latched end 620 (not shown in FIG. 16), the closure panel 6 will pivot about the pivot axis 722.

When the actuation mechanism 101 is actuated, as triggered by the trigger system 103, the actuation member 706 drives the pivot link 712 to pivot about the first end pivot axis 718, which in turn drives the rear end of the hood 299 (which, as noted above, is pivotally connected to the pivot link 712 at the pivot axis 722) upwards. The amount of upward movement of the rear end of the closure panel 6 depends on the amount of extension of the actuation mechanism 101 during actuation, the position of the engagement point 710 between the actuation member 706 and the pivot link 712 as compared to the position of the second end pivot axis 722. It will be noted, however, that the amount of upward movement of the hinged end 618 of the closure panel 6 is made larger than the amount of extension of the actuation mechanism 101 by virtue of the use of the pivot link 712 and by positioning the engagement axis 710 so that the distance between the engagement axis 710 and the first end axis 718 is less than the distance between the second end axis 722 and the first end axis 718. Providing a larger upward movement of the closure panel 6 to reach the injury-reduction position is advantageous in that it moves the closure panel 6 farther away from hard points such as the engine, thereby providing a greater amount of room for deceleration of a pedestrian prior to hitting such hard points.

Thus, as can be seen, the hinge mechanism 701 operates as a single-pivot hinge when the latched end 620 of the closure panel 6 is lifted, and articulates to permit translation of the hinged end 618 of the closure panel 6 away from the vehicle body 5 when the hinged end 618 of the closure panel 6 is lifted. It will be noted that movement of the driver assembly actuation member 328 to the actuated position may be said to cause lifting of the hinged end 618 of the closure panel 6 (i.e. it causes movement of the closure panel 6 along the aforementioned second path). It will be further noted that movement of the driven assembly actuation member 706 to the actuated position (in embodiments wherein the actuation member 706 is provided) may also be said to cause lifting of the hinged end 618 of the closure panel 6.

While a hood has been described as the closure panel 6 in which the various activation mechanisms 101 have been applied to, it will be noted that any closure panel may have the activation mechanism 101 connected thereto, such as, for example, a trunk lid. For example, in some vehicles, such as those that have mid-mounted, or rear-mounted engines, a trunk and a trunk lid are provided at the front of the vehicle.

Those skilled in the art will understand that a variety of modifications may be made to the embodiments described above whilst still while still utilizing the essence thereof. For example, those skilled in the art will appreciate that while the illustrated embodiment applies the release actuator 103 to the crash lever 230, this lever may be omitted and the release actuator applied directly to the catch lever 220. Likewise, due to the geometry of the ratchet and pawl set of the illustrated latch 100 a separate release lever 240 is provided to actuate the primary release lever 50 but in alternative embodiments a release engagement feature can be integrated with the catch lever 220 to actuate the primary release lever 50. Of course, in those applications where the pop-up latch 100 is used without the latch 100 the release lever 240 or equivalent release engagement feature may be omitted.

Furthermore, alternative embodiments can use a different latch and release mechanism to hold the cam lever 204 in a rest state and release it for rotation upon command. In such alternative embodiments a plural chain of pivoting or otherwise moving levers may provide the function of a single lever in the illustrated embodiment or a single lever may (as mentioned) provide the function of a plural chain of pivoting or otherwise moving levers in the illustrated embodiment. Thus the phrase "kinematic connection" or "kinematically connected" or the like with respect to first and second components should be understood as the first component being either directly connected or integral with the second component or indirectly connected to the second component through one or more intermediary levers or members.

Figure 17:
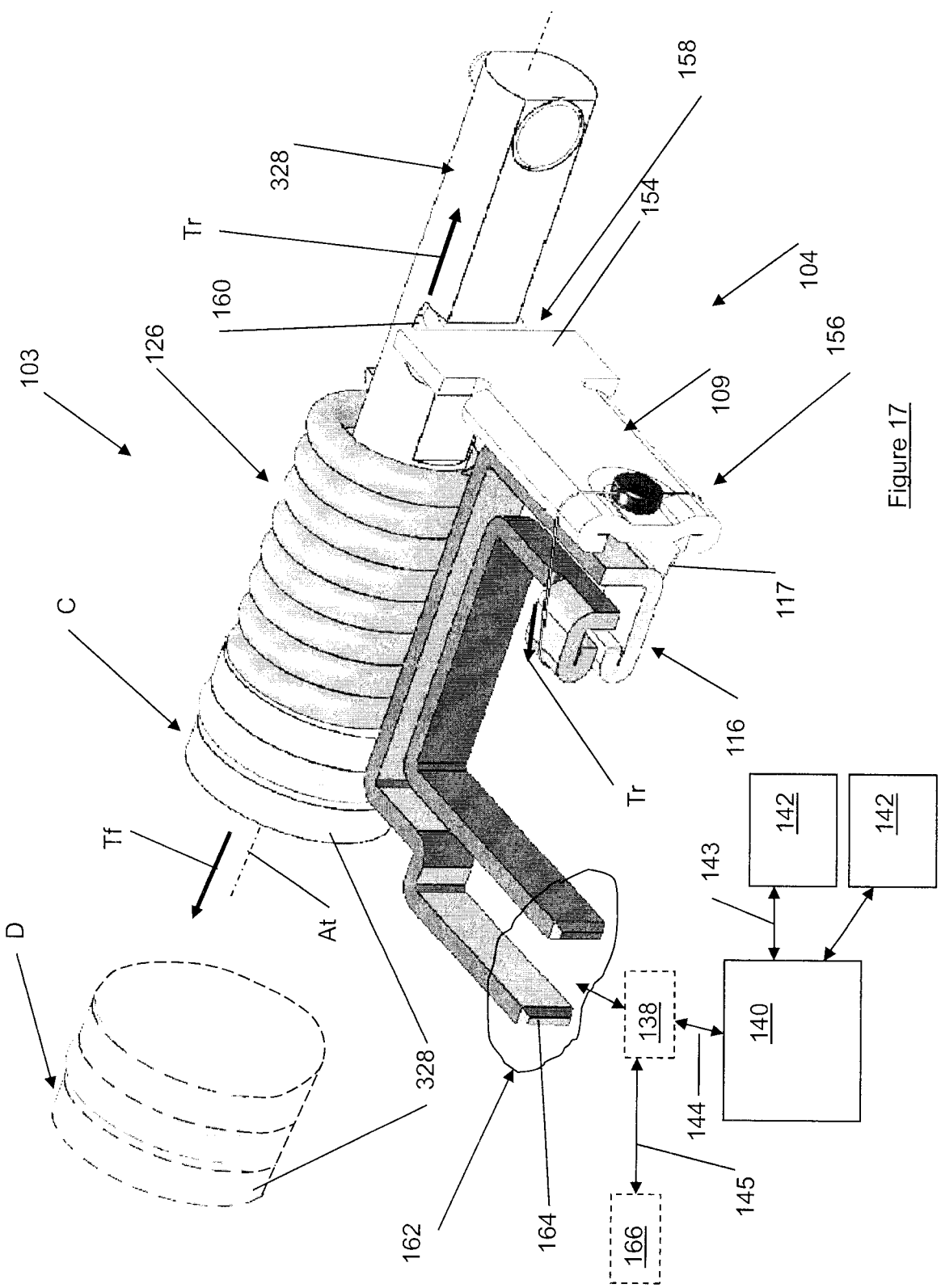
FIG. 17 is a perspective view of an alternative embodiment of the trigger assembly of FIG. 2.
Figure 18:
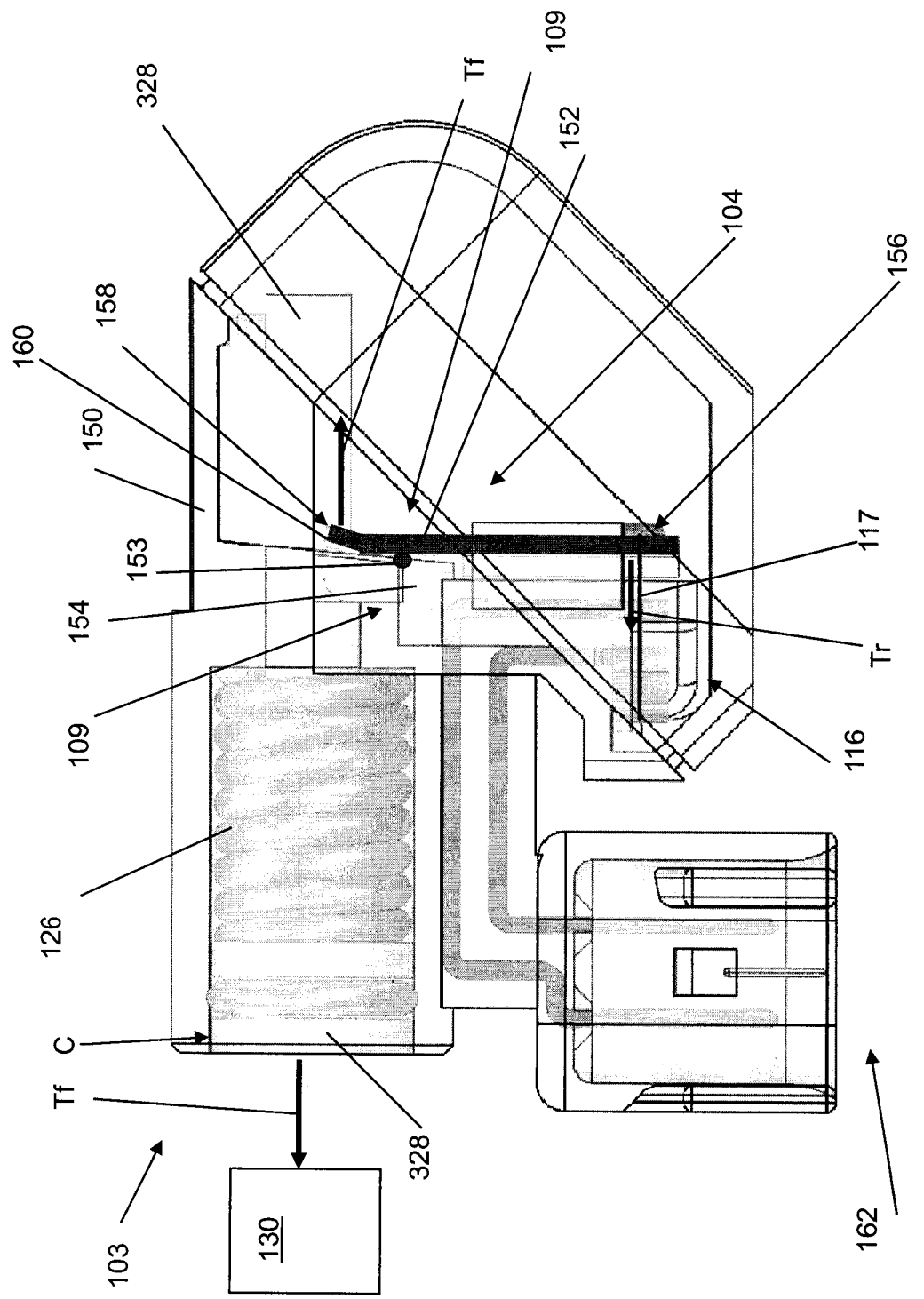
FIG. 18 is a side view of the trigger assembly of FIG. 17.

Referring to FIGS. 1O and 17,18, shown is a multi-component trigger system 103 having a destructive element 116 for destroying a retaining element 117, which is holding back the release of a trigger biasing element 126 (e.g. a spring), as further described below, such that destruction of the retaining element 117 provides for the trigger force Tf as a result of the trigger biasing element 126 moving from the first trigger position C to the second trigger position D (shown in ghosted view), such that the movement of the trigger biasing element 126 releases stored mechanical potential energy (e.g. spring energy). For ease of illustration only, the ghosted view of elongated trigger biasing element 126 is omitted. For example, the trigger biasing element 126 can be a spring (e.g. coil spring, torsion spring, etc) as further described below. For example, the restraining element 117 can be a wire or filament or other retaining structure under tension.

Figure 19:
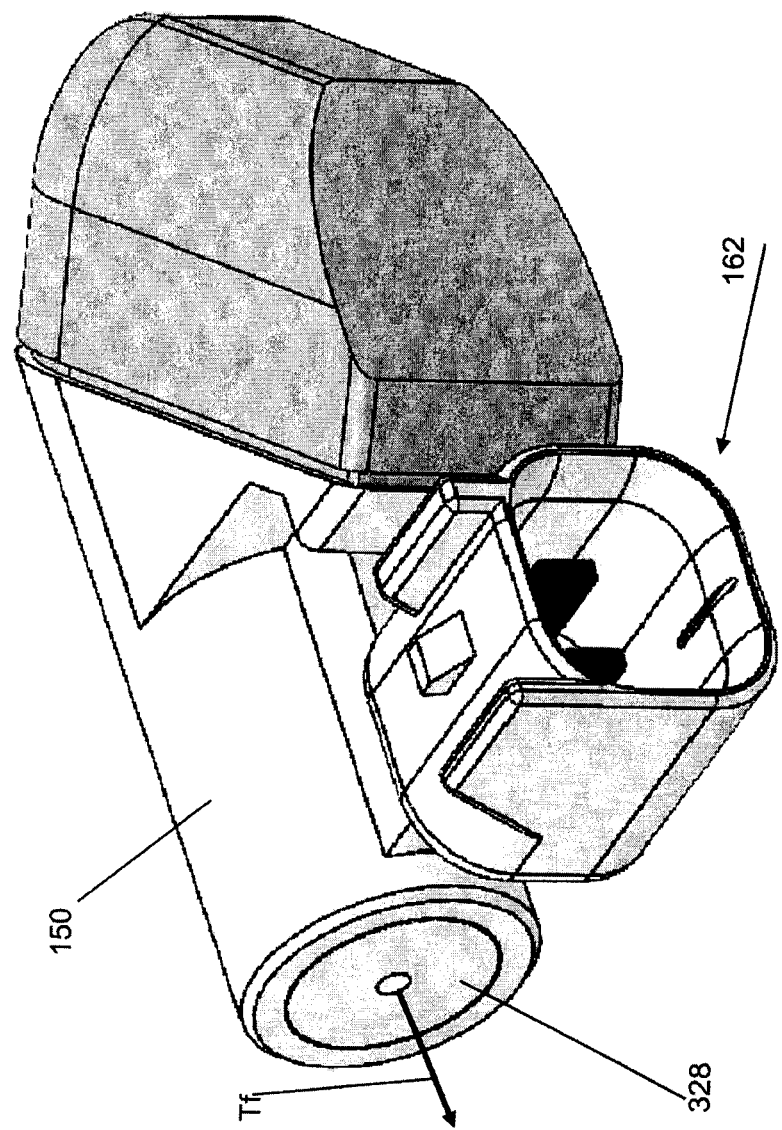
FIG. 19 is a further perspective view of the trigger assembly of FIG. 17.

As can be understood from FIG. 19, firing member 328 (e.g. a rod) could extend from the housing 150 in direction of trigger force Tf, upon change of position (e.g. extension or retraction) of the trigger biasing element 126 upon release. Alternatively (not shown), the firing member 328 (e.g. a cable) could extend into the housing 150 in direction of trigger force Tf, upon change of position (e.g. extension or retraction) of the trigger biasing element 126 upon release. The components of the trigger system 103 are mounted in a housing 150. Release of the trigger biasing element 126 result in the trigger force Tf, which can be applied via the firing member 328 (e.g. rod, cable, etc.) that is coupled to the trigger biasing element 126. As such, the firing member 328 is configured to apply the trigger force Tf to an adjacent object 130 (e.g. a component of the actuation mechanism 101 and/or adjacent object 130—see FIG. 1M), such that the firing member is coupled to and movable with the trigger biasing element 126 from first position C to second position D.

Referring again to FIGS. 17 and 18, the trigger biasing element 126 is coupled to the restraining element 117, such that destruction of the restraining element 117 by the destructive element 116 provides for release of the trigger biasing element 126 to move from the first trigger position C to the second trigger position D. In terms of the destructive element 116, this can be configured to be actuated by a switch 138 or other electronically activated element (e.g. MOSFET or other relay) to damage the structural integrity of the restraining element 117, such that the release of the trigger biasing element 126 is a result of a loss of tension in the restraining element 117 due to a decrease in the structural integrity caused by the damage caused by the destructive element 116. One example of the destructive element 116 is configured to damage a structural integrity of the restraining element 117 (e.g. wire), such that the release is a result of a loss of said tension (e.g. retaining force Tr) in the restraining element 117 due to a decrease in the structural integrity caused by the damage. For example, the destructive element 116 can be configured to cause plastic deformation in one or more portions of the restraining element 117. This plastic deformation can be caused by mechanical impact of the destructive element 116 with the one or more portions of the restraining element 117 (e.g. nicking or otherwise cutting or pinching a cross sectional area of a wire). For example, the destructive element 116 can be mechanically actuated and the plastic deformation due to mechanical impact between the destructive element and the one or more portions of the restraining element 117.

Alternatively, the destructive element 116 can be electronically actuated and the plastic deformation due application of a current as the destructive element 116 to the one or more portions of the restraining element 117. Current introduced into the restraining element 117 (e.g. via the switch 138) can cause a softening of the restraining element 117 material due to heating (or burning) of the restraining element 117 material, which can cause plastic deformation of the material. In an extreme case, the current introduced into the restraining element 117 (e.g. via the switch 138) can cause softening of the restraining element 117 material to the point of material melting or vaporization, also referred to as plastic deformation of the material which could occur shortly before the material melts or vaporizes.

Alternatively, the destructive element 116 can be electronically actuated and include a heating element (not shown) positioned adjacent to the one or more portions of the restraining element 117, such that heating of the heating element causes a corresponding heating of the one or more portions of the restraining element 117. Alternatively, the destruction element 116 can be a chemically or explosively activated element (not shown) causing damage to or otherwise removal of the detent function (of the trigger biasing element 126) provided by the restraining element 117.

Referring to FIGS. 8B, 9C and FIG. 17, the retaining element 117 can take a number of different configurations. For example, the retaining element 117 can be coupled directly to the trigger biasing element 126, such that it is understood that a retaining force Tr experienced by the retaining element 117 can be equal to the trigger force Tf provided by the trigger biasing element 126 when in the first trigger position C. Alternatively, the retaining element 117 can be configured as a plurality of retaining elements 117 (not shown), such that the resultant force of each of the individual retaining forces Tr in each of the plurality of retaining elements 117 can be equal to the trigger force Tf provided by the trigger biasing element 126 (when in the first trigger position C). A further alternative retaining element 117 configuration is seen in FIG. 17, such that a mechanical advantage system 104 indirectly couples the restraining element 117 to the trigger biasing element 126.

Further, the trigger system 103 can have the optional mechanical advantage system 104 having a plurality of mechanical advantage components 109. In the case of the mechanical advantage system 104, the plurality of advantage elements 109 are configured to couple the retaining element 117 with the trigger biasing element 126, such that cooperation of the plurality of advantage elements 109 provides for a reduction in a retaining force Fr used by the retaining element 117 (e.g. expressed as tension in the retaining element 117) to hold back or otherwise restrain the trigger force Tf from being released upon movement of the trigger biasing element 126 from the first position C to the second position D. In the case where the mechanical advantage system 104 is optional, then the retaining force Tr would be equal or otherwise substantially equivalent to the trigger force Tf expressed by the trigger biasing element 126, when at the first position C. Accordingly, when the retaining element 117 is coupled to the trigger biasing element 126 via the mechanical advantage system 104, the retaining force Tr is less than trigger force Tf. This reduction in the magnitude of the retaining force Tr is advantageous, as the magnitude of destructive effort applied to the retaining element 117 (by the destructive element 116) would also be less than in the case where the mechanical advantage system 104 is absent from the trigger system 103. As discussed above with reference to the actuation system 101 and latch assembly 10, the mechanical advantage supplied by the advantage elements 109 can include two or more mechanical devices (e.g. one or more levers, one or more gears, one or more pulleys, one or more inclined planes (e.g. screws), one or move pivots) cooperating to trade off forces against movement of the advantage elements 109 to obtain a desired amplification in the retaining force Tr in order to balance or otherwise restrain the larger trigger force Tf.

It is recognized that due to the cooperating movement of the advantage elements 109, the smaller retaining force Tr is amplified to balance the larger trigger force Tf, such that magnitude of force Tf is greater than magnitude of force Tr. In this example, movement of the advantage elements 109 due to a release of retaining force Tr also causes for release of the trigger force Tf, thus causing the release of stored mechanical potential energy of the trigger biasing element 126 to be applied as part of driving trigger force Tf.

As shown in FIG. 18, an example of the advantage elements 109 are a leverage member 154 and a pivot member 152, such that the pivot member 154 provides a pivot point or region 153 (e.g. fulcrum) for the leverage member 152, such that the pivot member is positioned between the trigger biasing element 126 (e.g. coupled to the firing element 328) and the retaining element 117. Preferably, a proximal portion 156 of the leverage member 152 is coupled to the retaining element 117 on one side of the pivot member 154 and a distal portion 158 of the leverage member 152 is coupled to the trigger biasing element 126 (e.g. via the firing element 328) on the other side of the pivot member 154. Preferably, mechanical advantage is obtained between the respective trigger forces Tf and retaining force Tr as a length Lr between the retaining element 117 coupling at the proximal end 156 and the pivot member 154 is greater than a length Lf between the trigger biasing element 126 (e.g. via the firing element 328) coupling at the distal end 158 and the pivot member 154.

For example, the leverage member 152 can be coupled to the trigger biasing element 126 via the firing element 328, such that the distal portion 158 of the leverage member 152 acts as a detent when received in a slot 160 (e.g. of the firing element 328 as shown or in a portion of the trigger biasing element 126 or other structure (e.g. plate) coupled to the trigger biasing element 126—not shown). As such, the detent provides the resultant retaining force Tr that opposes the trigger force Tf along a longitudinal axis At of the trigger biasing element 126. For clarity, longitudinal axis At can be the axis along which the trigger biasing element 126 moves from position C to position D.

In general terms, the leverage member 152 can be defined as a lever or other rigid element (e.g. a beam or rigid rod) pivoted at the pivot member 154 (e.g. fixed hinge, or pivot such as a fulcrum). As such, the leverage member 152 provides for amplification of the retaining force Tr of the retaining element 117 to provide a greater resultant retaining force Tr (also referred to as trigger force Tf) associated with the longitudinal axis At of the trigger biasing element 126, which is said to provide leverage. The ratio of the resultant retaining force Tr (also referred to as trigger force Tf) to retaining force Tr is the ideal mechanical advantage of the leverage member 152 and associated pivot member 154, as advantage elements 109 of the mechanical advantage system 104 of the trigger device 103. Also, the leverage member 152 can be defined as an elongate member connected to ground (e.g. frame of the housing 150) by a hinge, or pivot, called a fulcrum.

It is also recognized that the mechanical advantage system 104 for the trigger system 103 can use any of the other advantage element 109 examples and configurations provided for the panel operation component 8 and/or the actuation system 101 discussed above. It is also recognized that the mechanical advantage system 104 for the trigger system 103 can be applied as the advantage elements 109 used for the panel operation component 8 and/or the actuation system 101 discussed above.

Referring to FIGS. 1I and 17, when the vehicle controller 140 (e.g. vehicle computer) detects a crash, for example, by monitoring electronic signals provided by the sensor 142 (e.g. an accelerometer) located on the vehicle body 5 and/or on the closure panel 6 (e.g. at the front of the vehicle 4 such as in the vehicle front bumper—see FIG. 1A). In turn, the controller 140 sends the trigger signal 144 to the trigger system 103 to cause the destructive element 116 to destroy the structural integrity of the retaining element 117, thus releasing the trigger biasing element 126 from the position C. For example, as shown an electrical connection element 162 receives the trigger signal 144, which is used to activate the destructive element 116 to destroy the retaining element 117. For example, the electrical connection element 162 can be an electrical socket (e.g. female connection) configured to receive and electrically connect to a male electrical contact and a mounting portion for the trigger system 103 (e.g. on the actuation system 101) can be a corresponding electrical plug containing the male electrical contact. Alternatively, as shown, the electrical connection element 162 can be an electrical plug containing a male electrical contact 164 and the mounting portion for the trigger system 103 (e.g. on the actuation system 101) can be an electrical socket configured to receive and electrically connect to the male electrical contact 164. For example, the male electrical contact 164 can be a pair of electrodes.

Generally, the electrical connection 162 can be defined as having one or the other of mating female and male electrical connections, such that the male electrical connection includes the plug and the female connection includes the socket, such that the electrical connection 162 is electrically connected to the destructive device 116. Plugs 164 of the male electrical connections can have male circuit contacts, while sockets can have female circuit contacts. For example, the plug 164 can have protruding prongs, blades, or pins that fit into matching slots or holes in the socket. The socket can also called a receptacle or outlet.

Figure 20:
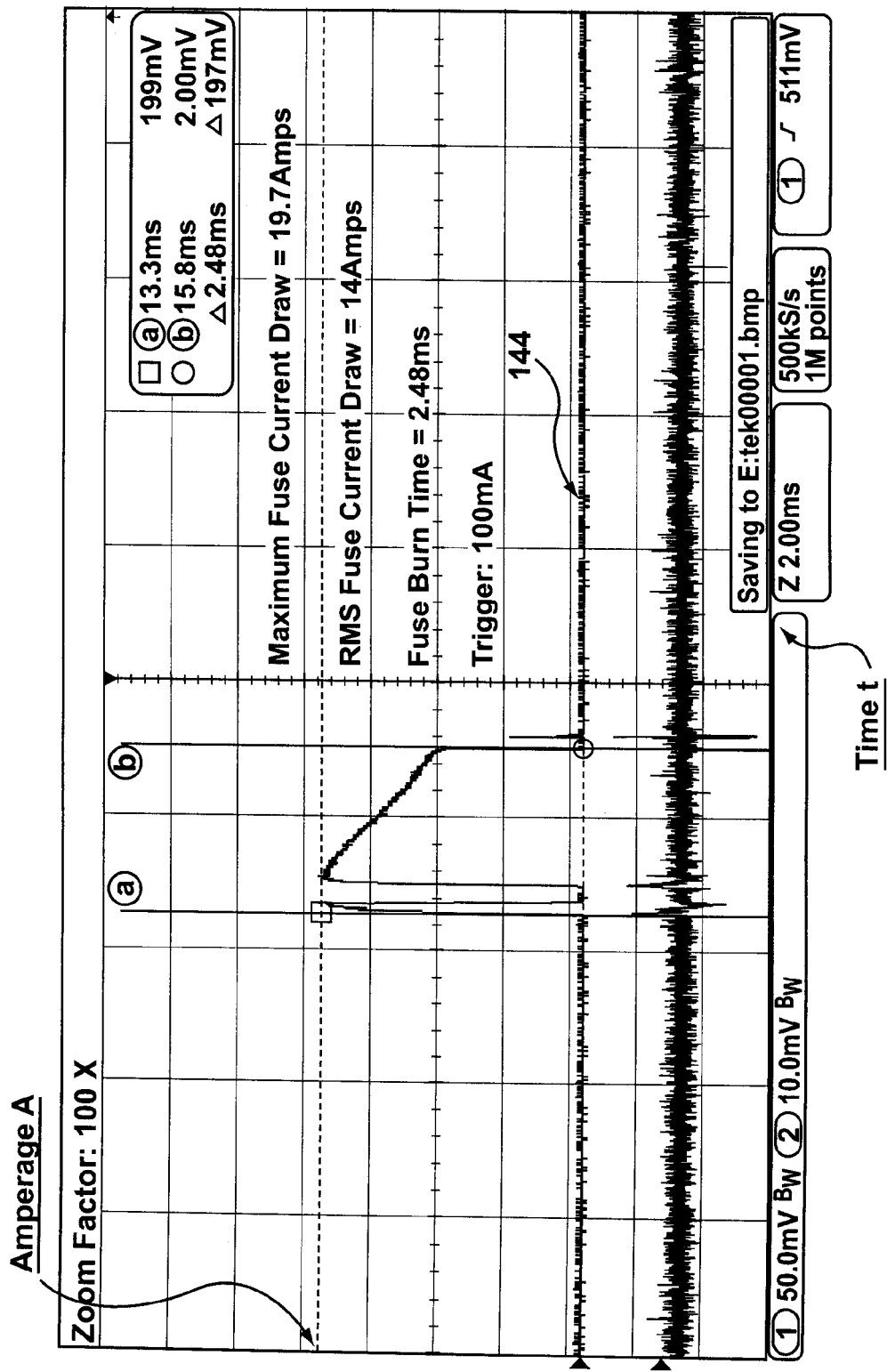
FIG. 20 is a graph of current draw verses time for an example operation of the trigger assembly of FIG. 17.

Referring again to FIG. 17, shown is one example where the destructive element 116 is actuated by the electrical signal 144, such that the electrical signal has an electrical current of a predefined magnitude for use by the destructive element 116 in destroying the restraining element. In terms of a pair of electrodes provided as the destructive element 116, at least a portion of the restraining element 117 is connected to the pair of electrodes, such that the at least a portion of the restraining element 117 receives the electrical current when delivered as the electrical signal 144. For example, the electrical signal can have current of a predefined magnitude is less than 30 amps. Preferably, the electrical signal 144 can have current of a predefined magnitude is less than 25 amps. More preferably, the electrical signal 144 can have current of a predefined magnitude is less than 20 amps. More preferably, the electrical signal 144 can have current of a predefined magnitude is less than 15 amps. As such, it is recognised that the electrical current is what is used by the destructive element 116 to destroy (e.g. plastically) the structural integrity of the retaining element 117. As such, the restraining element 117 can be destroyed with a direct application of the signal 144 through the two pin connector 164. Referring to FIG. 20, shown is an example electrical signal 144 amperage A over time t, as drawn and used by the destructive device 116.

Figure 21:
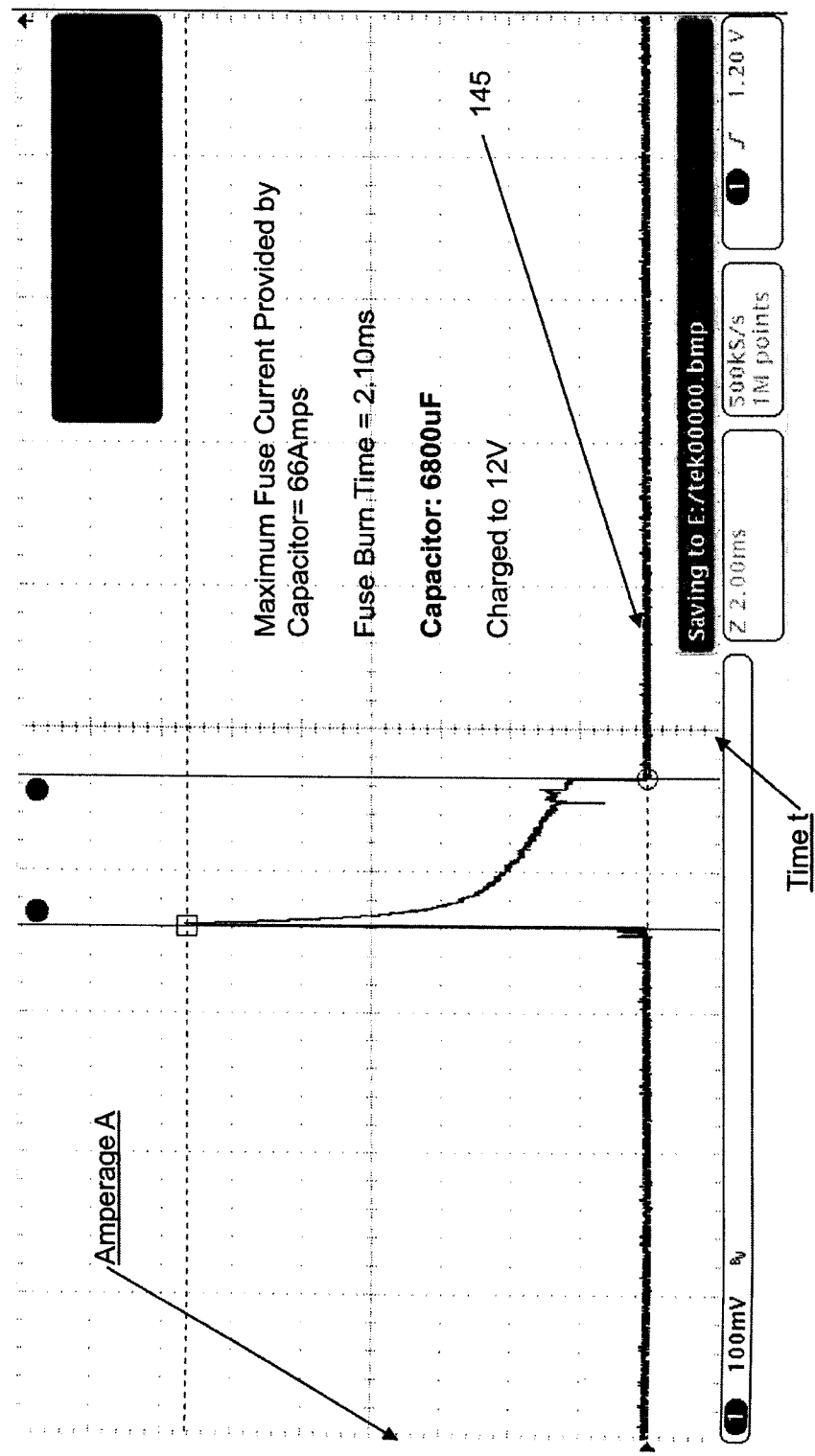
FIG. 21 is a graph of current draw verses time for another example operation of the trigger assembly of FIG. 17.

Alternatively, the electrical signal 144 can be received by the switch 138. In this case, the signal 144 would be of a first current magnitude (e.g. approximately 100 mA) provided to switch 138, which is configured to switch a relay (e.g. MOSFET) to provide a draw from a larger power source 166 (e.g. providing an activation electrical signal 145 having second current magnitude larger than the first current magnitude (e.g. approximately 20 A) of the signal 144. The power source 166 can be a battery of the vehicle 4 (see FIG. 1A) or can also be a secondary vehicle power source such as a capacitor. Therefore, one example is in addition to the switch relay (e.g. MOSFET), the housing 150 could also contain an integrated circuit board containing the switch 138 and the capacitor. The capacitor could charge through a low current line (e.g. via the vehicle primary power source or battery) and provide the required current 145 to active the destructive device 116 after the signal 144 is provided to the switch 138. Referring to FIG. 21, shown is an example electrical signal 145 amperage A over time t, as drawn and used by the destructive device 116 as obtained from a power source 166 of a capacitor.

The switch 138 can be considered an electrical component that can break an electrical circuit, interrupting the current or diverting it from one source to another. The most familiar form of a switch is an electromechanical device with one or more sets of electrical contacts, which are connected to external circuits (e.g. signal 144, 145). Each set of contacts can be in one of two states: either "closed" meaning the contacts are touching and electricity can flow between them, or "open", meaning the contacts are separated and the switch is non-conducting. The mechanism actuating the transition between these two states (open or closed) can be either a "toggle" (flip switch for continuous "on" or "off") or "momentary" (push-for "on" or push-for "off") type. For example, the switch can be a transistor, a fast acting relay, etc.

The metal-oxide-semiconductor field-effect transistor (MOSFET, MOS-FET, or MOS FET) can be defined as a transistor used for amplifying or switching electronic signals. Although the MOSFET is a four-terminal device with source (S), gate (G), drain (D), and body (B) terminals, [1] the body (or substrate) of the MOSFET often is connected to the source terminal, making it a three-terminal device like other field-effect transistors. Because these two terminals are normally connected to each other (short-circuited) internally, only three terminals can appear in electrical diagrams.

The capacitor (originally known as condenser) can be defined as a passive two-terminal electrical component used to store energy in an electric field. The capacitor can contain at least two electrical conductors separated by a dielectric (insulator); for example, one common construction consists of metal foils separated by a thin layer of insulating film.

It is also recognized that the destructive element 116 can be a chemical agent, a mechanical device, and/or an explosive charge, any of which could use the electric signal 144,145 as an actuator to cause the destructive element 116 to destroy the structural integrity of the retaining element 117 (e.g. under a compressive or tensile load).

A further example of the restraining element 117 is a magnet (see FIG. 1O), which can be used to restrain activation of the trigger biasing element 126 (i.e. travel of the trigger biasing element 126 from the first trigger position to the second trigger position). The magnet 117 (e.g. permanent magnet) can be of a sufficient magnetic field strength to hold the trigger biasing element 126 stationary (e.g. a restraining force 170 of the restraining element 117 can be a magnetic field acting on a firing member 328—see FIG. 8B—coupled to the trigger biasing element 126). In order to destroy the magnetic attraction of the magnetic field force 170 with the trigger biasing element 126, application of current (e.g. signal 144—see FIG. 1I by the destructive element 116 can provide a reverse magnetic flux 172 (e.g. via an electromagnet 174) to the magnet 117, such that the magnetic attraction between the magnetic field 170 and the trigger biasing element 126 is decreased to allow the travel of the trigger biasing element 126 from the first trigger position to the second trigger position. As such, the destructive element 116 can be a pair of contacts coupled to the electromagnet 174, configured to receive a current (e.g. signal 144) and the energize the electromagnet to reduce the magnetic field force 170 with the trigger biasing element 126 used to retain the trigger biasing element 126 in the first trigger position.

For example, the electromagnet 174 (e.g. coil of wire) can be separate from the magnet 117. Alternatively, the electromagnet 174 can be coiled about the magnet 117. In either case, it is recognized that activation of the electromagnet 174 temporarily decreases or otherwise destroys the magnetic field 170 strength needed to restrain movement of the trigger biasing element 126, such that deactivation of the electromagnet 174 causes the magnetic field 170 strength of the magnet 117 to increase back to a level sufficient to restrain movement of the trigger biasing element 126 when it is positioned in the first trigger position.

Alternatively, the destructive device 116 can be a movable permanent magnet 174, such that application of the current (e.g. signal 144) to the destructive device 116 causes the destructive device 116 to bring or otherwise move (e.g. via a suitable mechanical device—e.g. electrical step motor) the permanent magnet 174 closer to the magnet of the retaining element 117. As such, the polarity of the permanent magnet 174 could be opposite to the polarity of the magnet of the retaining element 117, thus also providing for a lessening or reversal in the magnetic field 170 to result in a release of the trigger biasing element 126 held in the first trigger position by the retaining element 117, due to interaction between the opposite polarities of the magnets 117,174 as they are brought into proximity with one another. In this case, it is recognized that movement of the permanent magnet 174 into the proximity of the magnet 117 temporarily decreases or otherwise destroys the magnetic field 170 strength needed to restrain movement of the trigger biasing element 126, such that subsequent removal of the magnet 174 from the proximity of the magnet 117 causes the magnetic field 170 strength of the magnet 117 to increase back to a level sufficient to restrain movement of the trigger biasing element 126 when it is positioned in the first trigger position.

As noted above, the trigger system 103 can be configured as a one-time use component and be replaceable for a subsequent activation of the actuation system, such that the trigger system is releasably coupled to the trigger system interface of the actuation mechanism. Replacement of the trigger assembly 103 can be for all of the trigger assembly 103 components (e.g. 116, 117, 126, 136) and/or one or more selected components. For example, replacement of the trigger system 103 can be defined as replacing the destroyed restraining element 117 while retaining one or more of the other components (e.g. 116, 126, 136) of the trigger system 103. In terms of the restraining element 117 configured as the magnet, it is recognized that this embodiment is reusable as it is only the magnetic field strength 170 used to restrain movement of the trigger biasing element 126 that is destroyed (e.g. lessened or otherwise reversed due to the presence of the energized electromagnet 174 (or movable permanent magnet 174).

As noted above, the trigger system 103 can be configured as a one-time use component and be replaceable for a subsequent activation of the actuation system, such that the trigger system is releasably coupled to a system interface of the actuation mechanism 101 (or other object 130). Replacement of the trigger assembly 103 can be for all of the trigger assembly 103 components (e.g. 116, 117, 126, 136) and/or one or more selected components. For example, replacement of the trigger system 103 can be defined as replacing the destroyed restraining element 117 while retaining one or more of the other components (e.g. 116, 126, 104) of the trigger system 103. In this manner, replacement of the entire trigger system 103 (once deployed) can be done. Alternatively, at least the restraining element 117 of the trigger system 103 can be replaced, once deployed, in order to provide for a newly configured trigger system 103 that facilitated resetting of the actuation mechanism 101 for subsequent deployment.

In view of the above, it is recognized that the trigger system 103 can have any number of trigger component configurations, i.e. can contain any number of system components (see FIG. 1I) as provided for in the configuration as an off-the-shelf module or trigger system 103. In this manner, additional system components of the trigger system 103 can be added to the off-the-shelf module as replacement components and/or as optional components or additional components not included with the off-the-shelf module. Example trigger system 103 components can include components such as but not limited to: the trigger biasing element 126; the retaining device 117; the destructive device 116; and/or the mechanical advantage system 104. As provided for it is understood that any of the components of the trigger biasing element 126, the retaining device 117, the destructive device 116, and/or the mechanical advantage system 104 can be provided as optional components of the trigger system 103.

For example, the trigger system 103 can be provided with the trigger biasing element 126 with an interface for coupling with the retaining element 117 (e.g. releasably secured to the interface). For example, the trigger system 103 can be provided with the trigger biasing element 126 and the destructive device 116. For example, the trigger system 103 can be provided with the trigger biasing element 126 and the mechanical advantage system 104 configured for coupling with the retaining device 117. For example, the trigger system 103 can be provided with the mechanical advantage system 104 configured for coupling with the trigger biasing element 126 and the retaining element 117. For example, the trigger system 103 can be provided with the trigger biasing element 126, the mechanical advantage system 104 and the retaining element 117. It is also recognized that the destructive device 116 and/or the retaining element 117 can be provided as off-the-shelf item(s) separate from the trigger mechanism 103, i.e. provided separate one or more other components of the trigger mechanism 103. In this manner, the destructive device 116 and/or the retaining element 117 can be provided as a replacement part for the trigger mechanism 103, in the event of deployment of the trigger mechanism 103. The trigger mechanism 103 can be configured as reusable by returning the trigger biasing element 126 to the first position from the second position, such that the replacement of the retaining element 117 and/or the destructive device 116 provides for retaining of trigger biasing element 126 in the first position once returned. Alternatively, the trigger system 103 can be configured as a one-time use module and is replaceable for subsequent activation of the trigger force Tf. For example, the retaining element 117 can be reusable. For example, the destructive element 116 can be reusable.

In one embodiment, the trigger mechanism 103 acts on the mechanical energy storage device 102 to release its stored mechanical potential energy directed on the panel operational component 8. In another embodiment, the trigger mechanism 103 acts on the mechanical advantage system 104 to facilitate operation of the one or more elements of the panel operational component 8 and also acts on the mechanical energy storage device 102 to release its stored mechanical potential energy directed on other elements of the panel operational component 8. In a further embodiment, the trigger mechanism 103 acts on the panel operational component 8, such that the trigger force Tf provides for direction manipulation of the panel operational component 8 (e.g. driving of the latch element(s) 110 and/or the mating latch component 96 directly) without use of the actuation system 101.

As discussed above for the mechanical energy storage system 102, examples of mechanical potential energy of the trigger biasing element 126 are energy associated with restoring forces of a force field, such as a biasing element (e.g. spring) or the force of gravity. As such, the action of stretching/compressing the object (e.g. biasing element) or lifting the object (e.g. a weight) is performed by an external force that works against a force field of the respective potential and thereby changes the portion of the object from a first position to a second position within the force field. This work is stored in the force field, which is said to be stored as the mechanical potential energy of the trigger biasing element 126. If the external force is removed (e.g. removal of the element of the system holding the object at the second position), the force field acts on the object to perform the work as it moves the object back to the initial position, e.g. reducing the stretch/compression of the object (e.g. spring) or causing the object (e.g. a weighted body) to fall. Accordingly, the mechanical potential energy can be defined as the energy difference between the potential energy of the object in a given position (e.g. second position) and its energy at a reference position (e.g. first position), such that release of the stored mechanical potential energy is a consequence of the object returning from the second position to the first position.

As discussed above, gravitational energy is an example of the mechanical potential energy associated with gravitational force, as work is required to elevate object(s) (e.g. weight) against Earth's gravity (i.e. force field). The mechanical potential energy due to elevated positions is called gravitational potential energy. A further example of the mechanical potential energy is elastic energy, which can be defined as the mechanical potential energy of an elastic object (e.g. a biasing element such as a spring, a band, etc that can be compressed or stretched from a first position to a second position) that is deformed under tension or compression (or stressed). The elastic energy arises as a consequence of the force of the elastic object that tries to restore the object to its original shape. For example, if a stretched/compressed position (e.g. second position) of the elastic object is released, the energy can be transformed into kinetic energy as the elastic object returns to its original shape at the unstretched/uncompressed position (first position), also referred to as a reference position. An example of a biasing element (e.g. also referred to as elastic object) can be a spring, such that when the spring is compressed or stretched, the force it exerts is proportional to its change in length. The rate or spring constant of the spring is the change in the force it exerts, divided by the change in deflection of the spring. Springs can be classified depending on how the load force is applied to them, such as but not limited to: tension/extension spring designed to operate with a tension load so the spring stretches as the load is applied to it; compression spring designed to operate with a compression load so the spring gets shorter as the load is applied to it; torsion spring, where unlike the load as an axial force, the load is applied as a torque or twisting force and the end of the spring rotates through an angle as the load is applied; constant spring such that the supported load will remain the same throughout deflection cycle; variable spring where resistance of the spring coil to load varies during compression; coil spring made of a coil or helix of wire which are types of torsion spring because the spring wire itself is twisted when the spring is compressed or stretched; flat spring made of a flat or conical shaped piece of metal or other material capable of elastic deformation; machined spring manufactured by machining bar stock with a lathe and/or milling operation rather than coiling wire; and cantilever spring which is fixed only at one end; torsion spring designed to be twisted rather than compressed or extended. Other examples of a spring (for the biasing element 126 and/or biasing element 102 can be a cantilever spring or a torsion rod.

A further example of the trigger biasing element 126 is a pneumatically actuated piston that uses application of pressurized gas (stored as a pressurized charge) to produce mechanical motion, i.e. displacement of the one or more components of the trigger biasing element 126 from the first trigger position to the second trigger position as the mechanical potential energy contained in the pressurized gas is released during movement of the trigger biasing element 126.

It is further noted that the trigger biasing element 126 can contain stored mechanical potential energy rather than chemical potential energy. Chemical potential energy can be defined as the kind of potential energy stored in chemical bonds, such that chemical energy of a chemical substance can be transformed to other forms of energy by a chemical reaction. As an example, when a fuel is burned the chemical energy is converted to heat energy and light energy.

According to one aspect, an emergency pop-up mechanism is provided for a latch for a closure panel on a vehicle, such as, for example, a hood latch. The latch has a housing which has a fishmouth for receiving a striker. The pop-up mechanism is actuated to drive the striker towards an open end of the fishmouth, and includes a restraint member that is used to prevent the pop-up mechanism from being actuated and a restraint member disabler that is controllable to disable the restraint member thereby permitting the actuation of the pop-up mechanism. Driving the striker towards the open end of the fishmouth reduces the likelihood of injury to a pedestrian in the event of a collision between the vehicle and the pedestrian. In embodiments wherein the striker is connected to a hood, the hood would be raised by actuation of the pop-up mechanism to space the hood farther from hard points on the vehicle such as the engine, thereby reducing the likelihood that the pedestrian will impact these hard points through the hood.

In an embodiment, the latch may optionally include a ratchet movable between an open position and a primary closed position for releasably holding the striker in the fishmouth, and a pawl movable between an unlocked position wherein the pawl permits the ratchet to move to the open position and a primary locking position wherein the pawl holds the ratchet in the primary closed position. The pop-up mechanism comprises a cam lever that is pivotally mounted to the housing for movement between a rest position and an active position. During movement of the cam lever in a first direction towards the active position the cam lever drives the striker in a direction towards leaving the fishmouth. The pop-up mechanism further comprises a loading device kinematically connected to the cam lever for urging the cam lever to rotate towards the active position. The loading device includes a pull-rod operatively connected to the cam lever and movable between an unactuated position and an actuated position. Movement towards the actuated position drives the cam lever towards the activated position. The pop-up mechanism further comprises a pull-rod biasing member that biases the pull-rod towards the actuated position. The pop-up mechanism further comprises a pull-rod release mechanism movable between a locking position in which the pull-rod release mechanism holds the pull-rod in the unactuated position, and an unlocked position in which the pull-rod release mechanism permits the pull-rod biasing member to move the pull-rod towards the actuated position. The pop-up mechanism further comprises a firing pin that is movable between an unactuated position and an actuated position wherein the firing pin drives the pull-rod release mechanism to the unlocking position. The pop-up mechanism further comprises a firing pin biasing member that biases the firing pin towards the actuated position. The pop-up mechanism further comprises a fuse member that retains the firing pin in the unactuated position. The pop-up mechanism further comprises electrical conduits that, when connected to an electrical source, generate heat in the fuse member to soften the fuse member sufficiently to permit the firing pin biasing member to overcome the fuse member and drive the firing pin towards the actuated position. In some embodiments, the heat generated in the fuse member may melt the fuse member sufficiently to permit the firing pin biasing member to overcome the fuse member and drive the firing pin towards the actuated position.

In another aspect, a pop-up mechanism is provided for a closure panel for a vehicle, to drive the closure panel to an injury-reduction position, wherein the panel is moved outwardly away from the body of the vehicle, so as to reduce the likelihood of injury to a pedestrian from impacting hard points beneath or behind the closure panel, such as the vehicle engine as noted above. In some embodiments, the pop-up mechanism is integrated into a latch for the closure panel. In some embodiments, the pop-up mechanism is configured to change the state of the latch and to also drive the closure panel away from the vehicle to the injury-reduction position. For example, the latch may have a ratchet and a pawl, wherein the ratchet is positionable in an open position, in a primary closed position wherein it retains a striker at a first depth in a fishmouth of the housing of the latch, and in a secondary closed position wherein it retains the striker at a second depth in the fishmouth of the housing, wherein the second depth is less than the first depth. The pop-up mechanism acts to permit movement of the ratchet to the secondary closed position while driving the closure panel away from the vehicle to the injury-reduction position. In some embodiments, the pop-up mechanism may drive a hinged end of the closure panel outwards to an injury-reduction position. In some embodiments, a pop-up mechanism may be provided on both a latched end of the closure panel and at a hinged end of the closure panel which at an opposite end of the closure panel. In many vehicles, the hinged end of the hood is a rear end of the hood, and the latched end of the hood is a front end of the hood. However, in some vehicles, the hood opens forward, and so the hinges are on the front end of the hood and the latch is at the rear end.

The pop-up mechanism may have any suitable structure. For example, in some embodiments, the pop-up mechanism may have a firing pin, a restraint member, a firing pin biasing member and a restraint member disabler. The restraint member may be made from a material that softens (e.g. melts) under a selected amount of heat. The restraint member disabler may include electric conduits that carry a current when connected to an electrical source and that have a selected resistance to the current so as to generate heat, which is used to soften the restraint member sufficiently that the firing pin biasing member overcomes the restraint member and drives the firing pin to an actuated position. In some embodiments the pop-up mechanism further includes a closure panel actuation biasing member that causes movement directly or indirectly of the closure panel to the injury-reduction position, and a closure panel actuation biasing member release mechanism that is actuated by the firing pin to permit actuation of the closure panel actuation biasing member. In some embodiments, an actuation member is provided and is driven by the closure panel actuation biasing member to cause movement of the closure panel to the injury-reduction position (optionally by direct engagement between the actuation member and the closure panel). In some embodiments, the closure panel actuation biasing member acts to directly drive the closure panel away from the vehicle body. The closure panel actuation biasing member can be configured to exert a stronger force than the firing pin biasing member. Thus, by using the firing pin to actuate a closure panel actuation biasing member release mechanism in order to release the closure panel actuation biasing member, a greater force can be exerted on the closure panel than would be available actuating the closure panel directly using the firing pin biasing member. However, in some embodiments, the firing pin biasing member may be sufficient to directly bring the closure panel to the injury reduction position. In some embodiments, the pop-up mechanism includes a fluid-actuated cylinder including a cylinder housing and a piston that is movable between an unactuated position and an actuated position. Movement of the fluid-actuated cylinder to the actuated position drives the closure panel to the injury-reduction position. The pop-up mechanism further includes a source of pressurized fluid, and a release member that is controllable to expose the piston to the pressurized fluid to drive the piston to the actuated position.

In another aspect, a pop-up mechanism is provided for a closure panel for a vehicle, to drive the closure panel to an injury-reduction position. The pop-up mechanism includes a driver assembly actuation member that is operatively connectable to the closure panel. The driver assembly actuation member is movable between an unactuated position and an actuated position. In the actuated position the driver assembly actuation member causes movement of the closure panel to the injury-reduction position. The pop-up mechanism further includes a driver assembly actuation member biasing member that biases the driver assembly actuation member towards the actuated position, a driver assembly restraint member that retains the driver assembly actuation member in the unactuated position, and electrical conduits that, when connected to an electrical source, generate heat in the restraint member to soften the driver assembly restraint member sufficiently to permit the driver assembly actuation member biasing member to drive the driver assembly actuation member towards the actuated position.

In another aspect, a pop-up mechanism is provided for a closure panel for a vehicle, to drive the closure panel to an injury-reduction position, wherein the pop-up mechanism includes a driver assembly and a driven assembly that is driven by the driver assembly. The driven assembly includes a driven assembly actuation member movable between an unactuated position and an actuated position. Movement to the actuated position drives the closure panel to the injury-reduction position. The driven assembly actuation member is biased towards the actuated position. The driven assembly further includes a driven assembly actuation member release mechanism movable between a locking position in which the driven assembly actuation member release mechanism holds the driven assembly actuation member in the unactuated position, and an unlocked position in which the driven assembly actuation member release mechanism permits the driven assembly actuation member to move towards the actuated position. The driver assembly includes a driver assembly actuation member that is movable between an unactuated position and an actuated position wherein the driver assembly actuation member drives the driven assembly actuation member release mechanism to the unlocking position. The driver assembly further includes a driver assembly actuation member biasing member that biases the driver assembly actuation member towards the actuated position, a driver assembly restraint member that retains the driver assembly actuation member in the unactuated position, and a driver assembly restraint member disabler that is controllable to disable the driver assembly restraint member to permit the driver assembly actuation member biasing member to drive the driver assembly actuation member towards the actuated position.

In another aspect, a pop-up mechanism is provided for a closure panel for a vehicle, to drive the closure panel to an injury-reduction position, wherein the pop-up mechanism includes a fluid-actuated cylinder including a cylinder housing and a piston that is movable between an unactuated position and an actuated position. Movement of the fluid-actuated cylinder to the actuated position drives the closure panel to the injury-reduction position. The pop-up mechanism further includes a source of pressurized fluid, and a release member that is controllable to expose the piston to the pressurized fluid to drive the piston to the actuated position.

In another aspect, an active pedestrian protection system for a hood of a vehicle An active pedestrian protection system for a hood of a vehicle, wherein the active pedestrian protection system includes a latch, a hinge mechanism a first pop-up mechanism and a second pop-up mechanism. The latch is positioned generally in association with a front end of the hood. The latch includes a housing which has a fishmouth for receiving a striker, a ratchet movable between an open position, a primary closed position wherein the ratchet releasably holds the striker at a first depth in the fishmouth and a secondary closed position wherein the ratchet releasably holds the striker at a second depth in the fishmouth that is less than the first depth, a ratchet biasing member configured to exert a biasing force on the ratchet to move from the primary closed position towards the secondary closed position and from the secondary closed position towards the open position. When the ratchet is in the secondary closed position a front end of the hood is in an injury reduction position. The latch further includes a pawl movable between an unlocked position wherein the pawl permits the ratchet to move to the open position, a primary locking position wherein the pawl holds the ratchet in the primary closed position and a secondary locking position wherein the pawl holds the ratchet in the secondary closed position. One of the latch and the striker is positioned on a body of the vehicle and the other of the latch and the striker is positioned on the hood. A rear end of the hood is mounted to a body of the vehicle by the hinge mechanism. The hinge mechanism permits movement of the hood along a first path to an open position to provide access to the portion of the vehicle covered thereby, and also permits movement of the hood along a second path to the injury-reduction position. The first pop-up mechanism is positioned to selectively drive the striker towards leaving the fishmouth and to selectively drive the pawl towards the secondary locking position. The second pop-up mechanism is positioned to selectively drive movement of the hood along the second path.

In another aspect, a combination of a pop-up mechanism and a hinge mechanism for a hinged end of a hood of a vehicle is provided. The pop-up mechanism includes a driver assembly actuation member that is movable between an unactuated position and an actuated position, a driver assembly actuation member biasing member that biases the driver assembly actuation member towards the actuated position, a driver assembly restraint member that retains the driver assembly actuation member in the unactuated position, and a driver assembly restraint member disabler that is controllable to disable the driver assembly restraint member to permit the driver assembly actuation member biasing member to drive the driver assembly actuation member towards the actuated position. The closure panel is mounted to a body of the vehicle by the hinge mechanism. The hinge mechanism permits movement of the closure panel along a first path to an open position to provide access to the portion of the vehicle covered thereby, and also permits movement of the closure panel along a second path to the injury-reduction position. Movement of the driver assembly actuation member to the actuated position causes movement of the closure panel along the second path.

Figure 22:
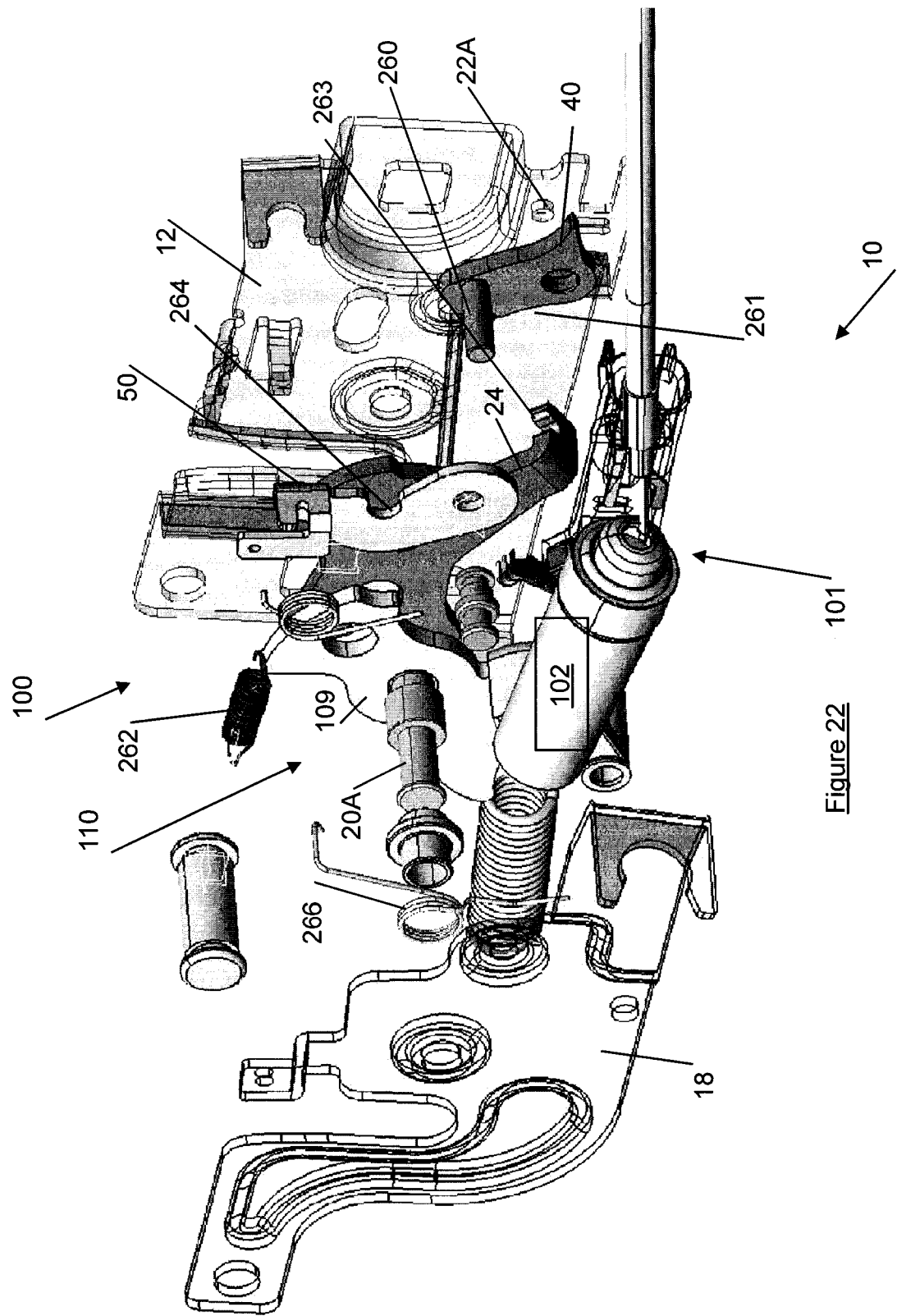
FIG. 22 is an alternative embodiment of the latch of FIG. 1P.

Referring to FIG. 22, shown is an alternative embodiment of the latch assembly 10 including the latch 100 coupled to the actuation system 101. The actuation system 101 includes the energy storage system 102 (e.g. containing stored mechanical energy or stored chemical energy for use in actuating in the latch 100 in emergency situations) and the trigger mechanism 103. The latch 10 has the mounting plate 12 (for mounting the latch 100 to the body 5 or closure panel 6 of the vehicle 4—see FIG. 1A) and cover plate 18 to provide a housing for enclosing latch elements 110. Latch elements 110 include the mechanical element 109 (e.g. a lever), a first latch element such as a ratchet 24, a second latch element such as a pawl 40, the primary release lever 50, and the slot 14 for retaining the matching latch component 96 (e.g. striker 96—see FIG. 2) when the latch 100 is in a closed or latched position. The primary release lever 50 is pivotally secured to the mounting plate 12 about pivot point 22A and is biased towards the latched position by release biasing element 262. The ratchet 24 is pivotally secured to the mounting plate 12 via pivot point 20A and is biased to the open or unlatched position via a ratchet biasing element (not shown). The pawl 40 is pivotally mounted at pivot point 22A and has one or more shoulder stops 261 to engage with a ratchet stop 263 of the ratchet 24 in order to releasably retain the ratchet 24 in the latched position. The pawl 40 can have a pawl biasing element (not shown) for biasing the pawl 40 to be engaged with the ratchet 24 when in the latched position. The pawl 40 also has an abutment member 260 (e.g. pin) for engaging with the primary release lever 50 at abutment 264.

Figure 27:
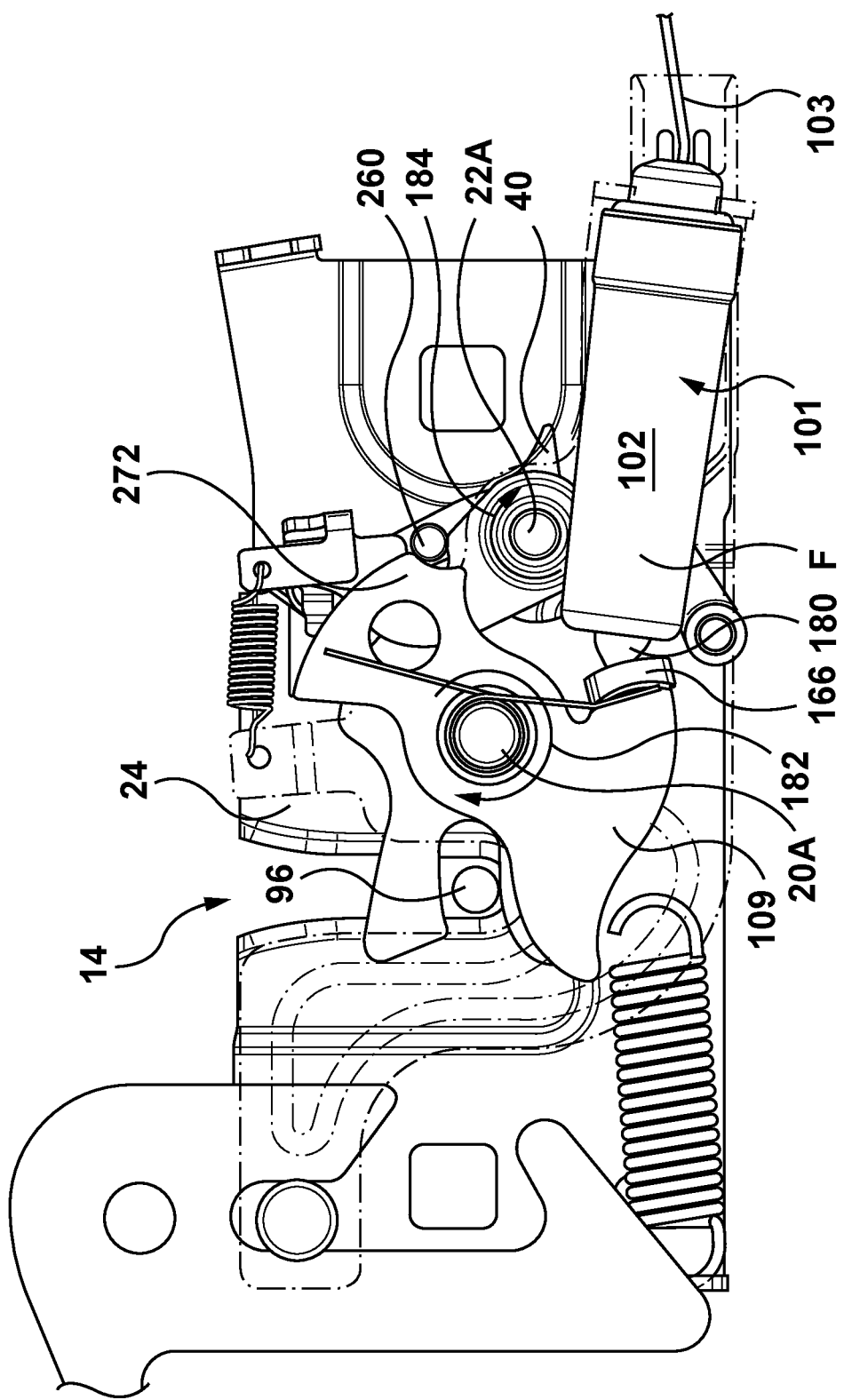
FIG. 27 shows operation of the latch elements of the latch of FIG. 26 as assisted by a mechanical element coupled to the actuation system.

Referring again to FIG. 22, the mechanical element 109 (e.g. cam lever), also referred to as a mechanical member 109, is pivotally mounted about pivot point 20A and had a biasing element 266 for biasing the mechanical element 109 towards the primary or latched position. The mechanical element 109 also has an abutment 268 (see FIG. 23) for coupling with the actuation system 101 and receiving the actuation force F (see FIG. 27) once the actuation system 101 is triggered. Further, the mechanical element 109 has an abutment surface 270 (see FIG. 23) for contacting the latch mating component 96 (e.g. striker) and driving the latch mating component 96 upwards through the slot 14 when actuated by the actuation system 101, as further described below. The mechanical element 109 also has an abutment 272 (see FIG. 23) for contacting abutment 260 of the pawl 40 in order to rotate the pawl 40 about pivot 22A and thus disengage the pawl 40 from the ratchet 24, as further described below.

Figure 23:
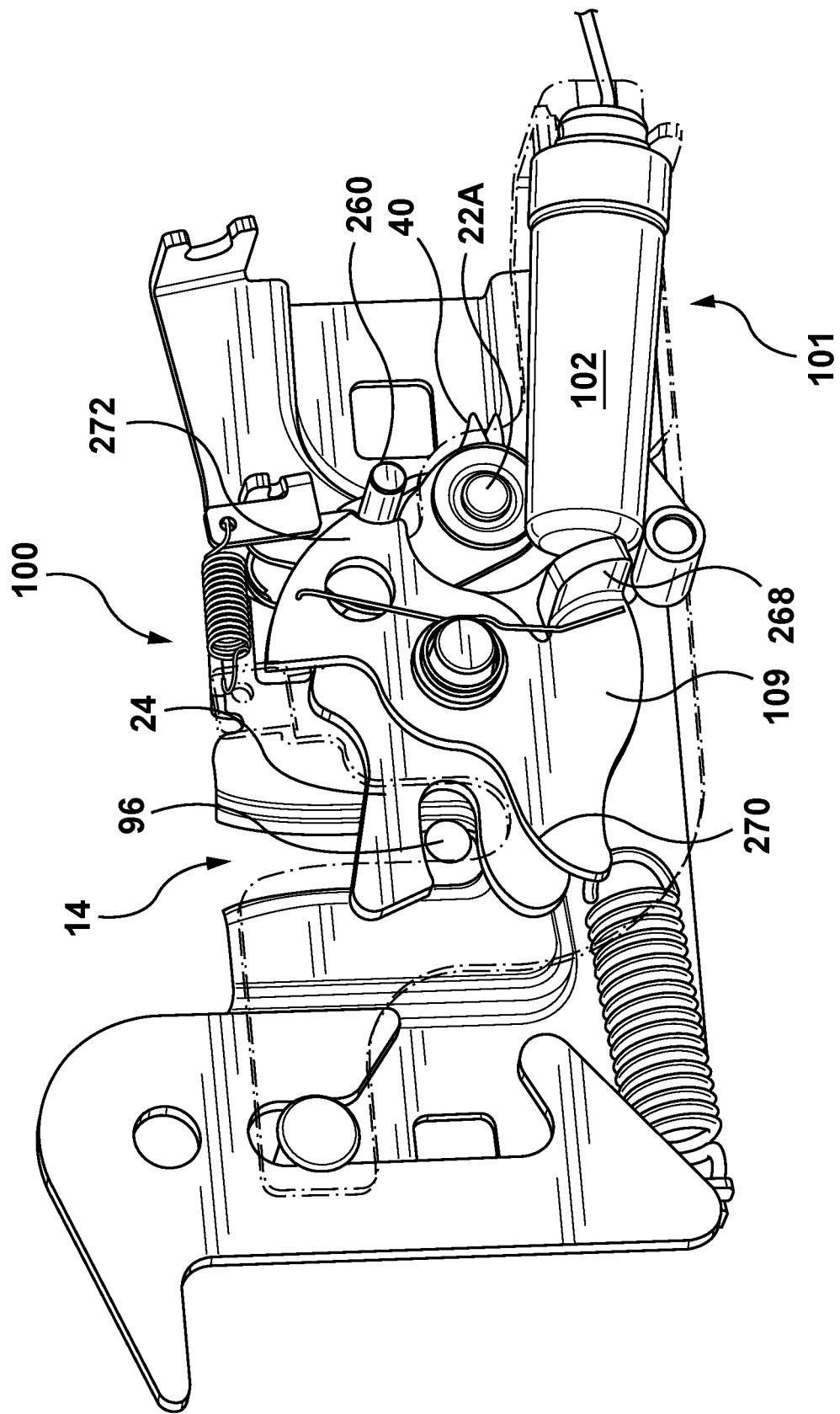
FIG. 23 shows the latch of FIG. 22 in a latched or primary position.
Figure 24:
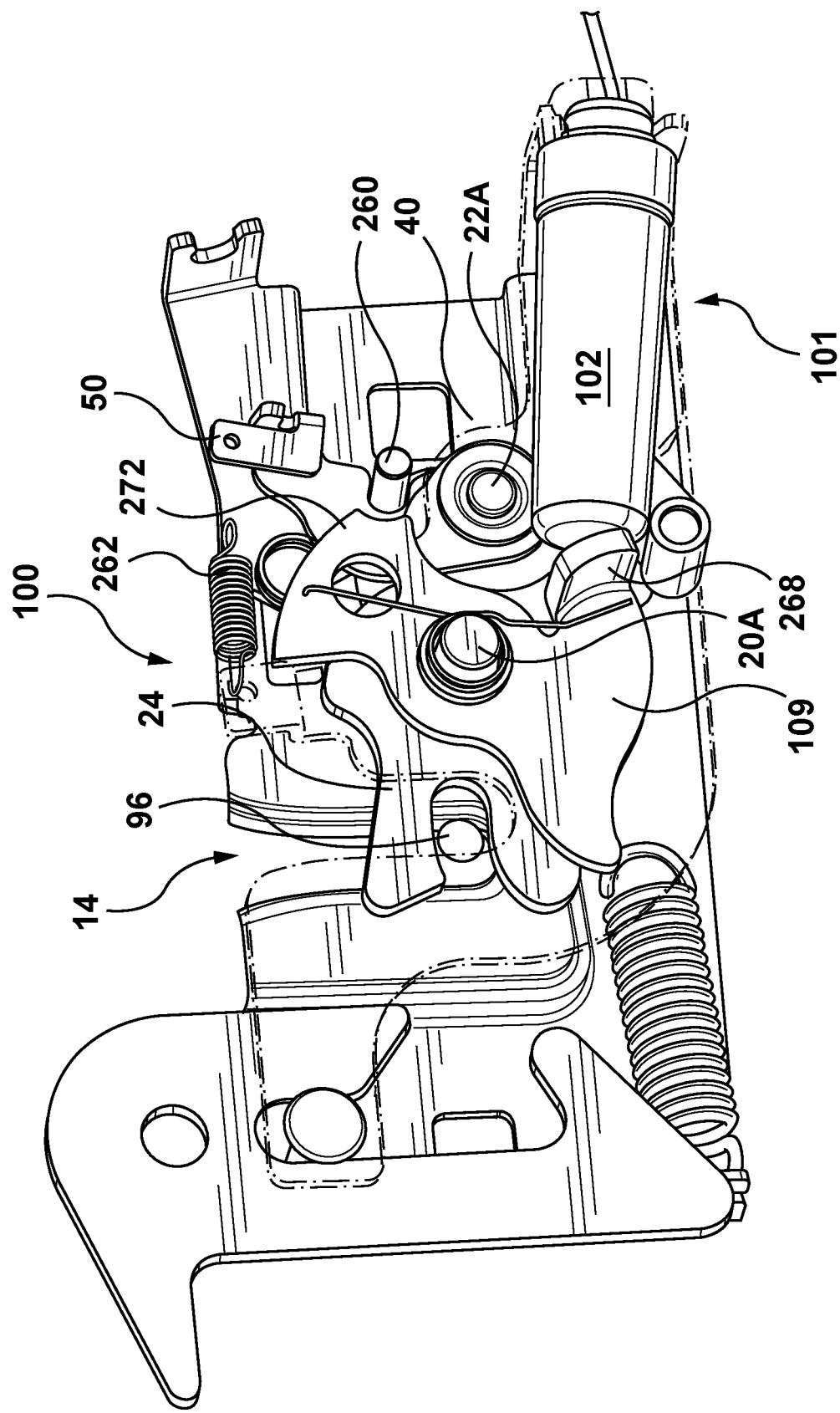
FIG. 24 shows manual deployment of the latch of FIG. 22.
Figure 25:
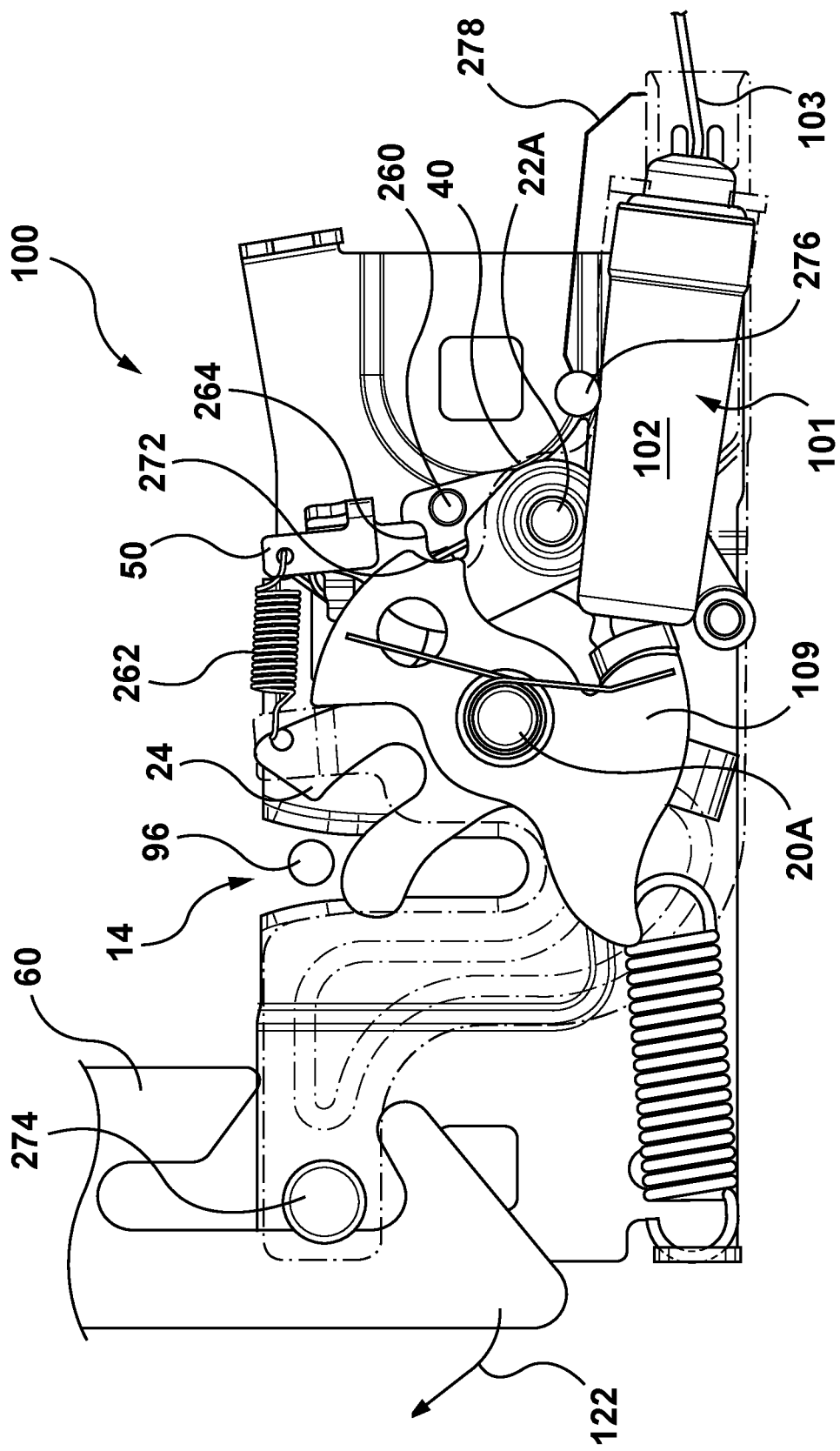
FIG. 25 shows the result of manual deployment of the latch of FIG. 22 positioning the latch in the unlatched or secondary position.

Referring to FIGS. 23, 24 and 25, example operation of latch elements 110 of the latch 100 without actuation of the actuation system 101 is described. In FIG. 23, the mating latch component 96 is held in the slot 14 by the arms of the ratchet 24, hence the latch is considered in the latched or primary position. In FIG. 24, the primary release lever 50 is pulled (e.g. by driver operated cable—not shown) against the lever biasing element 262, thereby contacting the abutment 260 of the pawl 40 and causing the pawl 40 to rotate about the pivot 22A and thus become disengaged with the ratchet 24, thus providing for the ratchet 24 to become unrestrained when initially in the latched position. It is noted that under the influence of the biasing element 266 of the mechanical element 109, the mechanical element 109 remains non-rotated about pivot point 20A, i.e. remains in the primary position, even though the abutment 272 has become disengaged with abutment 260 of the pawl 40.

Referring to FIG. 25, the latch mating component 96 has been released from the slot 14 by the ratchet 24 rotating about the pivot 20A from the latched position to the unlatched position (also referred to as the secondary position). The mechanical element 109 remains in it's latched/primary position, thus providing for the matching latch component 96 to travel back down unimpeded to the bottom of the slot 14, when the closure panel 6 (see FIG. 1A) is returned to the closed or shut/primary position. Also noted is the release lever 50 is returned/rotated to it's original primary position (once released by the driver) under bias of the lever biasing element 262, thus providing for decoupling of the abutment 264 of the lever 50 from the abutment 260 of the pawl 40. As such, the pawl 40 remains in the open or unlatched position (e.g. under influence of the pawl biasing element—not shown) and thus remains rotated about the pivot point 22A. As such, the mechanical element 109 remains non-rotated about the pivot 20A and the abutment 272 remains decoupled from the abutment 260 of the pawl 40. At this stage, the secondary release lever 60 can be disengaged from the secondary catch 274 by pivoting the secondary lever 60 in direction 122, thus providing for opening of the closure panel 6 to facilitate access to the body opening (e.g. engine compartment) by the driver (see FIG. 1A). It is also recognized that the pawl 40 remains in the open/secondary position, which can provide positional feedback to a switch 276 coupled to the trigger mechanism 103 of the actuation system 101. As such, an open signal 278 communicated from the switch 276 to the trigger mechanism 103 disengages any potential firing and thus activation of the actuation system 101 when the latch 100 is in the unlatched position. The provision of the switch 276 is advantageous to inhibit accidental firing of the actuation system 101 when the latch 100 is in the open position. It is recognized that the switch 276 can communicate directly with the trigger mechanical 103 or can communicate with a vehicle system controller (e.g. vehicle computer—not shown), which can be positioned between the switch 276 (to receive switch signals from the switch 276) and the trigger mechanism 103 (to send trigger signals to activate the trigger mechanism 103). The vehicle system controller can also take into account a number of different variables other than the switch 276 signal, such as vehicle speed, to determine if and when to fire the trigger mechanism 103 via a trigger signal.

Figure 26:
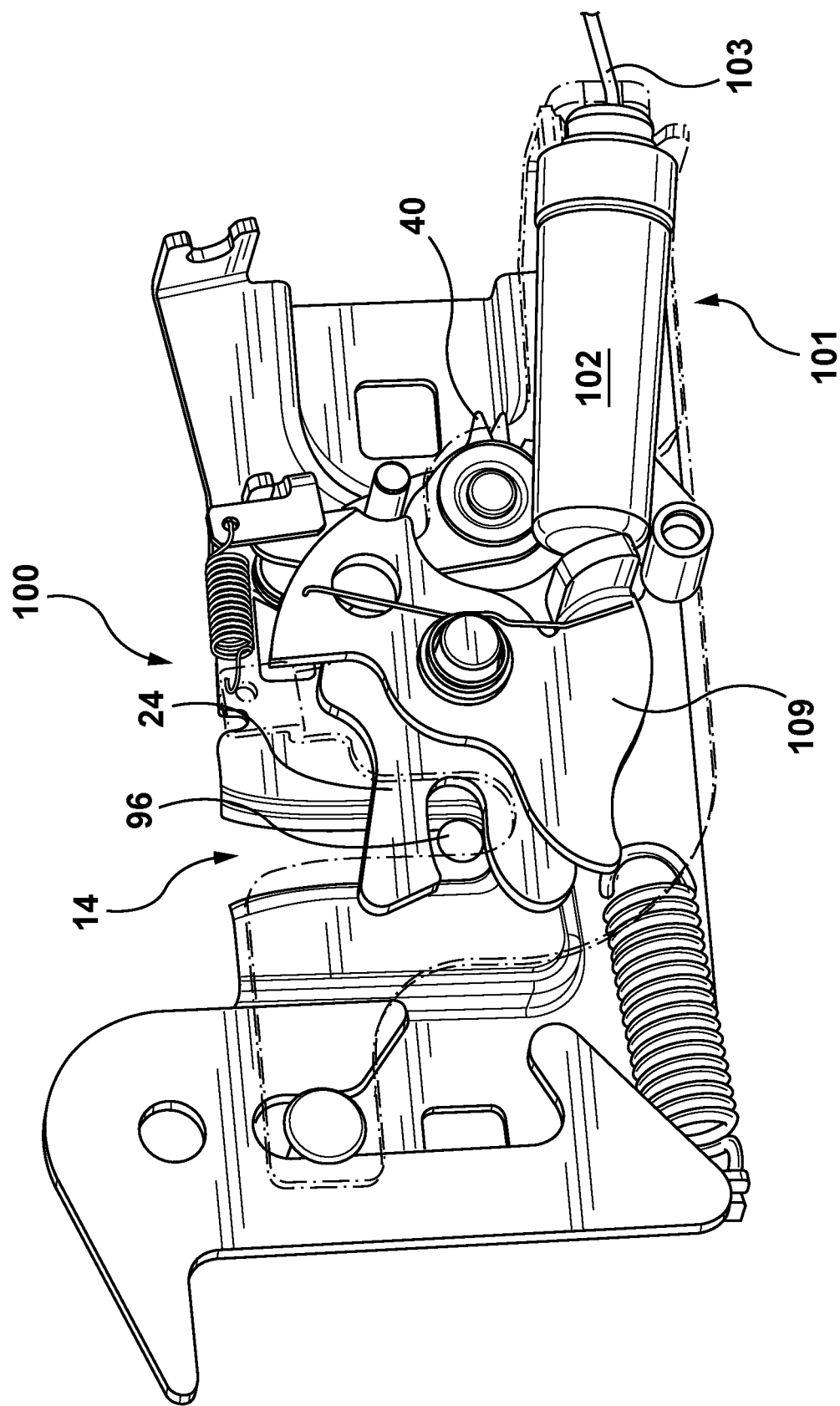
FIG. 26 shows the latch of FIG. 22 in a latched or primary position prior to deployment of an actuation system.

Referring to FIGS. 26-29, described is an example operation of the latch 100 when travel of the mating latch component 96 in the slot 14 is assisted by the mechanical element 109 when actuated by the actuation system 101. FIG. 26 shows the latch 100 in the latched position, such that the mating latch component 96 is restrained in the slot 14 by the arms of the ratchet 24 and thus the primary position of the pawl 40 restrains the ratchet 24 in the latched position. Upon transmission of an activation signal (e.g. 1.7 Amps) to the trigger mechanism 103 of the actuation system 101, the energy storage device 102 is discharged (as triggered by the trigger mechanism 103) and a force element 180 (e.g. cylinder rod) coupled to the energy storage device 102 (in FIG. 27) applies the actuation force F to the abutment 266 of the mechanical element 109. Application of actuation force F causes the mechanical element 109 to rotate in direction 182 about the pivot point 20A and causing abutment 272 of the mechanical element 109 to contact or otherwise engage with abutment 260 of the pawl 40 and thus cause rotation of the pawl 40 in direction 184 about the pivot point 22A to result in disengagement of the pawl 40 from the ratchet 24. At this stage, the ratchet is unrestrained in the latched position and thus is acted upon by the ratchet biasing mechanism to rotate about the pivot point 20A to travel from the latched position to the unlatched position. It is noted that the primary release lever 50 remains in the primary position due to restraining force supplied by the release biasing element 262 (see FIG. 28).

Figure 28:
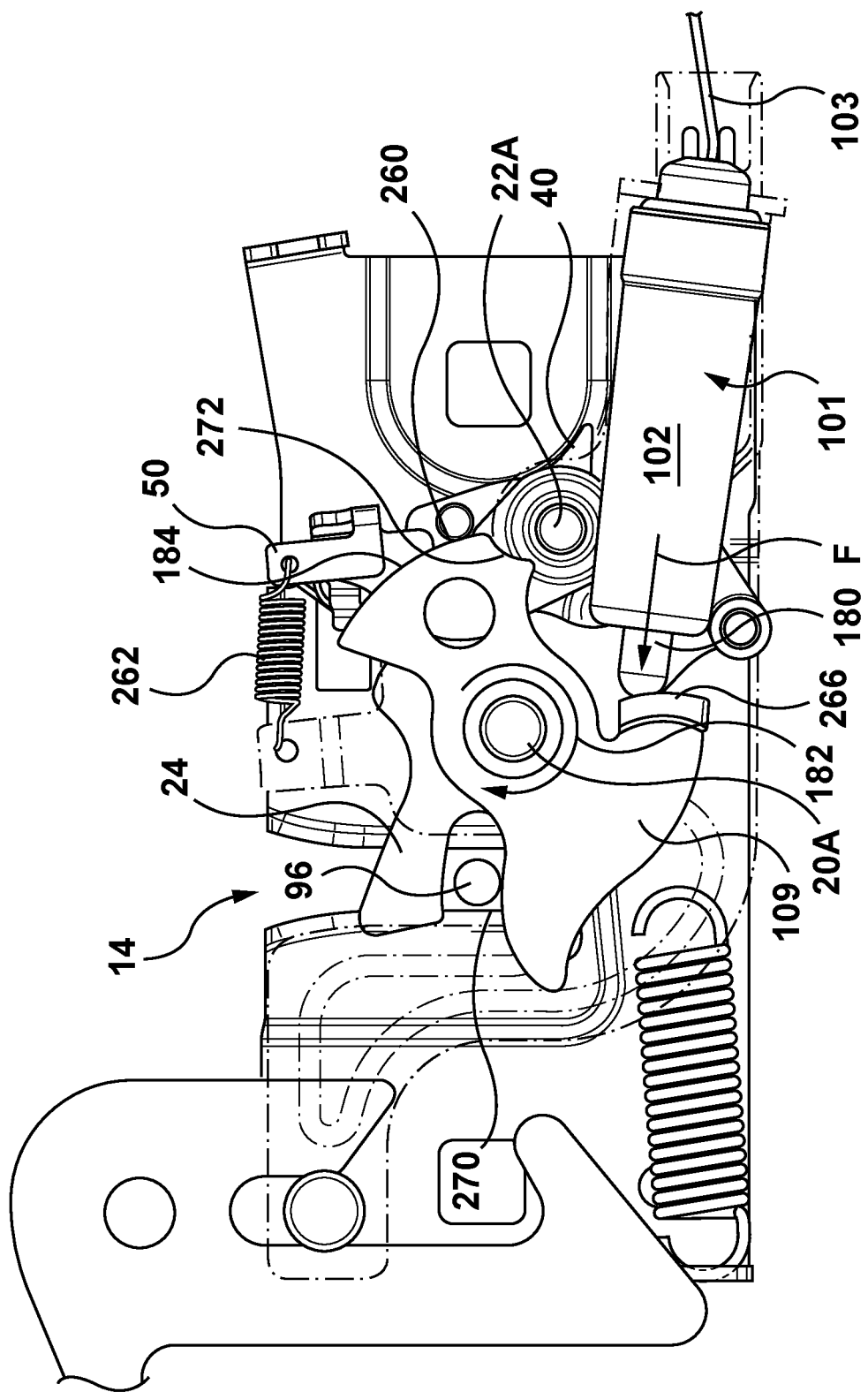
FIG. 28 shows further operation of the latch of FIG. 27.

Further, as shown in FIG. 28, the mechanical device 102 continues to drive the force element 180 against abutment 266, and thus further rotation of the mechanical element 109 about the pivot point 20A, so as to provide contact of abutment 270 of the mechanical element 109 with the mating latch component 96 in the slot 14. At this stage, travel of the mating latch component 96 in the slot 14 is assisted by rotation of both the ratchet 24 (as driven by the ratchet biasing element) and the mechanical element 109 (as driven by the actuation force F). Preferably, the magnitude of actuation force F is greater than the magnitude of the force provided by ratchet biasing element, such that rotation of the ratchet 24 about the pivot point 20A is also driven by the corotation of the mechanical element 109 about the pivot point 20A, as rotational movement of the ratchet 24 is coupled to the rotational movement of the mechanical element 109 via the mating latch component 96 positioned between the abutment 270 of the mechanical element 109 and the arm(s) of the ratchet 24. Also shown is abutment surface (e.g. cam surface) 184 of the mechanical element 109, which can act to guide travel of the abutment 260, and thus the pawl 40, into the secondary position.

Figure 29:
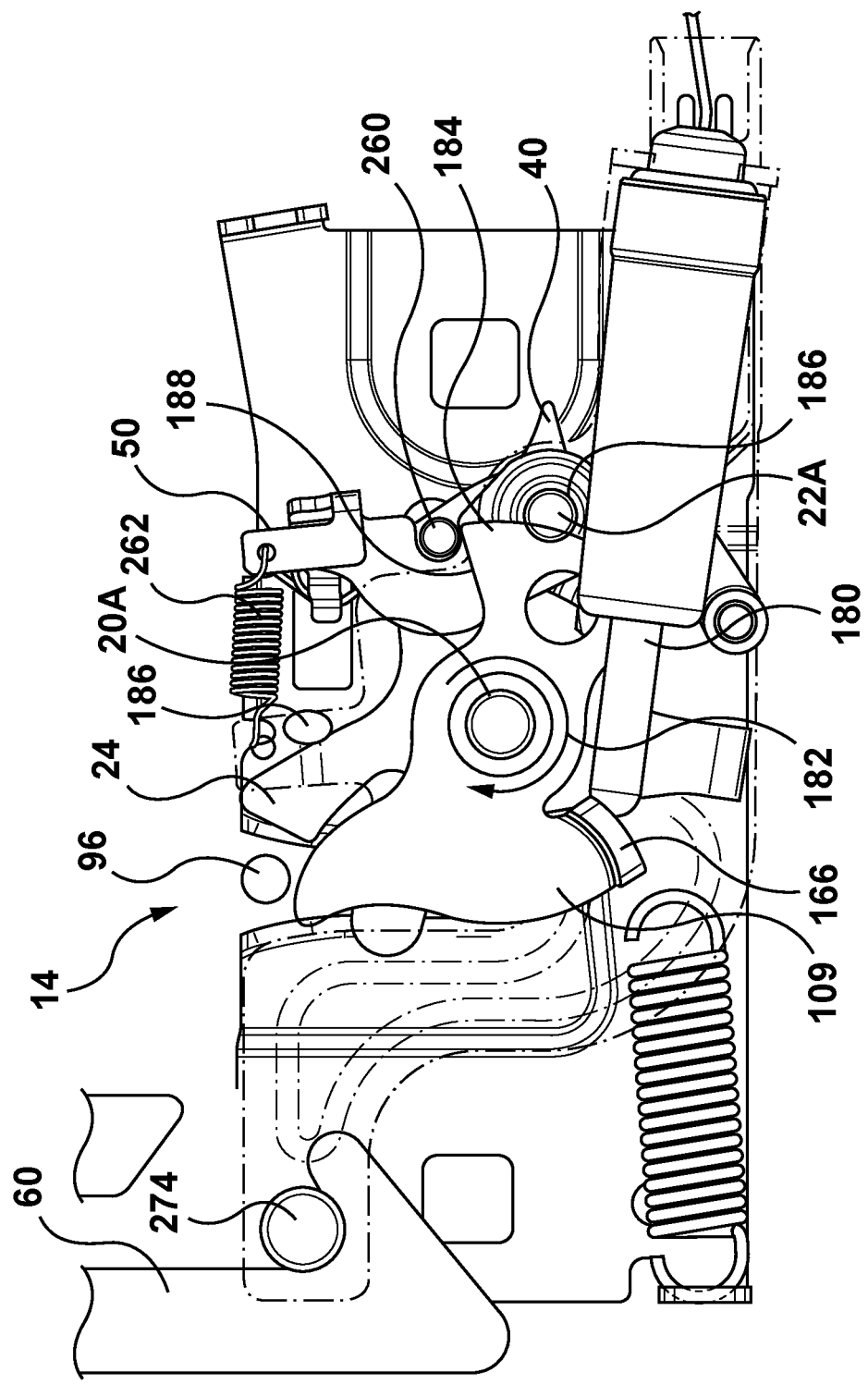
FIG. 29 shows further operation of the latch of FIG. 28 to the unlatched position.

Referring to FIG. 29, at this stage rotation of the ratchet 24 can be restrained by a hard stop 186. Further, the abutment 184 of the mechanical element 109 disengages from the abutment 260 of the pawl 40 as the mechanical element 109 completes it's rotation 182 about the pivot point 20A, as driven by the force element 180. Once disengaged from the abutment 184, the pawl and associated abutment 260 reverse their travel rotation in direction 186 about the pivot 22A and engage abutment 188 of the mechanical element 109, thus providing for retaining or otherwise locking the mechanical element 109 in the fully open or unlatched position. At this stage, the secondary release lever 60 can be disengaged from the secondary catch 274, thus providing for opening of the closure panel 6 to facilitate access to the body opening (e.g. engine compartment) by the driver (see FIG. 1A).

In order to position the mating latch component 96 back into the slot 14, the primary release lever 50 can be operated against the release biasing element 262, thus forcing the abutment 260 of the pawl 40 out of engagement with the abutment 188 via rotation of the pawl 40 about the pivot point 22A. The return of the mating latch component 96 to the bottom of the slot 14 (see FIG. 26) is provided for, upon retraction of the force element 180 back into the actuation system 101 by transference of a downwards force of the mating latch component 96 against the abutment 170 to the abutment 166 via a body of the mechanical element 109.

In view of the above, it is recognized that the mechanical element 109 can part of a mechanical advantage system 104

(see FIG. 1I). Alternatively, the mechanical element 109 can be so configured to not provide for mechanical advantage in actuation of any of the other latch elements 110 (e.g. ratchet 24 and/or pawl 40). Further, as noted above, the energy storage system 102 can be provided by mechanical energy and/or chemical energy, as desired.

Figure 30:
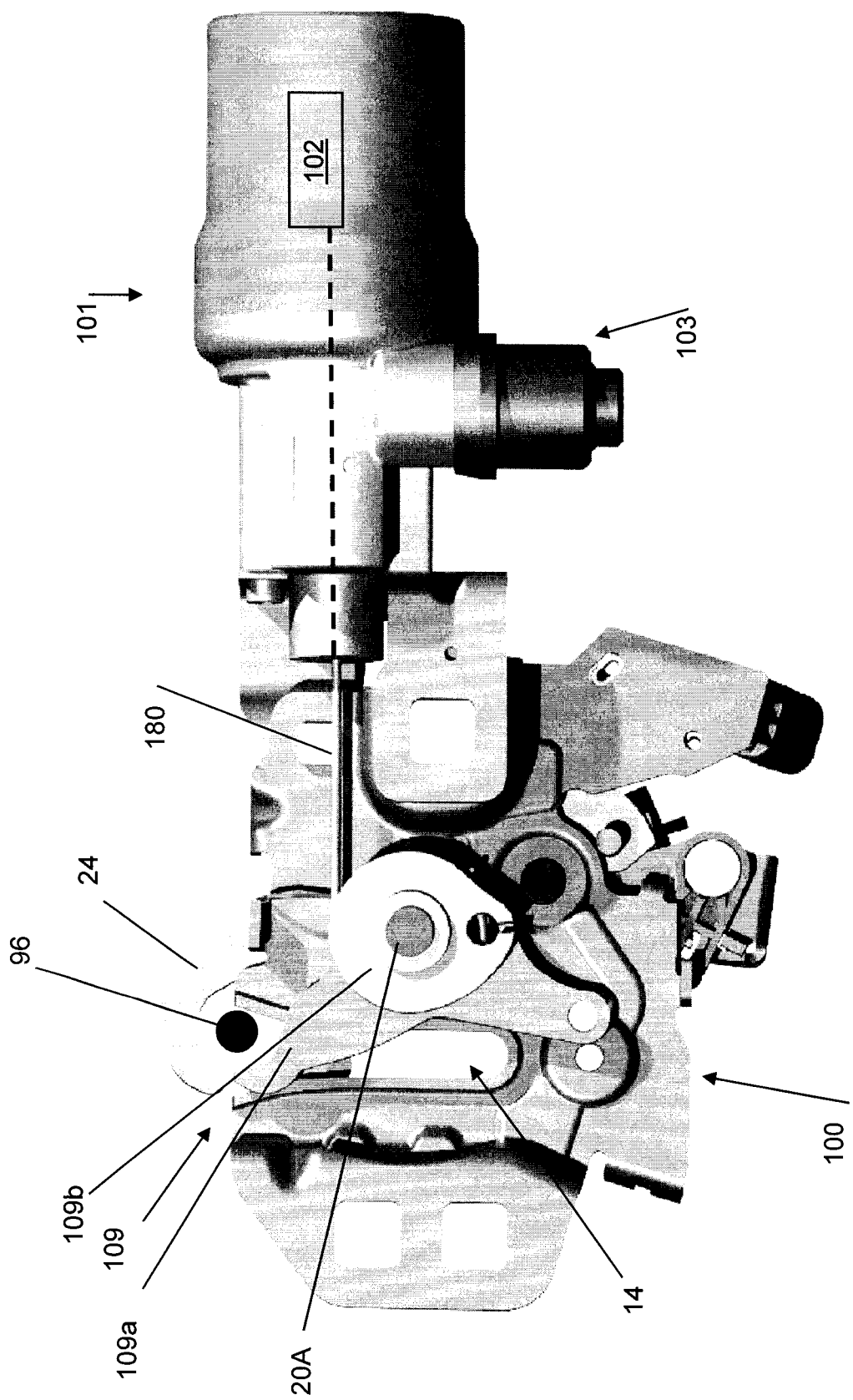
FIG. 30 is an alternative embodiment of the latch of FIG. 1P.

Referring to FIG. 30, shown is an alternative configuration of the mechanical element 109 (having a lever 109a connected to a cam 109b). The lever 109a and the cam 109b are connected to one another, so as to provide for corotation of each other as the cam 109b is acted upon (e.g. pulled) by the force element 180. It is also recognized that the force element 180 can be configured to push on the cam 109b, as desired. The mechanical element 109 is rotatably mounted on the pivot point 20A and is connected to the force element 180 (e.g. a cable) which is also coupled to the energy storage device 102 of the actuation system 101. The mechanical element 109 can have an abutment (not shown) for forcing the pawl (not shown) out of engagement with the ratchet 24, thus providing for rotation of the ratchet 24 about the pivot point 20A due to action of the ratchet biasing element (not shown) and rotation of the mechanical element 109 (via the interposed latch mating component 96—between the lever 109a and the arms of the ratchet 24) due to actuation by the force element 180, as the mating latch component 96 travels up the slot 14. As noted above for the mechanical element 109 with reference to FIGS. 22-29, rotation of the mechanical element 109 first causes movement of the pawl out of engagement with the ratchet 24 before the mechanical element 109 comes into contact with the mating latch component 96 positioned in the slot 14.

Figure 31:
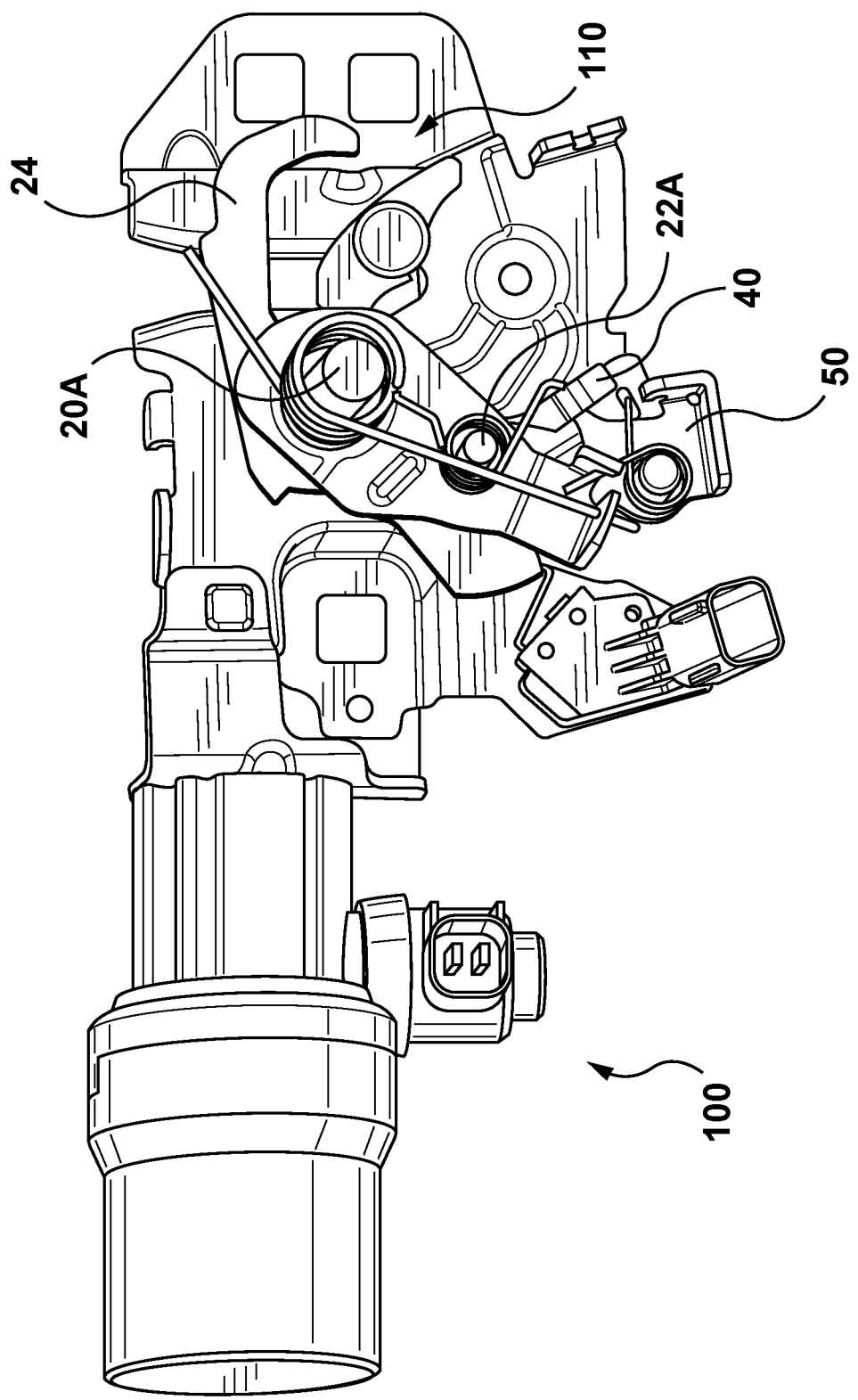
FIG. 31 is an opposite side view of the latch of FIG. 30.
Figure 32:
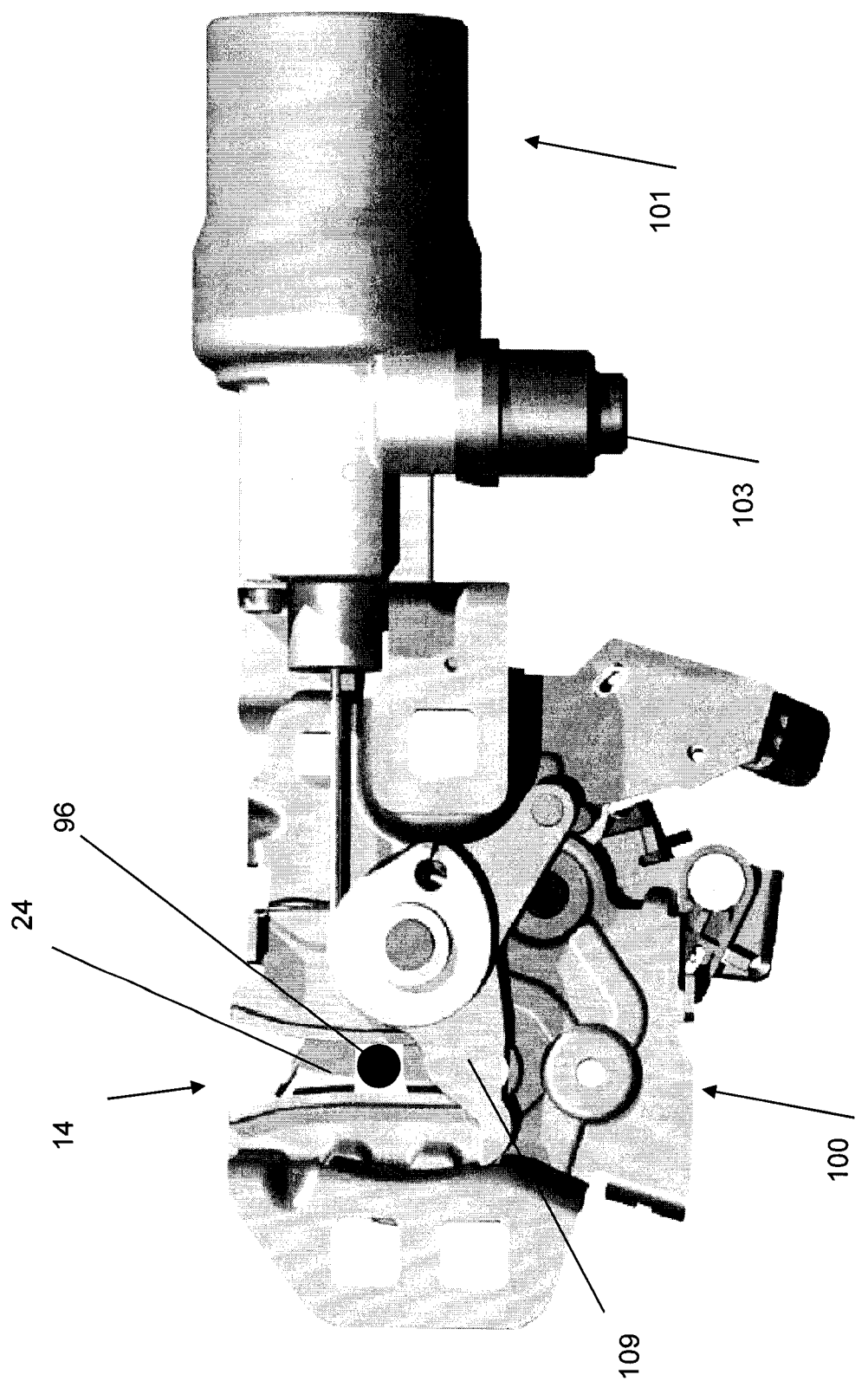
FIG. 32 the latch of FIG. 30 in a latched or primary position prior to deployment of an actuation system.

Referring to FIG. 31, shown are the latch components 110 of the ratchet 24 mounted on pivot point 20A, pawl 40 mounted on pivot point 22A, primary release lever 50 for manually (via driver) operating the pawl 40 out of engagement with the ratchet 24, and mechanical element 109 (see FIG. 30). Referring to FIG. 32, shown is the latch assembly 100 in the latched position, such that the mating latch component 96 is positioned in the slot 14 and restrained therein between the arms of the ratchet 24. The mechanical element 109 is in the non-actuated position, as the actuation system 101 has yet to be activated via the trigger system 103.

Figure 33:
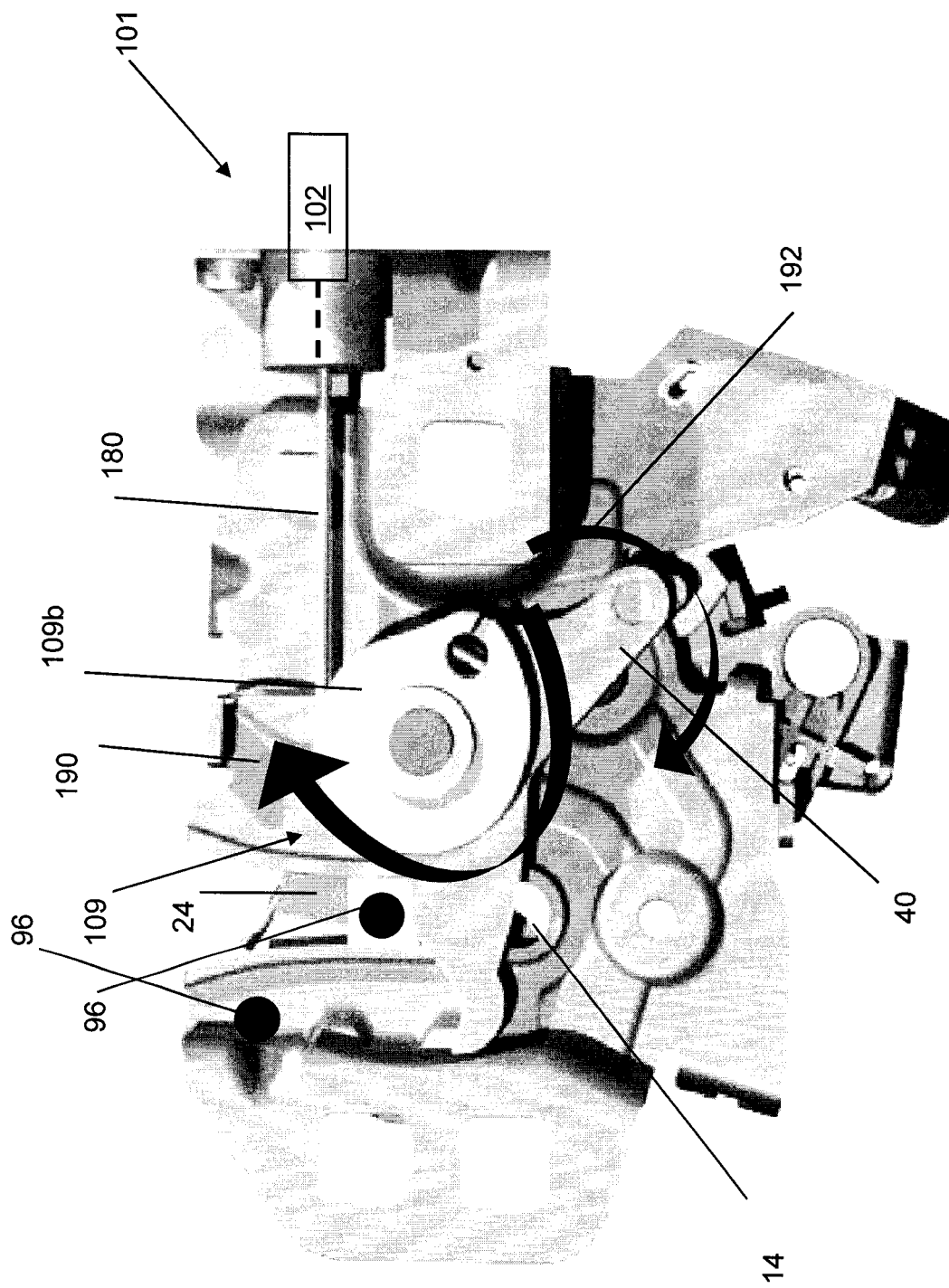
FIG. 33 shows further operation of the latch of FIG. 30.
Figure 34:
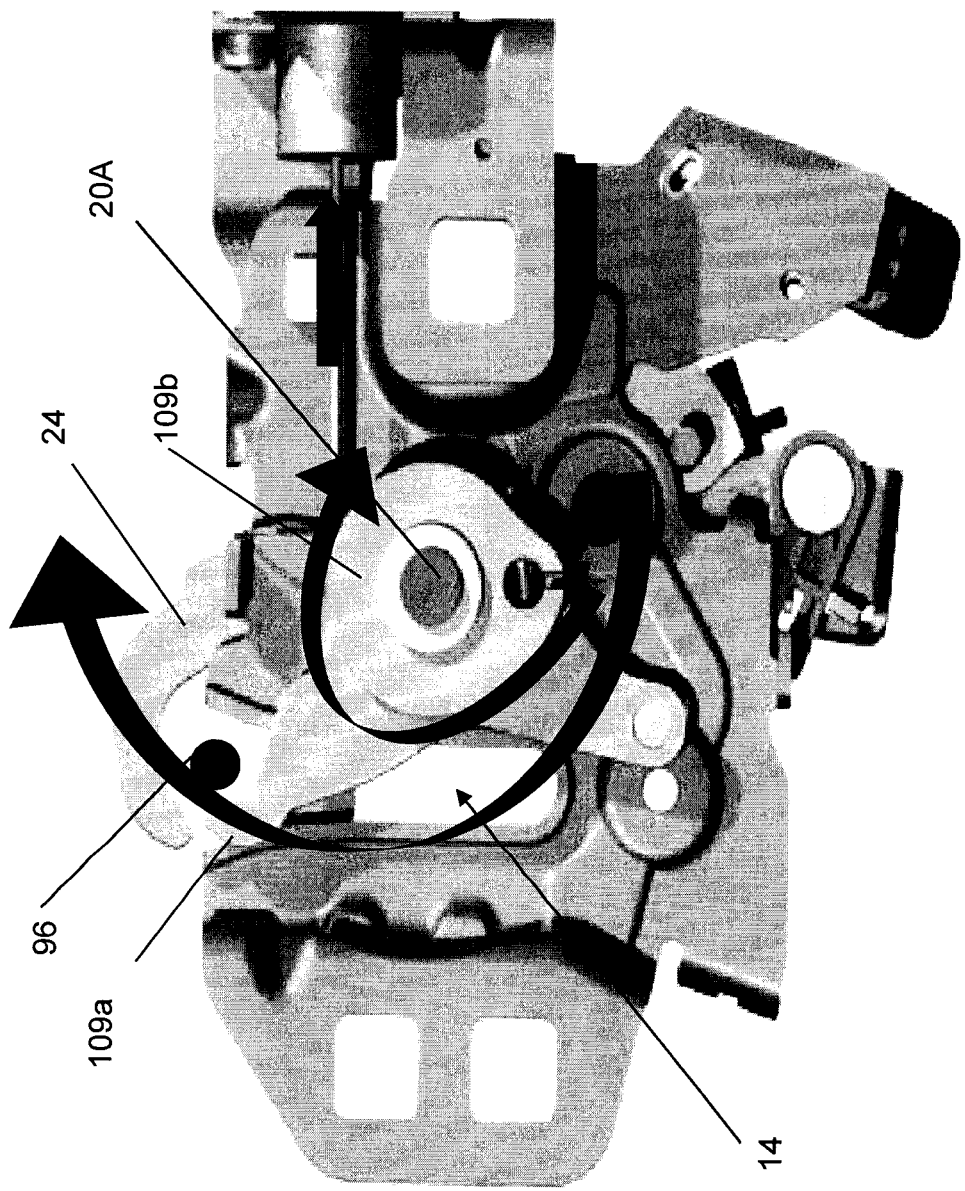
FIG. 34 shows further operation of the latch of FIG. 30 to the unlatched position.

Referring to FIG. 33, upon activation of the actuation system 101, the force element 180 pulls on cam element 109b and causes the mechanical element 109 to rotate about direction 190. Contact of the cam element 109b with the pawl 40 causes the pawl 40 to rotate in direction 192 out of engagement with the ratchet 24, thus allowing the ratchet 24 to become unrestrained in the latched position. The mechanical element continues to rotate in the direction 190 (under influence of the force element 180) until the level element 109a comes into contact with the mating latch component 96, thus acting to couple the movement of the mating latch component 96 (up the slot 14) with the expanding stored energy of the energy storage device 102. Referring to FIG. 34, shown is that the cam lever 109b and the lever 109a continue to rotate about the pivot point 20A to push the mating latch component 96 up the slot 14 to the mouth of the slot 14. It is noted that the mating latch component 96 stays within the arms of the ratchet 24 at the mouth of the slot 14, when the mating latch component 96 is in the unlatched or secondary position. For example, the pop-up distance (i.e. travel distance) of the mating latch component 96 from latched (e.g. primary) to unlatched (e.g. secondary) position can be about 25-30 mm.

Figure 35:
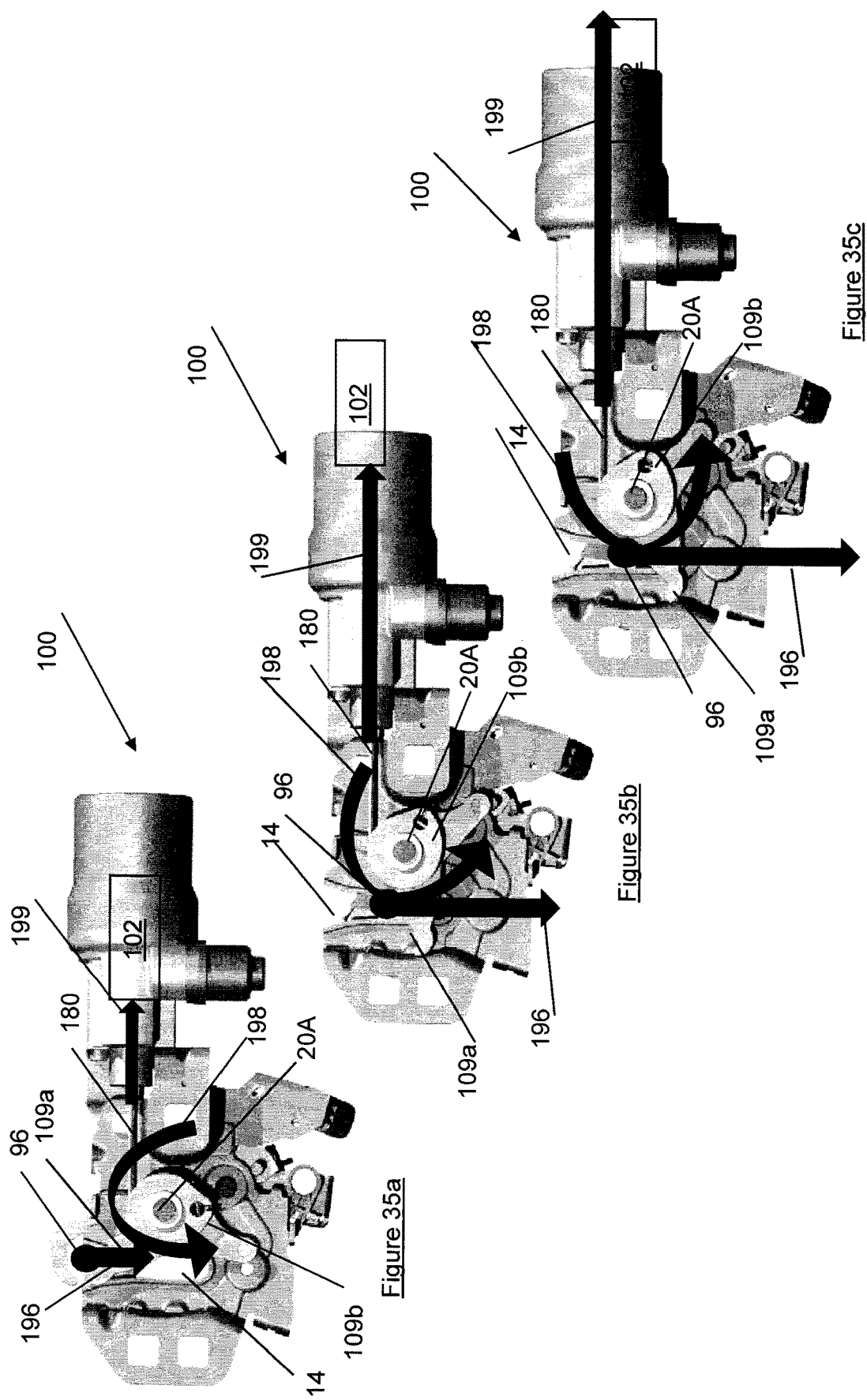
FIG. 35a shows a first stage of reloading of the activation system post deployment thereof.
FIG. 35b shows a second stage of reloading of the activation system post deployment thereof.
FIG. 35c shows a third stage of reloading of the activation system post deployment thereof.

Referring to FIGS. 35a,b,c, shown is the progression of post deployment (i.e. after the mating latch component 96 is moved to the unlatched position as facilitated by actuation of the actuation system 101) due to impact of a pedestrian with the closure panel 6 (hood—see FIG. 1a) coupled to the mating latch component 96. Upon impact with the closure panel 6 by the pedestrian, the mating latch component 96 is driven back downwards 196 into the slot 14 towards the latched position, thus impacting and also driving the lever element 109a down into the slot 14. Movement of the lever element 109a is coupled to rotational movement of the cam element 109b in direction 198 about the pivot point 20A. As shown by arrow 199, as the cam element 109b rotates progressively in direction 198 the force element 180 pulls (or otherwise applies force thereto) on the energy storage device 102, for example a mechanical energy storage device such as a spring. Due to movement of the mechanical element 109 (e.g. lever 109a and cam 109b) that causes application of force to the energy storage device 102 via the coupled force element 180, reloading (e.g. at least partial) is realized of the energy storage device 102, thus facilitating absorption of pedestrian impact energy with the closure panel 6 as the energy storage device 102 is reloaded.

Figure 36:
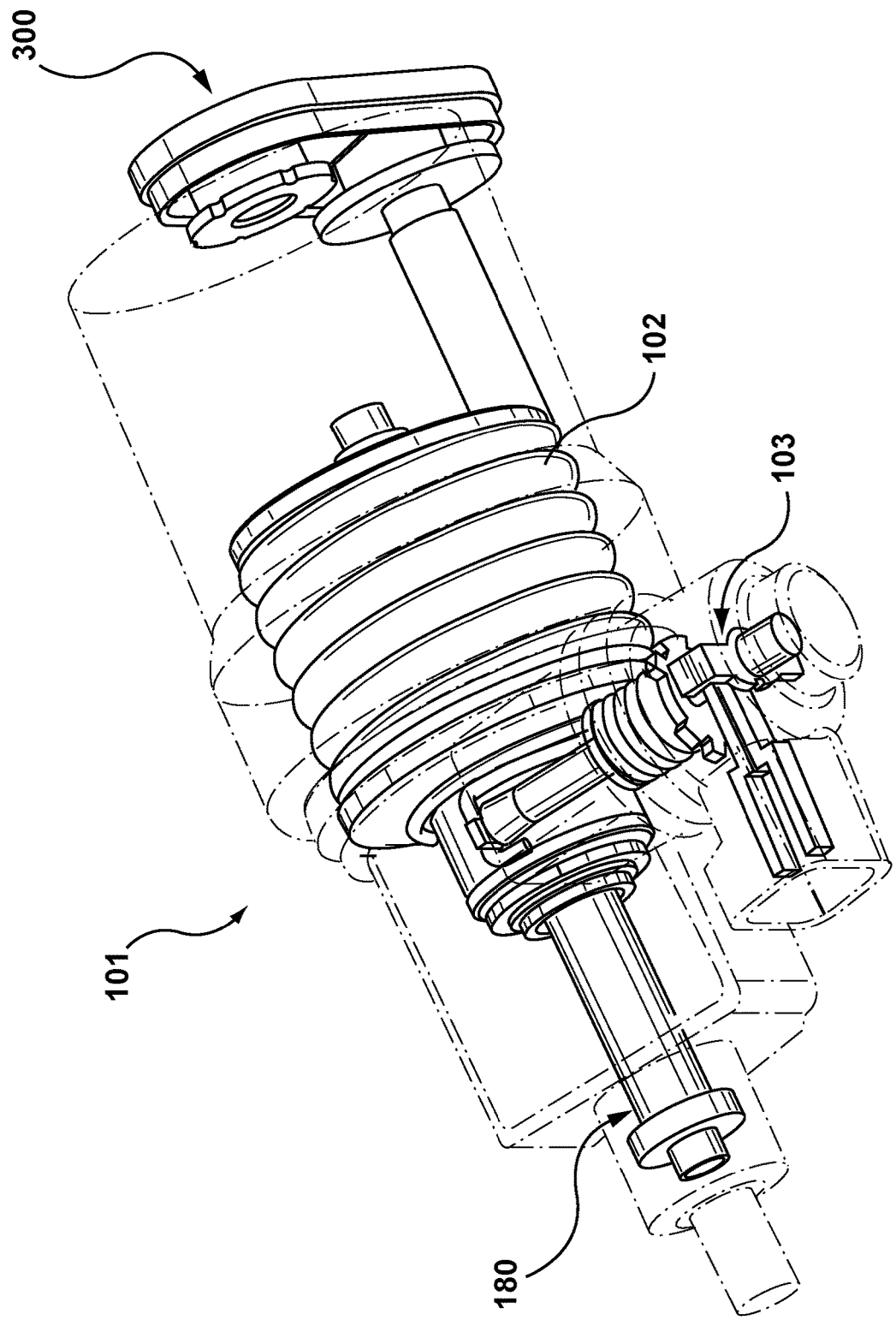
FIG. 36 shows an alternative embodiment of the actuation system of FIG. 30.
Figure 37:
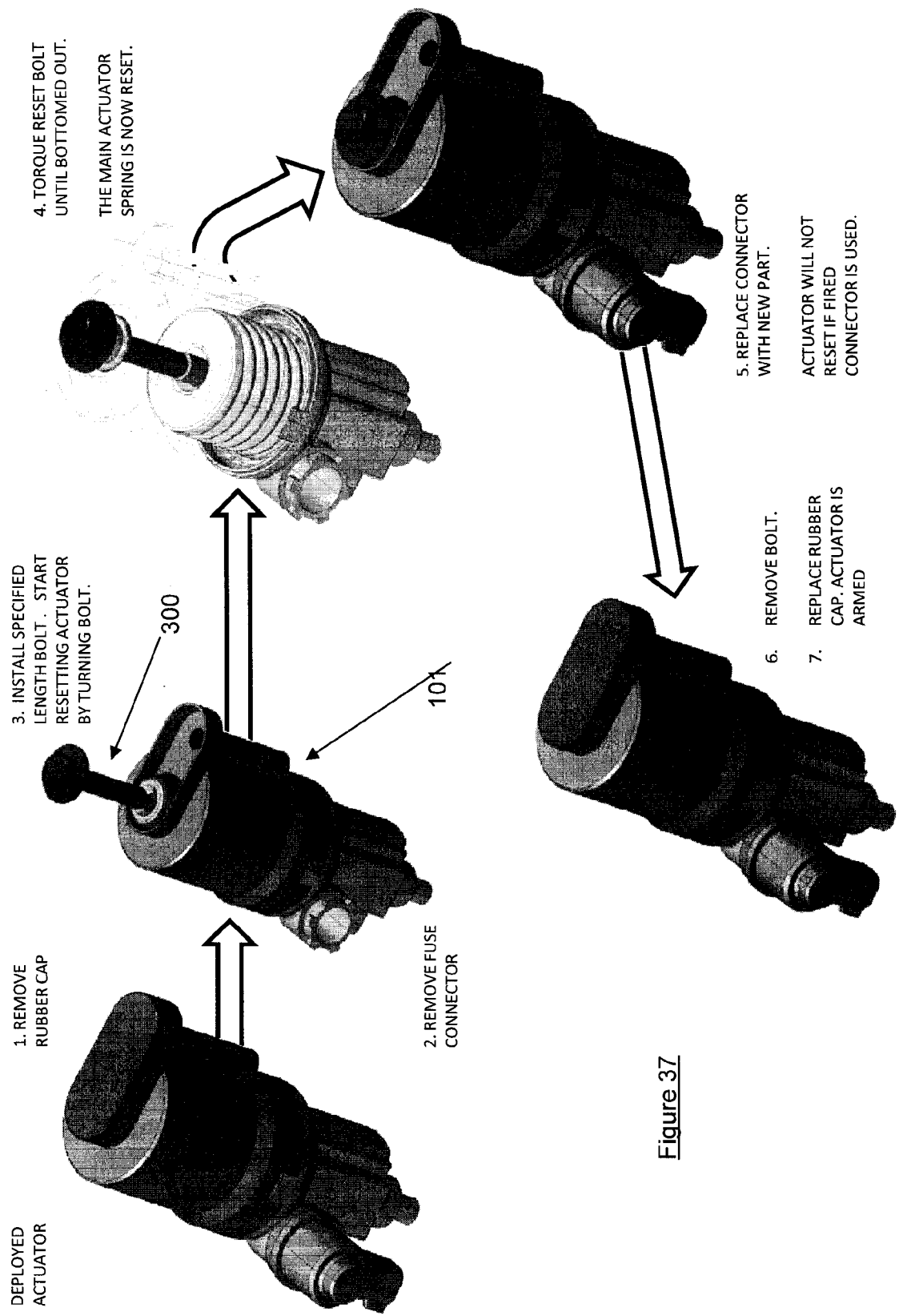
FIG. 37 shows an example rest operation of the actuation system of FIG. 36.

Referring to FIGS. 36 and 37, shown is an alternative embodiment of the actuation system 101. The actuation system 101 includes the energy storage system 102 (e.g. containing stored mechanical energy for use in actuating in the latch 100—not shown—in emergency situations) and the trigger mechanism 103. Also included is the force element 180 for interacting with the latch 100 as actuated via the energy storage system 102 when released. The actuation system 101 can also have a reset mechanism 300 (e.g. a threaded fastener arrangement of a nut and bolt) used to reset the energy storage system 102 after deployment from the second position back to the first position.

Figure 38:
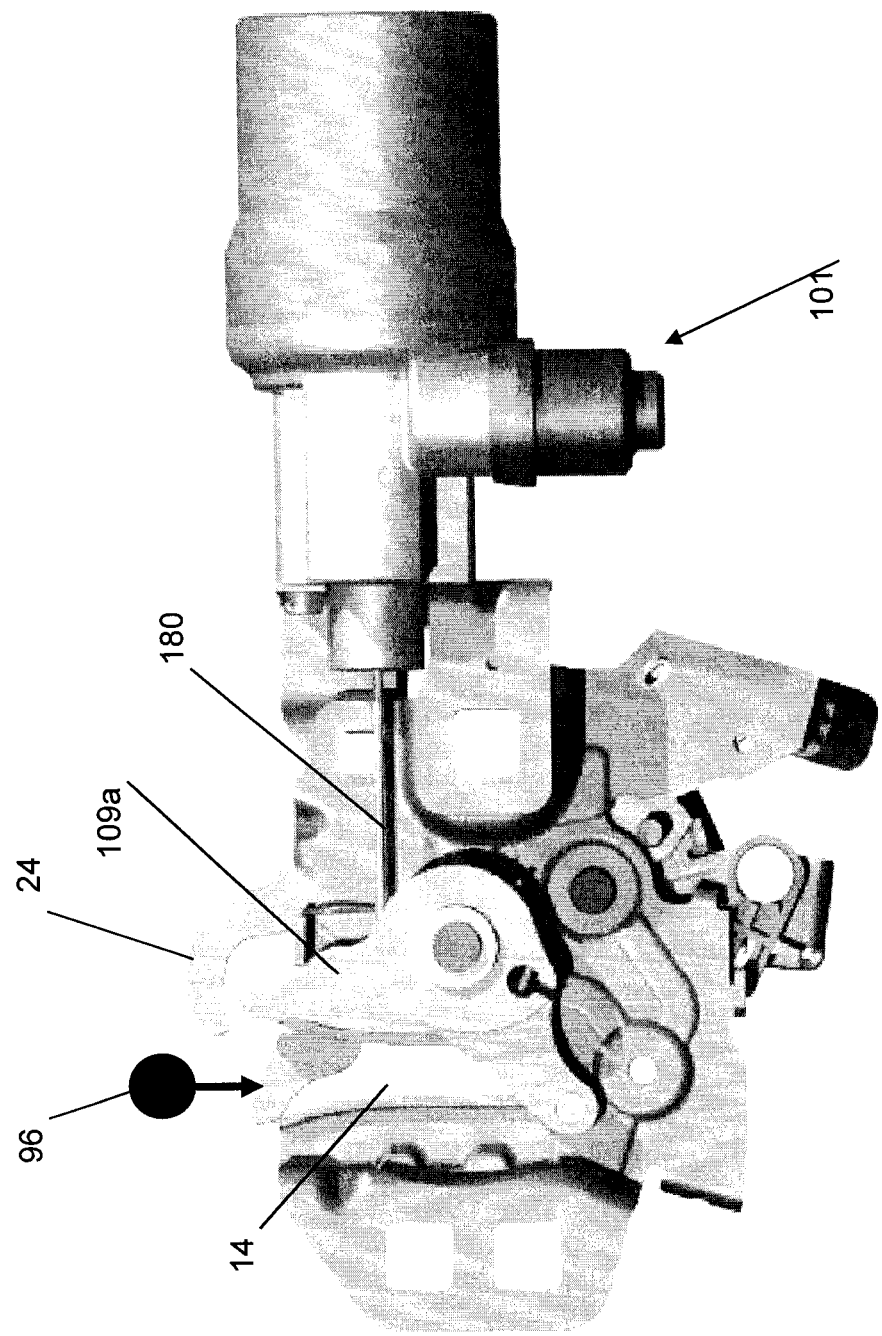
FIG. 38 shows an example reengagement of the latch assembly post deployment of the actuation system.

In terms of post deployment, it is recognized that the mechanical element 109a (see FIGS. 30 and 38) can be rotated away from the entrance of slot 14, as actuated by force element 180, and thus provide for an after deployment reengagement of the striker 96 with the latch elements (e.g. ratchet 24). In this manner, the mechanical element 109a is rotated and thus bypasses the striker 96 travel path (e.g. as guided by the slot 14). Subsequent re-latching of the striker 96 in the slot 14 (via the ratchet 24) can be done by pushing the striker 96 back into the slot 14 and into contact with the ratchet 24, while at the same time bypassing contact with the mechanical element 109a. In this manner, the latch 100 can be re-latched after deployment (e.g. post deployment) of the actuation system 101. Therefore, after an actuation and after the energy absorption (see FIG. 39) of the actuation system 101, the associated mechanical element 109a can apply a (e.g. constant) force up on the striker 96 until the latch is released from the secondary position. Once the latch is released, the mechanical elements 109 (e.g. lever 109a, cam 109b) 109b can continue to rotate such that it/they clear out of the latch slot 14, thus advantageously providing for the latch assembly 100 to be used as a typical non-active hood latch (until it gets reset at a dealership).

Those skilled in the art may make other modifications and variations to the embodiment(s) described herein by without departing from the spirit of the disclosure as defined by the following claims.

We claim:

1. A latch assembly for driving a closure panel of a vehicle from a closed panel position to an open panel position, the latch assembly comprising:

a latch mechanism having a first latch element for retaining a mating latch component of the vehicle in a latched position, movement of the first latch element biased towards the unlatched position by a latch biasing element; and an actuation system having:
  an energy storage system having a device for storing potential energy for assisting the latch biasing element in moving the mating latch component from the latched position to the unlatched position;
  a mechanical system having at least one mechanical member for contacting the mating latch component to assist in moving the mating latch component from the latched position to the unlatched position once the mating latch component is released from the first latch element and the at least one mechanical member is in contact with the mating latch component, such that actuation of the least one mechanical member is a result of a deployed release of the stored potential energy.

2. The latch assembly of claim 1, wherein the mating latch component is associated with the closure panel and the latch assembly further includes a mounting plate for mounting the latch assembly to a body of a vehicle having the closure panel.

3. The latch assembly of claim 1, wherein the potential energy of the device is mechanical potential energy.

4. The latch assembly of claim 1, wherein the stored potential energy of the device is chemical potential energy, such that chemical energy of the device is transformed to said stored potential energy by a chemical reaction as a result of said deployed release.

5. The latch assembly of claim 1, wherein the at least one mechanical member has a first mechanical member as a lever.

6. The latch assembly of claim 5, wherein the lever is rotated out of engagement with the mating latch component when in the unlatched position, such that post deployment travel of the mating latch component towards the latched position results in the lever remaining in the unlatched position while at the same time resulting in travel of the first latch element towards the latched position.

7. The latch assembly of claim 5, wherein the first latch element is a ratchet and the lever has an abutment for disengaging a second latch element retaining the first latch element in the latched position.

8. The latch assembly of claim 7, wherein the second latch element is a pawl biased towards engagement with the ratchet.

9. The latch assembly of claim 5, wherein the first latch element is a ratchet and the lever has an abutment for disengaging a second latch element retaining the first latch element in the latched position.

10. The latch assembly of claim 9, wherein the second latch element is a pawl biased towards engagement with the ratchet.

11. The latch assembly of claim 5, wherein the at least one mechanical member has a second mechanical member as a cam for guiding the second latch element into the unlatched position, the lever and the cam coupled together for corotation between the latched and unlatched positions.

12. The latch assembly of claim 11, wherein the second latch element has an abutment to retain the cam in the unlatched position.

13. The latch assembly of claim 11, wherein the mating latch component is retained within a pair of arms of the first latch element when in the unlatched position.

14. The latch assembly of claim 11, wherein the cam is coupled to the device by a force element.

15. The latch assembly of claim 14, wherein the force element is a cable and the stored potential energy is mechanical potential energy provided by a resilient element.

16. The latch assembly of claim 11 further comprising a post deployment position of the mating latch component between the latched and unlatched positions, such that movement of the cam back towards the latched position causes the force element to restore at least a portion of the stored potential energy, as facilitated by a coupling of the force element to the device.

17. The latch assembly of claim 1 further comprising a force element for driving the at least one mechanical member into said actuation as the result of the deployed release of the stored potential energy, the force element coupled to the device.

* * * * *